(12) United States Patent
Harnett et al.

(10) Patent No.: US 12,164,295 B2
(45) Date of Patent: Dec. 10, 2024

(54) UNMANNED VEHICLE CONTROL AND OPERATION IN A MARINE ENVIRONMENT

(71) Applicant: Navico, Inc., Tulsa, OK (US)

(72) Inventors: Mark N. Harnett, Auckland (NZ); Alan Peter Davis, Winchester (GB); Thomas E. H. Isaacson, Auckland (NZ)

(73) Assignee: Navico, Inc., Tulsa, OK (US)

( * ) Notice: Subject to any disclaimer, the term of this patent is extended or adjusted under 35 U.S.C. 154(b) by 0 days.

(21) Appl. No.: 18/306,658

(22) Filed: Apr. 25, 2023

(65) Prior Publication Data

US 2023/0259128 A1 Aug. 17, 2023

Related U.S. Application Data

(63) Continuation of application No. 16/939,152, filed on Jul. 27, 2020, now Pat. No. 11,687,076, which is a
(Continued)

(51) Int. Cl.
*G05D 1/00* (2024.01)
*B63B 35/00* (2020.01)
(Continued)

(52) U.S. Cl.
CPC ............ *G05D 1/0038* (2013.01); *B63B 35/00* (2013.01); *B63G 8/001* (2013.01); *B64D 1/02* (2013.01);
(Continued)

(58) Field of Classification Search
CPC .. G05D 1/0038; G05D 1/0016; G05D 1/0094; B63B 35/00; B63G 8/001;
(Continued)

(56) References Cited

U.S. PATENT DOCUMENTS

| 4,425,635 A | 1/1984 | Yanamoto et al. |
| 6,520,105 B2 | 2/2003 | Koda et al. |

(Continued)

FOREIGN PATENT DOCUMENTS

| KR | 20160121915 A | 10/2016 |
| WO | WO 2006/017511 A2 | 2/2006 |

(Continued)

OTHER PUBLICATIONS

AguaDrone—The World's First Drone with a Fish Finder! website visited Oct. 25, 2016 (10 pgs.) https://www.aguadrone.com/.
(Continued)

*Primary Examiner* — Peter D Nolan
*Assistant Examiner* — Luke Huynh
(74) *Attorney, Agent, or Firm* — Nelson Mullins Riley & Scarborough LLP

(57) ABSTRACT

Many different types of systems are utilized or tasks are performed in a marine environment. The present invention provides various configurations of unmanned vehicles, or drones, that can be operated and/or controlled for such systems or tasks. One or more unmanned vehicles can be integrated with a dedicated marine electronic device of a marine vessel for autonomous control and operation. Additionally or alternatively, the unmanned vehicle can be manually remote operated during use in the marine environment. Such unmanned vehicles can be utilized in many different marine environment systems or tasks, including, for example, navigation, sonar, radar, search and rescue, video streaming, alert functionality, among many others. However, as contemplated by the present invention, the marine environment provides many unique challenges that may be accounted for with operation and control of an unmanned vehicle.

19 Claims, 25 Drawing Sheets

Related U.S. Application Data continuation of application No. 16/001,384, filed on Jun. 6, 2018, now Pat. No. 10,725,469, which is a continuation of application No. 15/292,704, filed on Oct. 13, 2016, now Pat. No. 10,019,002.

(51) Int. Cl.

| | | |
|---|---|---|
| *B63G 8/00* | (2006.01) | |
| *B64D 1/02* | (2006.01) | |
| *B64D 47/02* | (2006.01) | |
| *G01S 7/00* | (2006.01) | |
| *G01S 13/88* | (2006.01) | |
| *G01S 15/88* | (2006.01) | |
| *G01S 15/89* | (2006.01) | |
| *G01S 15/96* | (2006.01) | |
| *B63B 49/00* | (2006.01) | |
| *B64F 1/00* | (2006.01) | |
| *B64U 10/13* | (2023.01) | |
| *B64U 80/84* | (2023.01) | |
| *B64U 101/32* | (2023.01) | |
| *B64U 101/66* | (2023.01) | |

(52) U.S. Cl.
CPC .............. *B64D 47/02* (2013.01); *G01S 7/003* (2013.01); *G01S 13/88* (2013.01); *G01S 15/88* (2013.01); *G01S 15/8902* (2013.01); *G01S 15/96* (2013.01); *G05D 1/0016* (2013.01); *G05D 1/0094* (2013.01); *B63B 2035/005* (2013.01); *B63B 2035/006* (2013.01); *B63B 49/00* (2013.01); *B63G 2008/005* (2013.01); *B64F 1/007* (2013.01); *B64U 10/13* (2023.01); *B64U 80/84* (2023.01); *B64U 2101/32* (2023.01); *B64U 2101/66* (2023.01); *B64U 2201/10* (2023.01); *B64U 2201/20* (2023.01)

(58) Field of Classification Search
CPC ........ B64C 39/024; B64D 1/02; B64D 47/02; B64D 47/08; G01S 7/003; G01S 13/88; G01S 15/88; G01S 15/8902; G01S 15/96
See application file for complete search history.

(56) References Cited

U.S. PATENT DOCUMENTS

| | | |
|---|---|---|
| 7,606,114 B2 | 10/2009 | Bachelor et al. |
| 8,437,885 B1 | 5/2013 | Beazley et al. |
| 8,645,012 B2 | 2/2014 | Salmon et al. |
| 8,761,976 B2 | 6/2014 | Salmon et al. |
| 9,132,900 B2 | 9/2015 | Salmon et al. |
| 10,019,002 B2 | 7/2018 | Harnett et al. |
| 10,553,122 B1 | 2/2020 | Gilboa-Amir et al. |
| 10,725,469 B2 | 7/2020 | Harnett et al. |
| 11,231,706 B1 | 1/2022 | Curlander et al. |
| 11,687,076 B2 * | 6/2023 | Harnett ............... B64D 47/02 701/2 |
| 2009/0037040 A1 | 2/2009 | Salmon et al. |
| 2014/0336854 A1 | 11/2014 | Salmon et al. |
| 2015/0025797 A1 * | 1/2015 | Hardesty .............. G01S 19/47 701/469 |
| 2015/0142211 A1 * | 5/2015 | Shehata .............. G08G 5/0069 701/2 |
| 2016/0054733 A1 | 2/2016 | Hollida et al. |
| 2016/0147223 A1 | 5/2016 | Edwards et al. |
| 2016/0214715 A1 | 7/2016 | Meffert |
| 2017/0235308 A1 | 8/2017 | Gordon et al. |
| 2018/0100922 A1 | 4/2018 | Wigh et al. |
| 2018/0107210 A1 | 4/2018 | Harnett et al. |
| 2018/0288990 A1 | 10/2018 | Laster et al. |

FOREIGN PATENT DOCUMENTS

| | | |
|---|---|---|
| WO | WO 2013/126761 A1 | 8/2013 |
| WO | WO 2014/144471 A1 | 9/2014 |
| WO | WO 2016/205938 A1 | 12/2016 |

OTHER PUBLICATIONS

AeroKontiki—Introducing the world's first autopilot fishing drone kontiki website visited Oct. 25, 2016 (4 pgs.) http://www.aerokontiki.com/.

DIY Drones—The Leading Community for Personal UAVs—Home website visited Oct. 25, 2016 (9 pgs.) www.diydrones.com.

DIY Drones—The Leading Community for Personal UAVs—My Blog Automated Precision Landing on a (stationary) Boat website visited Oct. 25, 2016 (6 pgs.) www.diydrones.com/profiles/blogs/automated-precision-landing-on-a-stationary-boat.

Visual Aerials—Flying off a Boat—Mark and Romeo's Aerial Adventures website visited Oct. 25, 2016 (3 pgs.) http://www.visual-aerials.com/flying-off-a-boat.html.

Unmanned Marine Systems USV Website visited Oct. 26, 2016 (12 pgs.) http://www.unmannedsystemstechnology.com/company/autonomous-surface-vehicles-ltd/.

ADS, Inc.; "SeaBotix—Underwater Remotely Operated Vehicles (ROVs)"; *YouTube*, Jul. 16, 2014; retrieved from https://www.youtube.com/watch?v=hkqJh5j6eQA.

Teledyne Marine; "SmartFlight 2.0 powered by Greensea"; retrieved Jun. 19, 2019 from http://www.teledynemarine.com/smartflight2-0?ProductLineID=112.

"LED Programmable Message Pocket Fan & Rave Toy"; retrieved Jan. 31, 2019 from https://www.amazon.com/LED-Programmable-Message-Pocket-Rave/dp/B002FWOYG2.

* cited by examiner

UNMANNED VEHICLE CONTROL AND OPERATION IN A MARINE ENVIRONMENT

CROSS-REFERENCE TO RELATED APPLICATIONS

This application claims priority to and is a continuation of U.S. patent application Ser. No. 16/939,152, entitled "Unmanned Vehicle Control and Operation in a Marine Environment", filed Jul. 27, 2020, which is a continuation of U.S. patent application Ser. No. 16/001,384, entitled "Unmanned Vehicle Control and Operation in a Marine Environment", filed Jun. 6, 2018, and issued as U.S. Pat. No. 10,725,469, which is a continuation of U.S. patent application Ser. No. 15/292,704, entitled "Unmanned Vehicle Control and Operation in a Marine Environment", filed Oct. 13, 2016, and issued as U.S. Pat. No. 10,019,002; the contents of each being hereby incorporated by reference in their entirety.

FIELD OF THE INVENTION

Embodiments of the present invention relate generally to unmanned vehicles (drones) and, more particularly, to systems, assemblies, and associated methods for controlling and operating unmanned vehicles in a marine environment.

BACKGROUND OF THE INVENTION

Whether for recreation use, commercial use, or otherwise, persons in a marine environment utilize many different types of systems and perform many different types of tasks. There is always a need to improve such systems and offer more efficient ways for a user to enjoy the marine environment. With increased availability of unmanned vehicles (e.g., drones), the present invention contemplates methods and systems detailed herein to utilize unmanned vehicles for various systems and tasks in the marine environment.

BRIEF SUMMARY OF THE INVENTION

The marine environment offers many unique circumstances and challenges when utilizing an unmanned vehicle. Embodiments of the present invention provide many different configurations and uses for an unmanned vehicle in a marine environment that account for these circumstances and challenges. For example, using a marine electronic device from a marine vessel to autonomously control an unmanned vehicle can provide increased capability for unmanned vehicles in the marine environment. In this regard, as detailed herein, embodiments of the present invention contemplate autonomous and manual remote control and operation of unmanned vehicles in a marine environment for many different types of tasks and systems, including, for example, navigation, tracking, alert functionality, sonar, radar, search and rescue, video streaming, tasks, among many others.

An example embodiment of the present invention provides an unmanned vehicle for a marine environment. The unmanned vehicle is controllable by a marine electronic device of a marine vessel. The unmanned vehicle includes a location sensor configured to gather location data corresponding to the unmanned vehicle, a propulsion system configured to propel the unmanned vehicle, and at least one operational component configured to gather operational data. The operational component comprises at least one of a sensor configured to obtain sensor data or a camera configured to obtained camera data. The unmanned vehicle further includes a transmitter configured to transmit data to the marine electronic device, a receiver configured to receive instructions from the marine electronic device, a processor, and a memory including computer program product stored thereon. The computer program product is configured, when executed by the processor, to determine location data indicative of a current location of the unmanned vehicle and transmit the location data to the marine electronic device. The computer program product is further configured to receive a control signal from the marine electronic device. The control signal includes instructions to travel to a desired location based on a planned route or waypoint stored in memory of the marine electronic device. The computer program product is further configured to cause the propulsion system to propel the unmanned vehicle to the desired location, receive operational data from the at least one operational component, wherein the operational data comprises at least one of sensor data or camera data, and transmit the operational data to the marine electronic device.

In some embodiments, the computer program product is further configured, when executed by the processor, to receive a series of control signals from the marine electronic device. Each control signal includes instructions to travel to a new desired location so as to cause the unmanned vehicle to autonomously follow the planned route stored in the memory of the marine electronic device.

In some embodiments, the computer program product is further configured, when executed by the processor, to determine a location corresponding to one of a current location or a future location of the marine vessel and cause the propulsion system to cause the unmanned vehicle to travel to the location corresponding to the one of the current location or the future location of the marine vessel such that the unmanned vehicle returns to the marine vessel.

In some embodiments, the at least one sensor is a sonar system configured to collect sonar data from an underwater environment. The computer program product is further configured, when executed by the processor, to receive a control signal from the marine electronic device with instructions to gather sonar data, cause the sonar system to gather sonar data, determine location data associated with the gathered sonar data, and transmit the gathered sonar data and the location data associated with the gathered sonar data to the marine electronic device for display of the sonar data on a screen of the marine electronic device and association of the location of the unmanned vehicle with the gathered sonar data.

In some embodiments, the computer program product may be further configured, when executed by the processor, to cause the propulsion system to land the unmanned vehicle on a surface of a body of water such that at least a portion of the sonar system is submerged so as to gather sonar data from the underwater environment.

In some embodiments, the sonar system is deployable and the computer program product is further configured, when executed by the processor, to cause the propulsion system to cause the unmanned vehicle to hover at a hover position above a surface of a body of water and cause the sonar system to deploy from the hover position to beneath the surface of the body of water such that at least a portion of the sonar system is submerged so as to gather sonar data from the underwater environment.

In some embodiments, the computer program product is further configured, when executed by the processor, to receive a control signal from the marine electronic device with instructions to gather streaming video, cause the camera to gather camera data in the form of streaming video, determine location data associated with the gathered camera data, and transmit the gathered camera data and the location data associated with the gathered camera data to the marine electronic device for display of the streaming video on a screen of the marine electronic device and association of the location of the unmanned vehicle with the gathered camera data.

In some embodiments, the computer program product is further configured, when executed by the processor, to receive a series of control signals from the marine electronic device. Each control signal may include instructions to travel to a new desired location such that the unmanned vehicle follows the marine vessel. The computer program product may be further configured to cause the propulsion system to cause the unmanned vehicle to travel according to the series of control signals such that the unmanned vehicle follows the marine vessel and the camera data captures streaming video of the marine vessel.

In some embodiments, the at least one sensor is a wind sensor configured to gather wind data including at least wind speed and wind direction. The computer program product is further configured, when executed by the processor, to receive a control signal from the marine electronic device with instructions to gather wind data, cause the wind sensor to gather wind data, determine location data associated with the gathered wind data, and transmit the gathered wind data and the location data associated with the gathered wind data to the marine electronic device for association of the location of the unmanned vehicle with the gathered wind data.

In some embodiments, the computer program product is further configured, when executed by the processor, to receive a control signal from the marine electronic device with instructions to perform a search and rescue operation and cause the propulsion system to cause the unmanned vehicle to travel according to the search and rescue operation.

In some embodiments, the unmanned vehicle further includes deployable equipment. The deployable equipment may include at least one of a float device, a rope, or a radio device. The computer program product is further configured, when executed by the processor, to cause the propulsion system to cause the unmanned vehicle to hover at a hover position above a surface of a body of water at a location corresponding to a person in the water and cause deployment of the deployable equipment from the hover position to the surface of the body of water such that the person in the water has access to the deployable equipment.

In some embodiments, the unmanned vehicle further comprises at least one light. The computer program product is further configured, when executed by the processor, to cause the propulsion system to cause the unmanned vehicle to hover at a hover position above a surface of a body of water at a location corresponding to a person in the water and cause emission of light at the location corresponding to the person in the water such that the light covers the person and visually marks the location of the person in the water.

In some embodiments, the at least one sensor comprises at least an infrared sensor configured to gather infrared data. The computer program product is further configured, when executed by the processor, to cause operation of the infrared sensor as the unmanned vehicle travels to gather infrared data to locate a person in a body of water, determine location data associated with the gathered infrared data, and transmit the gathered infrared data and the location data associated with the gathered infrared data to the marine electronic device for display of the infrared data on a screen of the marine electronic device and association of the location of the unmanned vehicle with the gathered infrared data.

In some embodiments, the unmanned vehicle further comprises deployable bait or chum. The computer program product is further configured, when executed by the processor, to cause the propulsion system to cause the unmanned vehicle to hover at a hover position above a surface of a body of water at the desired location and cause deployment of the deployable bait or chum from the hover position to the body of water.

In some embodiments, the unmanned vehicle is an unmanned aerial vehicle such that the propulsion system is configured to cause the unmanned aerial vehicle to fly around the marine environment.

In some embodiments, the unmanned vehicle is an unmanned surface vehicle such that the propulsion system is configured to cause the unmanned surface vehicle to travel along a surface of a body of water of the marine environment.

In some embodiments, the unmanned vehicle is an unmanned underwater vehicle such that the propulsion system is configured to cause the unmanned underwater vehicle to travel beneath a surface of a body of water of the marine environment.

In some embodiments, the at least one sensor is at least one of a sonar system, a radar system, a microphone, a temperature sensor, a wind sensor, a heave/roll sensor, or an IR sensor.

In some embodiments, the computer program product is further configured, when executed by the processor, to receive a landing control signal from the marine electronic device with instructions to land on the marine vessel while the marine vessel is travelling along a surface of a body of water. The landing control signal includes a location of the marine vessel, a direction of travel of the marine vessel, and a speed of travel of the marine vessel. The computer program product may be further configured to cause the propulsion system to propel the unmanned vehicle, based on the location of the marine vessel, the speed of travel of the marine vessel, and the direction of travel of the marine vessel, to land on the marine vessel.

In some embodiments, the computer program product is further configured, when executed by the processor, to determine a second current location and cause the propulsion system to cause the unmanned vehicle to return to the current location in an instance in which the second current location is at least a pre-determined distance from the current location such that the unmanned vehicle is virtually anchored and configured to be maintained at the current location.

In another example embodiment of the present invention a marine electronic device of a marine vessel configured for control of an unmanned vehicle is provided. The marine electronic device comprises a transmitter configured to transmit instructions to the unmanned vehicle, a receiver configured to receive data from the unmanned vehicle, a processor, and a memory including computer program product stored thereon. The computer program product is configured, when executed by the processor, to receive location data from the unmanned vehicle, determine, based on the received location data, the current location of the unmanned vehicle, determine, based on a planned route or waypoint stored in the memory of the marine electronic device, a desired location for the unmanned vehicle, and transmit a control signal to the unmanned vehicle to instruct the unmanned vehicle to travel to the desired location. The control signal causes the unmanned vehicle to travel to the desired location. The computer program product is further configured to receive operational data from the unmanned vehicle. The operational data comprises at least one of sensor data obtained by the unmanned vehicle or camera data obtained by the unmanned vehicle.

In some embodiments, the computer program product is further configured, when executed by the processor, to transmit a series of control signals to the unmanned vehicle. Each control signal includes instructions to cause the unmanned vehicle to travel to a new desired location so as to cause the unmanned vehicle to autonomously follow the planned route stored in the memory of the marine electronic device.

In some embodiments, the computer program product is further configured, when executed by the processor, to cause display of the current location of the unmanned vehicle on a screen of the marine electronic device.

In some embodiments, the at least one sensor of the unmanned vehicle is a sonar system configured to collect sonar data from an underwater environment. The computer program product of the marine electronic device is further configured, when executed by the processor, to transmit a control signal to the unmanned vehicle with instructions to gather sonar data, receive the gathered sonar data, and cause display of the gathered sonar data on a screen of the marine electronic device.

In some embodiments, the computer program product of the marine electronic device is further configured, when executed by the processor, to receive location data associated with the gathered sonar data, determine a location associated with the gathered sonar data, store the gathered sonar data in association with the location in the memory, and cause display of an indication of the location associated with the gathered sonar data on the screen while causing display of the gathered sonar data.

In some embodiments, the computer program product of the marine electronic device is further configured, when executed by the processor, to transmit a control signal to the unmanned vehicle with instructions to gather camera data in the form of streaming video, receive the gathered camera data, and cause display of the streaming video on a screen of the marine electronic device.

In some embodiments, the computer program product of the marine electronic device is further configured, when executed by the processor, to receive location data associated with the gathered camera data, determine a location associated with the gathered camera data, store the gathered camera data in association with the location in the memory, and cause display of an indication of the location associated with the gathered camera data on the screen while causing display of the gathered camera data.

In some embodiments, the computer program product of the marine electronic device is further configured, when executed by the processor, to cause display of an image corresponding to the camera data over a chart at the associated location.

In some embodiments, the computer program product is further configured, when executed by the processor, to transmit a series of control signals to the unmanned vehicle. Each control signal includes instructions to cause the unmanned vehicle to travel to a new desired location such that the unmanned vehicle follows the marine vessel and the camera data captures streaming video of the marine vessel.

In some embodiments, the at least one sensor of the unmanned vehicle is a wind sensor configured to gather wind data including at least wind speed and wind direction. The computer program product of the marine electronic device is further configured, when executed by the processor, to transmit a control signal to the unmanned vehicle with instructions to gather wind data, receive the gathered wind data, receive location data associated with the gathered wind data, determine a location associated with the gathered wind data, and cause display of the wind data and an indication of the location associated with the gathered wind data on a screen of the marine electronic device.

In some embodiments, the computer program product is further configured, when executed by the processor, to transmit a control signal to the unmanned vehicle with instructions to cause the unmanned vehicle to perform a search and rescue operation.

In some embodiments, the unmanned vehicle includes deployable equipment. The deployable equipment includes at least one of a float device, a rope, or a radio device. The computer program product of the marine electronic device is further configured, when executed by the processor, to transmit a control signal to the unmanned vehicle to cause the unmanned vehicle to hover at a hover position above a surface of a body of water at a location corresponding to a person in the water and deploy the deployable equipment from the hover position to the surface of the body of water such that the person in the water has access to the deployable equipment.

In some embodiments, the unmanned vehicle includes at least one light. The computer program product of the marine electronic device is further configured, when executed by the processor, to transmit a control signal to the unmanned vehicle to cause the unmanned vehicle to hover at a hover position above a surface of a body of water at a location corresponding to a person in the water and cause emission of light at the location corresponding to the person in the water such that the light covers the person and visually marks the location of the person in the water.

In some embodiments, the at least one sensor of the unmanned vehicle comprises at least an infrared sensor configured to gather infrared data. The computer program product of the marine electronic device is further configured, when executed by the processor, to transmit a control signal to the unmanned vehicle to cause operation of the infrared sensor as the unmanned vehicle travels to gather infrared data to locate a person in a body of water, receive the gathered infrared data and location data corresponding to the gathered infrared data, and determine, based on the location data and the gathered infrared data, a location of the person in the body of water.

In some embodiments, the unmanned vehicle includes deployable bait or chum. The computer program product of the marine electronic device is further configured, when executed by the processor, to transmit a control signal to the unmanned vehicle to cause the unmanned vehicle to hover at a hover position above a surface of a body of water at a location and deploy the deployable equipment from the hover position to the body of water at the location.

In some embodiments, the computer program product is further configured, when executed by the processor, to transmit a landing control signal to the unmanned vehicle with instructions to cause the unmanned vehicle to land on the marine vessel while the marine vessel is travelling along a surface of a body of water, wherein the landing control signal includes a location of the marine vessel, a direction of travel of the marine vessel, and a speed of travel of the marine vessel.

In yet another example embodiment of the present invention, a system for operating an unmanned vehicle in a marine environment is provided. The system comprises an unmanned vehicle including a location sensor configured to gather location data corresponding to the unmanned vehicle, a propulsion system configured to propel the unmanned vehicle, and at least one operational component configured to gather operational data. The operational component comprises at least one of a sensor configured to obtain sensor data or a camera configured to obtained camera data. The unmanned vehicle further includes a transmitter configured to transmit data to the marine electronic device, a receiver configured to receive instructions from the marine electronic device, an unmanned vehicle processor, and a memory including unmanned vehicle computer program product stored thereon. The system further comprises a marine electronic device of a marine vessel configured for control of the unmanned vehicle. The marine electronic device includes a transmitter configured to transmit instructions to the unmanned vehicle, a receiver configured to receive data from the unmanned vehicle, a marine electronic device processor, and a memory including marine electronic device computer program product stored thereon. The unmanned vehicle computer program product is configured, when executed by the unmanned vehicle processor, to determine location data indicative of a current location of the unmanned vehicle, transmit the location data to the marine electronic device, receive operational data from the at least one operational component, wherein the operational data comprises at least one of sensor data or camera data, and transmit the operational data to the marine electronic device. The marine electronic device computer program product is configured, when executed by the marine electronic device processor, to receive location data from the unmanned vehicle, determine, based on the received location data, the current location of the unmanned vehicle, determine, based on a planned route or waypoint stored in the memory of the marine electronic device, a desired location for the unmanned vehicle, transmit a control signal to the unmanned vehicle to instruct the unmanned vehicle to travel to the desired location, wherein the control signal causes the unmanned vehicle to travel to the desired location, and receive operational data from the unmanned vehicle, wherein the operational data comprises at least one of sensor data obtained by the unmanned vehicle or camera data obtained by the unmanned vehicle. The unmanned vehicle computer program product is further configured, when executed by the unmanned vehicle processor, to receive a control signal from the marine electronic device, wherein the control signal includes instructions to travel to a desired location based on a planned route or waypoint stored in memory of the marine electronic device and cause the propulsion system to propel the unmanned vehicle to the desired location.

In some embodiments, the unmanned vehicle and/or marine electronic device of the system may be configured according to any features or configurations described herein, such as according to the above described example embodiments of an unmanned vehicle and/or marine electronic device.

In other example embodiments, corresponding methods, apparatuses, and computer program products according to any features or configurations described herein may be provided.

BRIEF DESCRIPTION OF THE DRAWINGS

Figure 1:
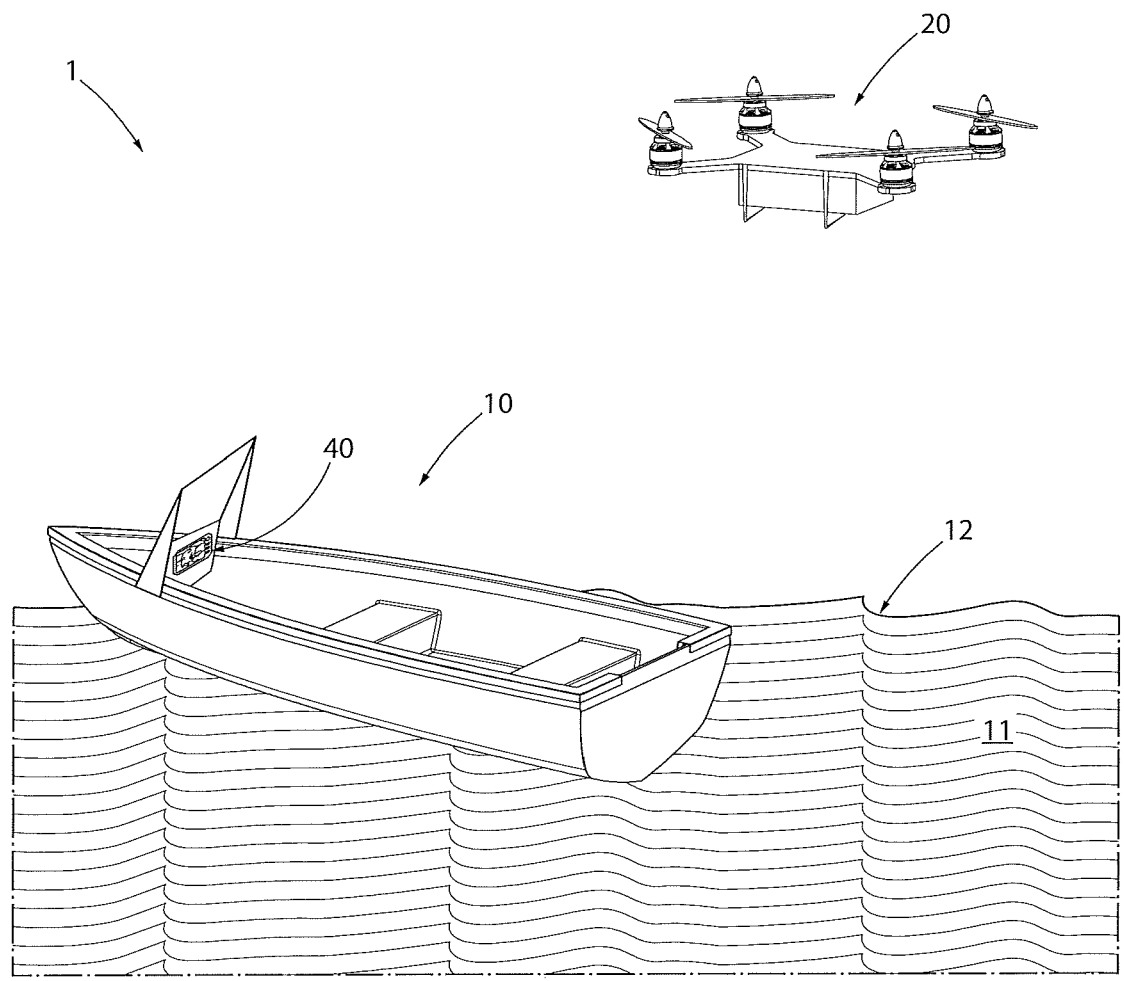
Figure 2A:
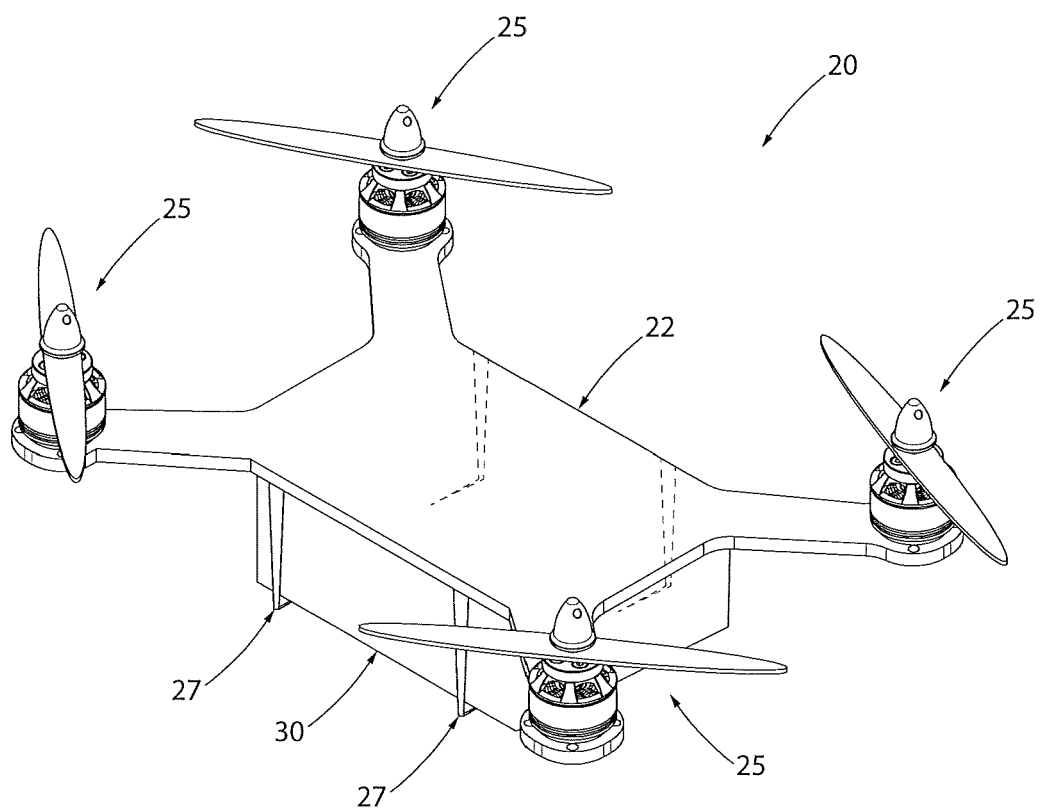
Figure 2B:
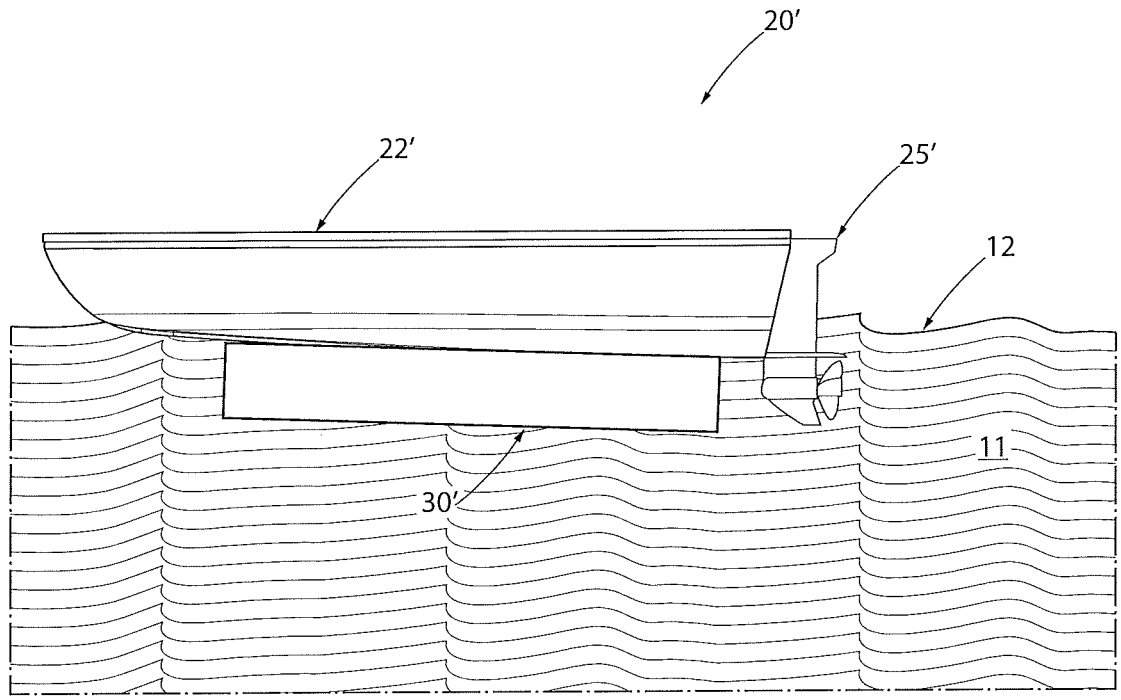
Figure 2C:
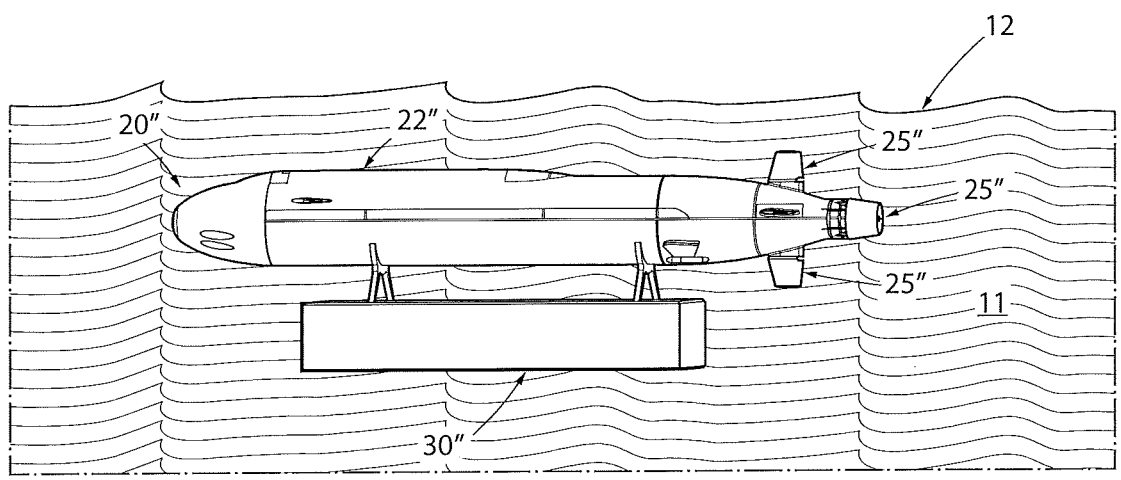
Figure 3A:
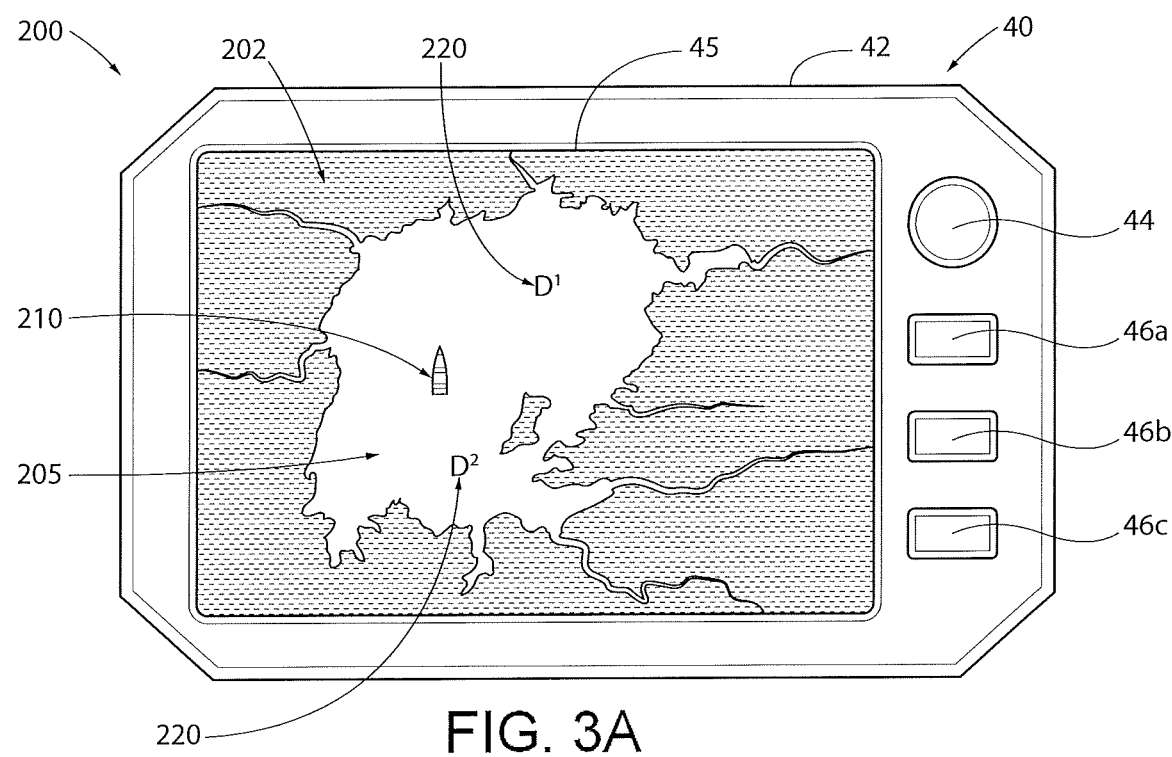
Figure 3B:
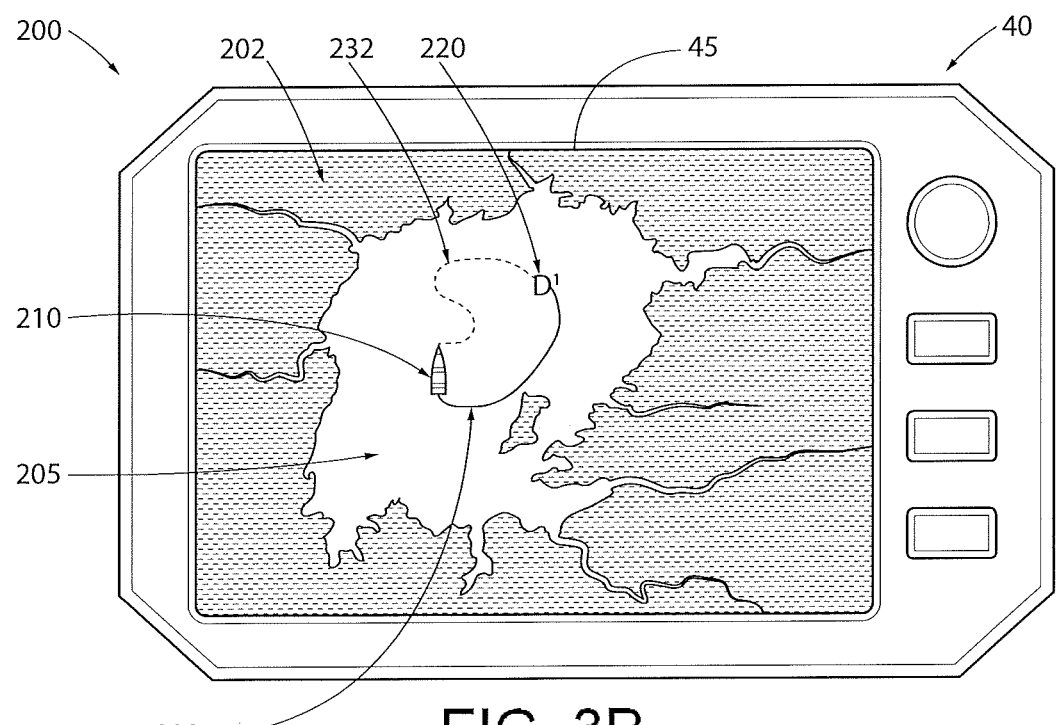
Figure 3C:
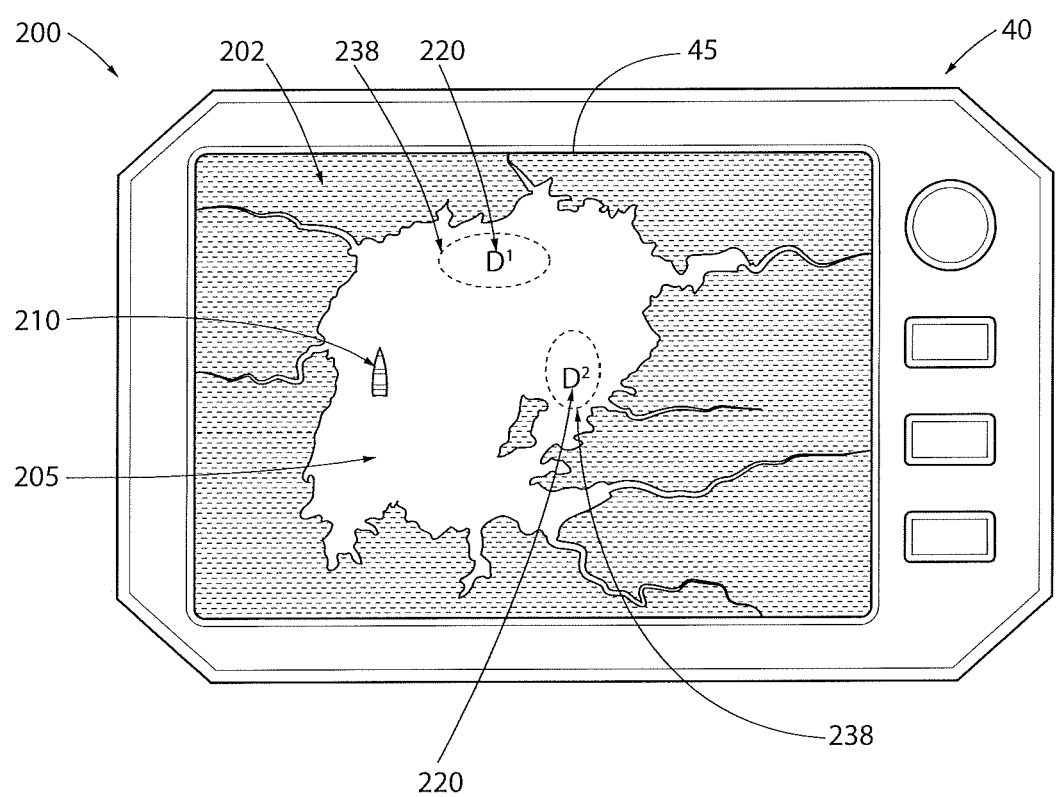
Figure 4:
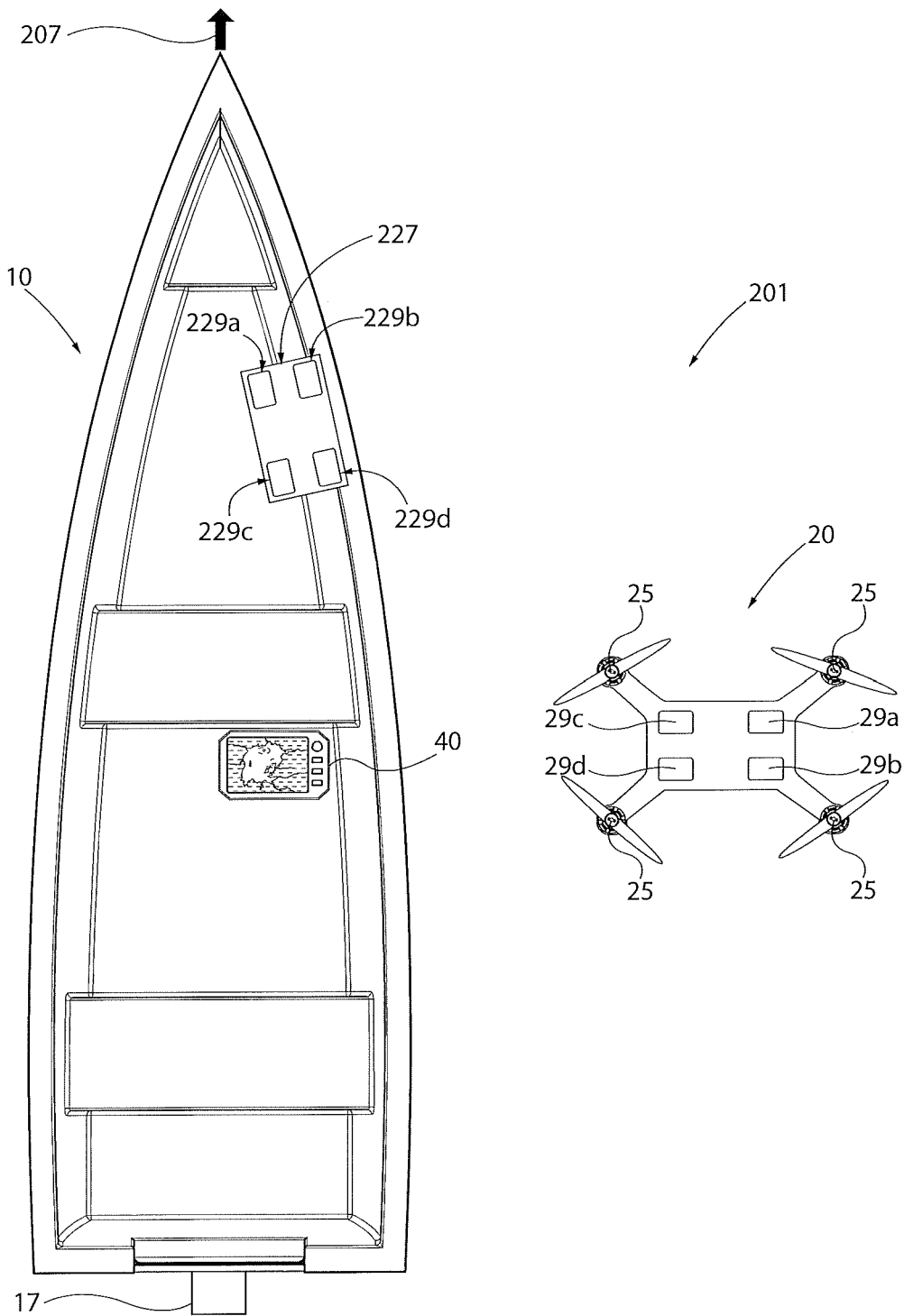
Figure 5:
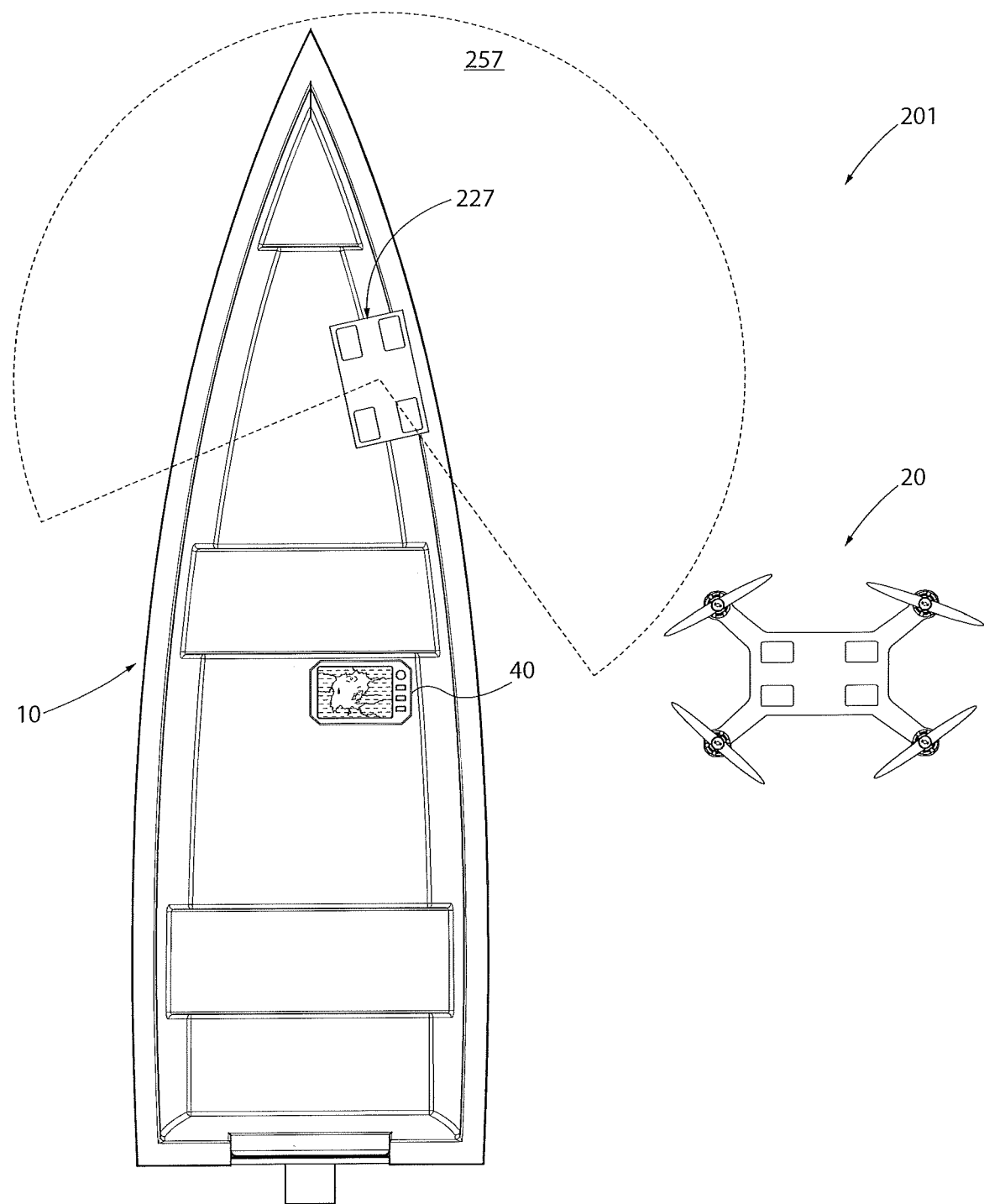
Figure 6:
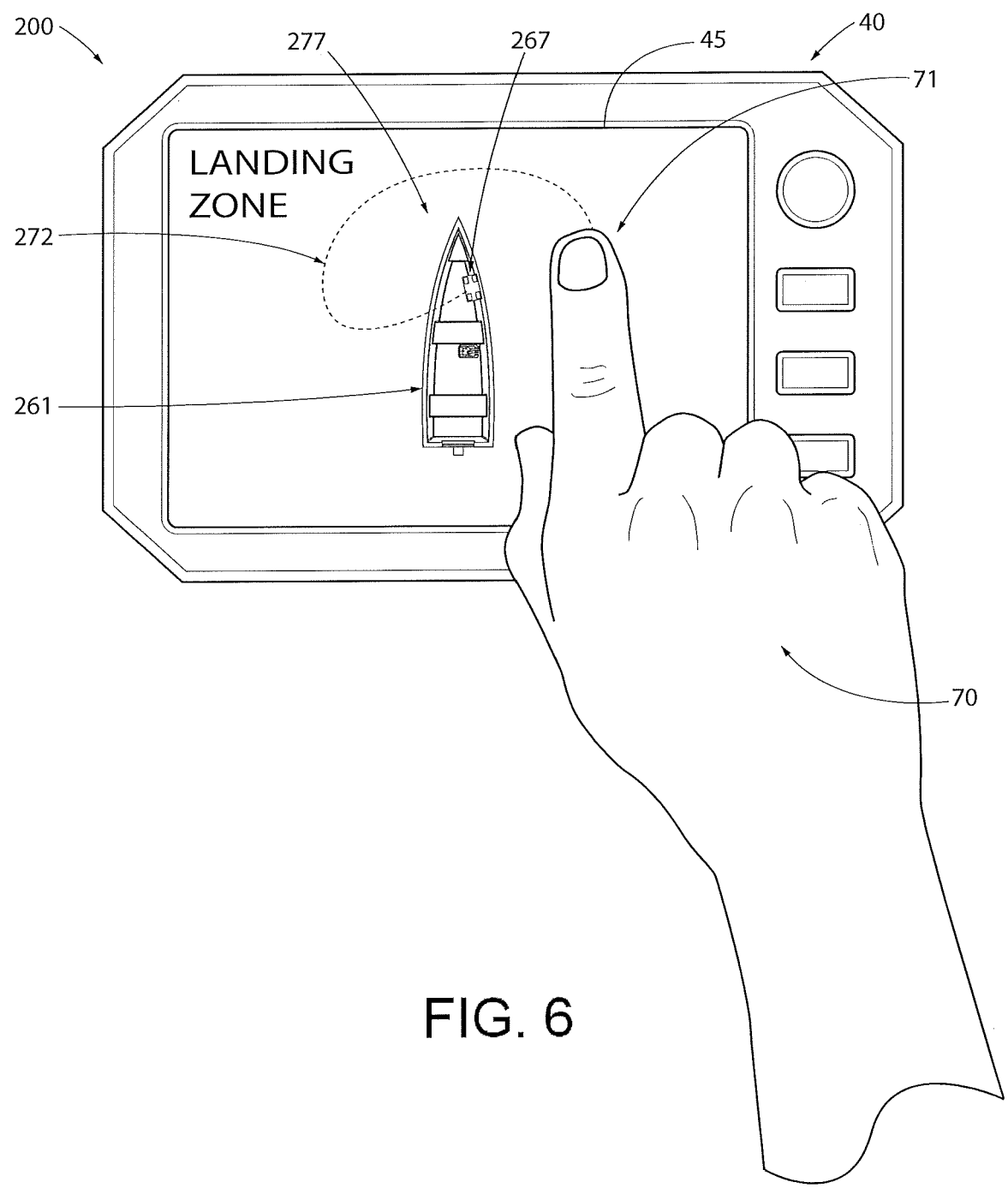
Figure 7A:
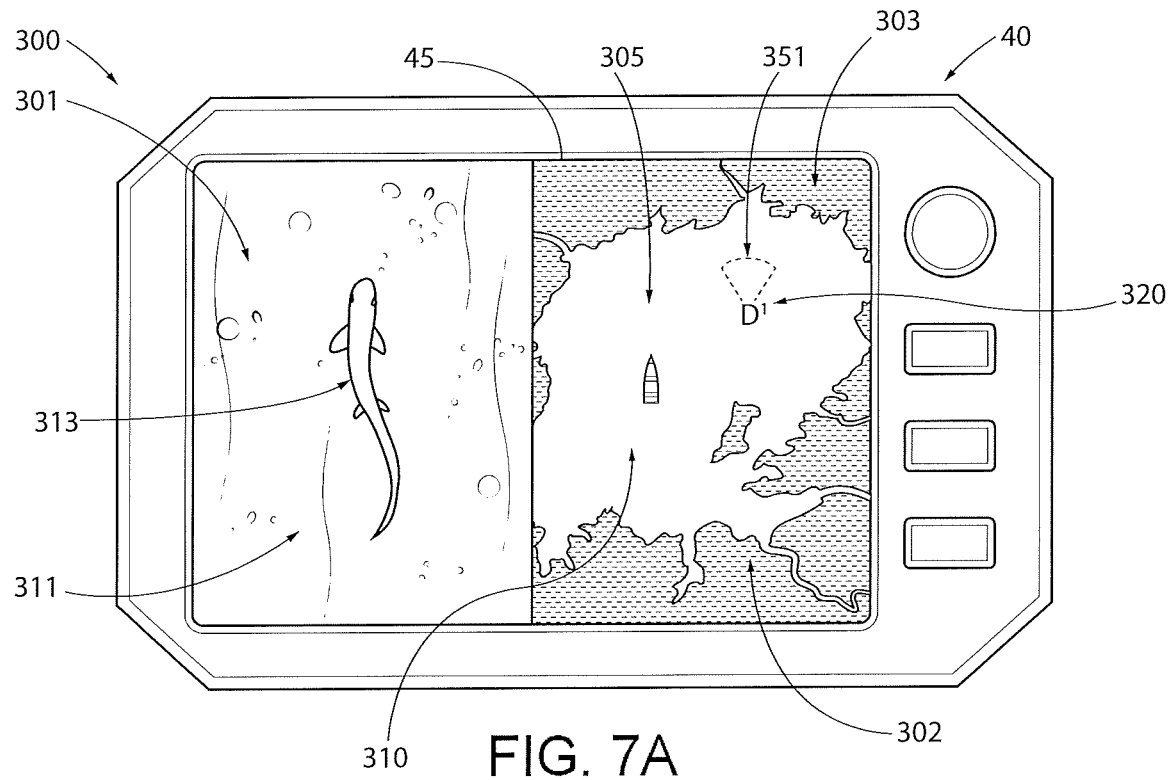
Figure 7B:
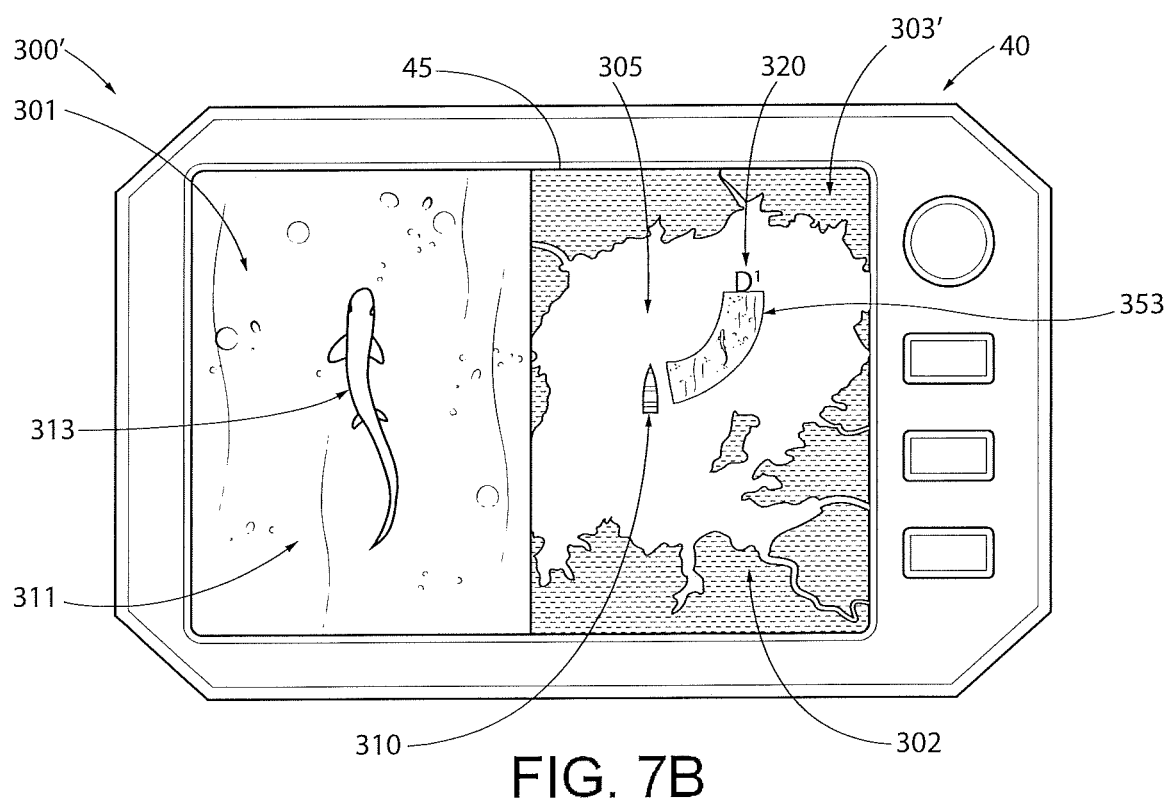
Figure 8:
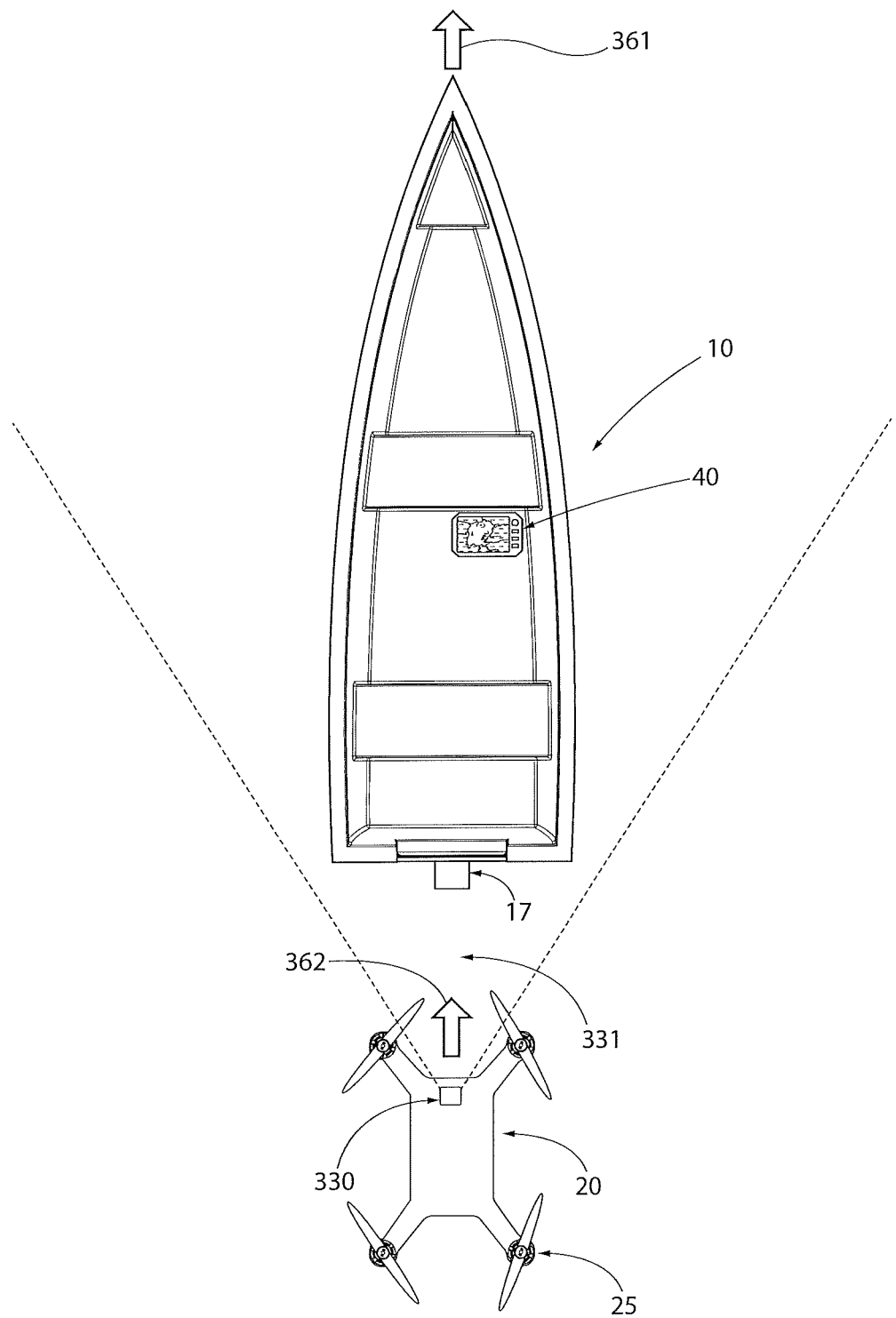
Figure 9A:
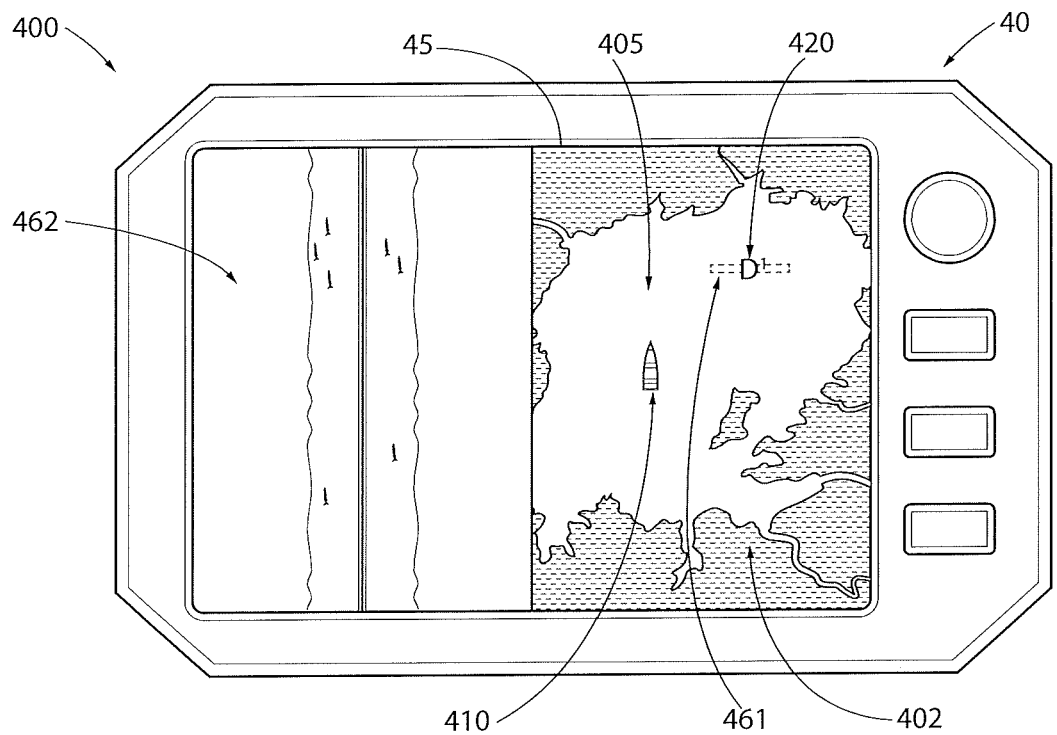
Figure 9B:
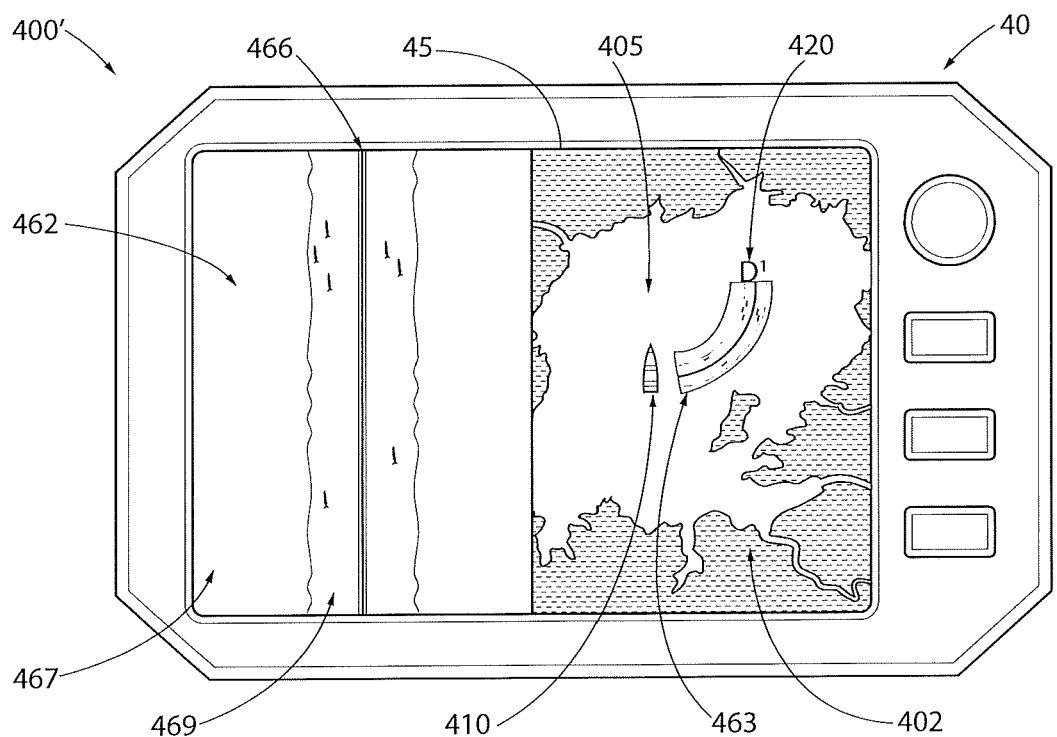
Figure 10A:
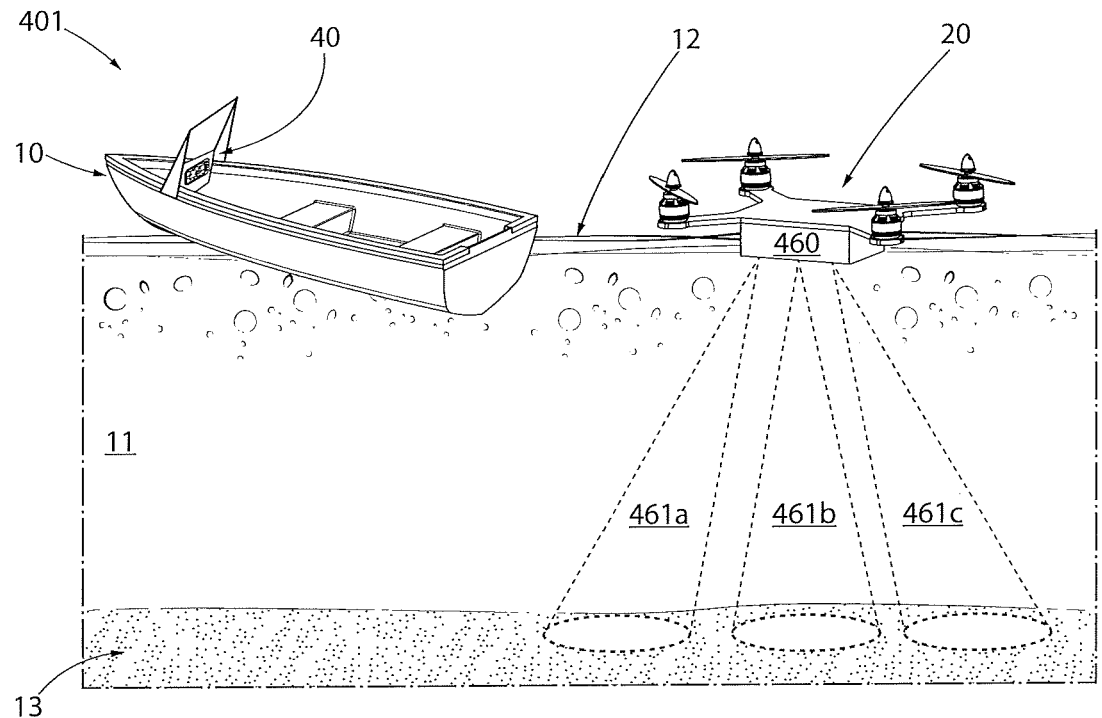
Figure 10B:
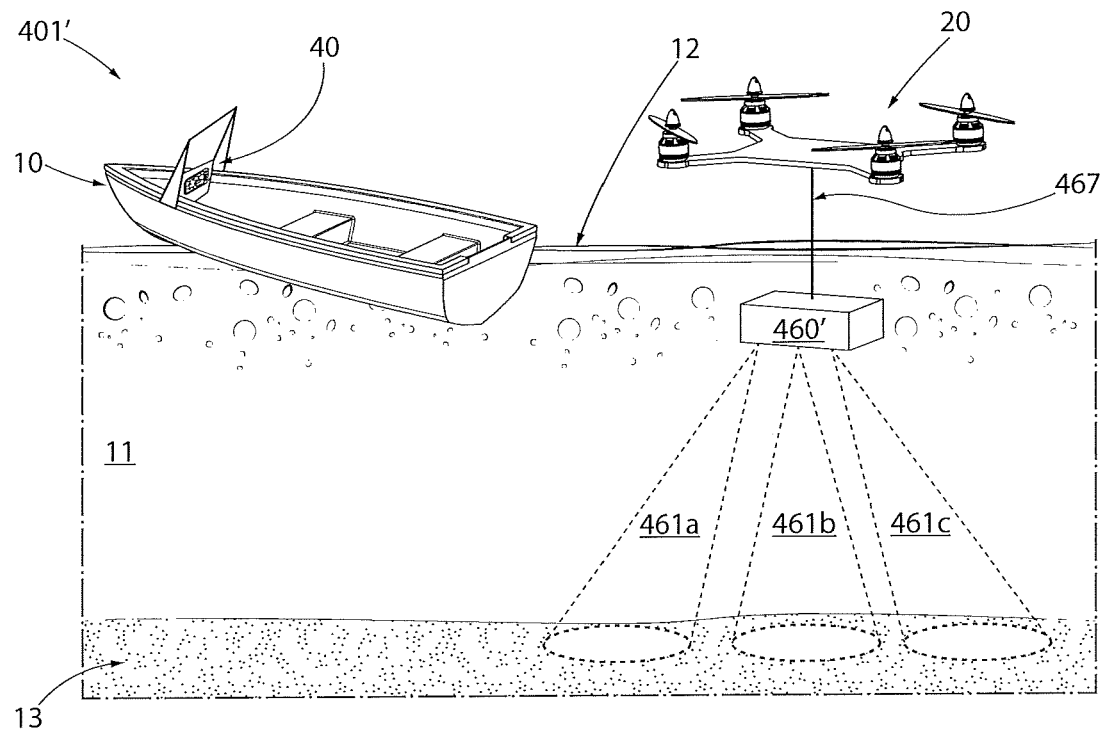
Figure 11:
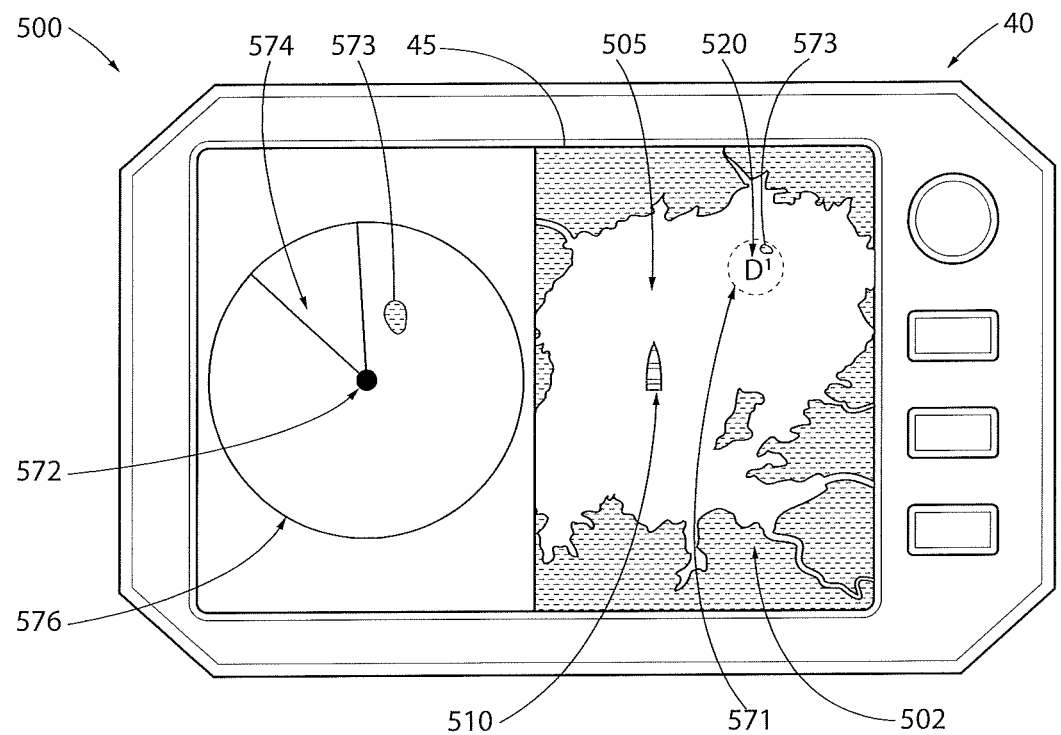
Figure 12:
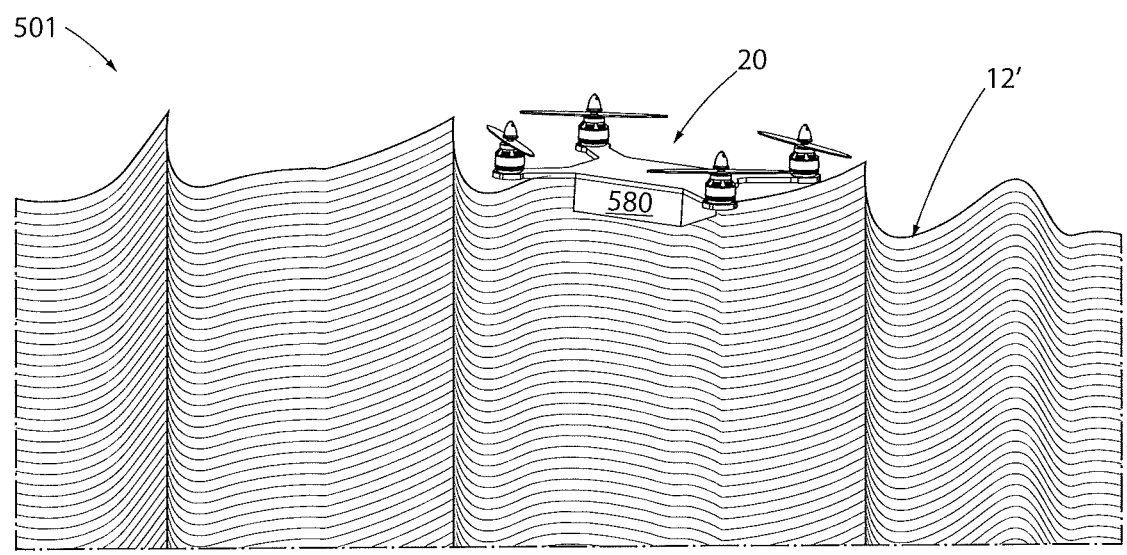
Figure 13A:
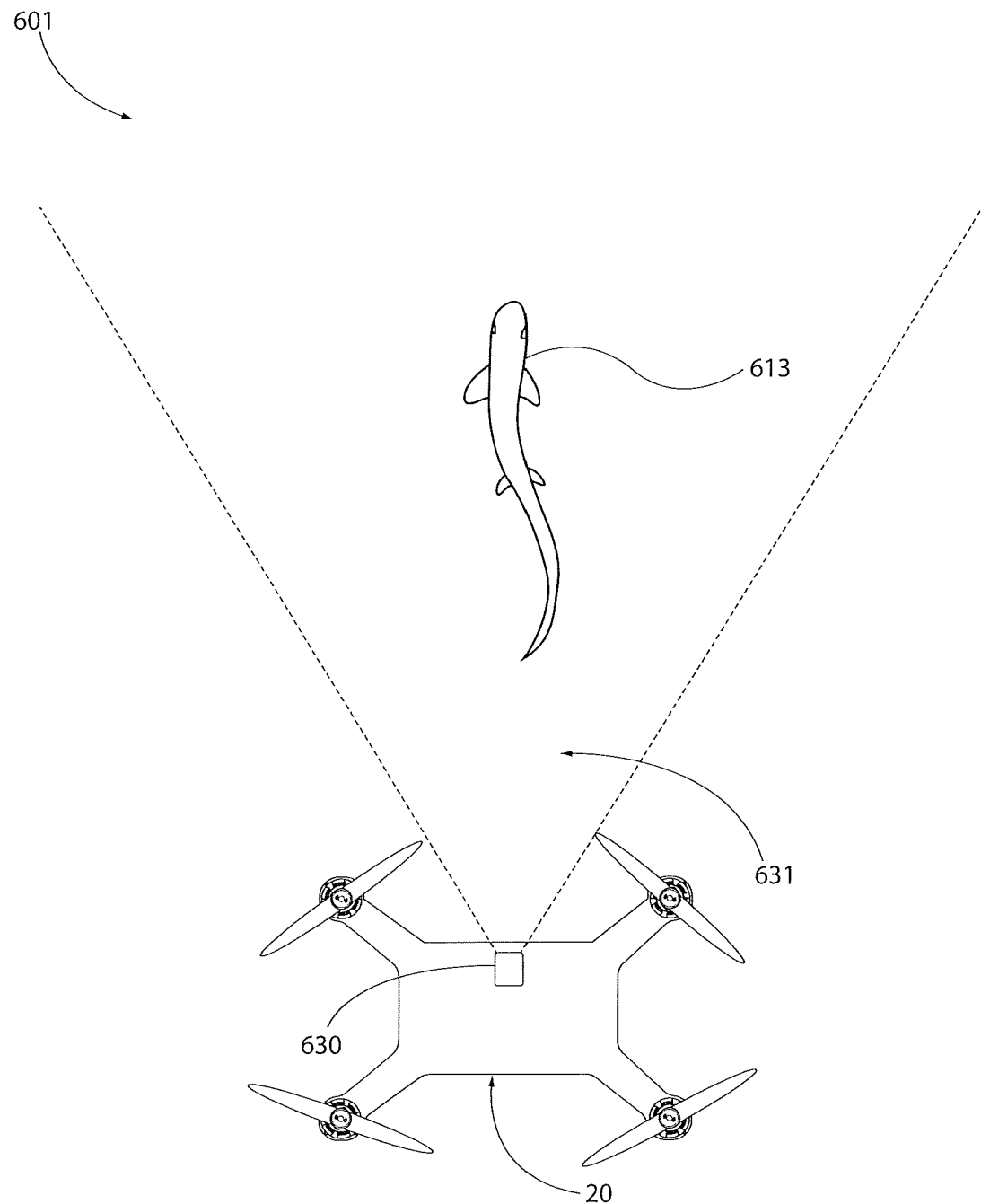
Figure 13B:
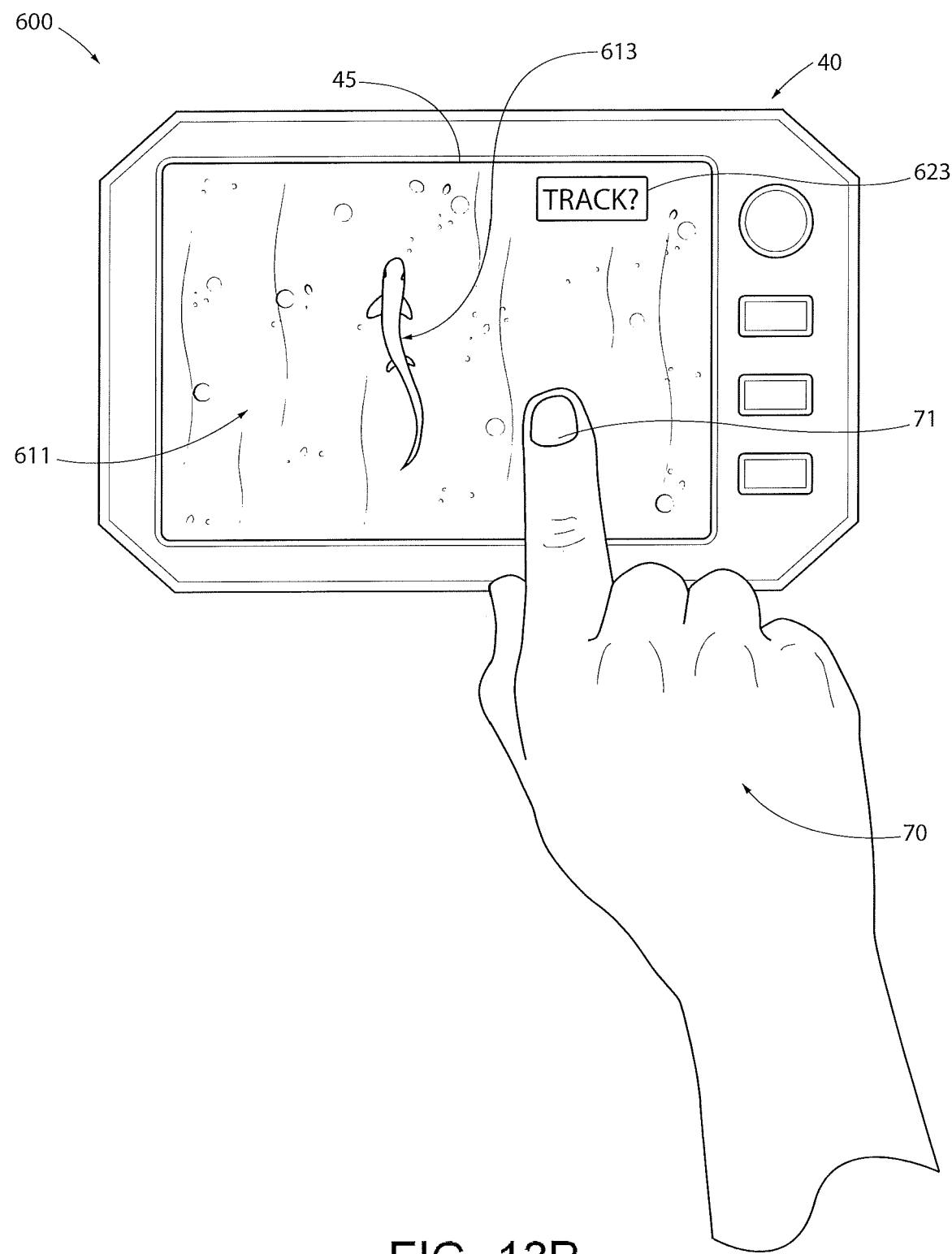
Figure 13C:
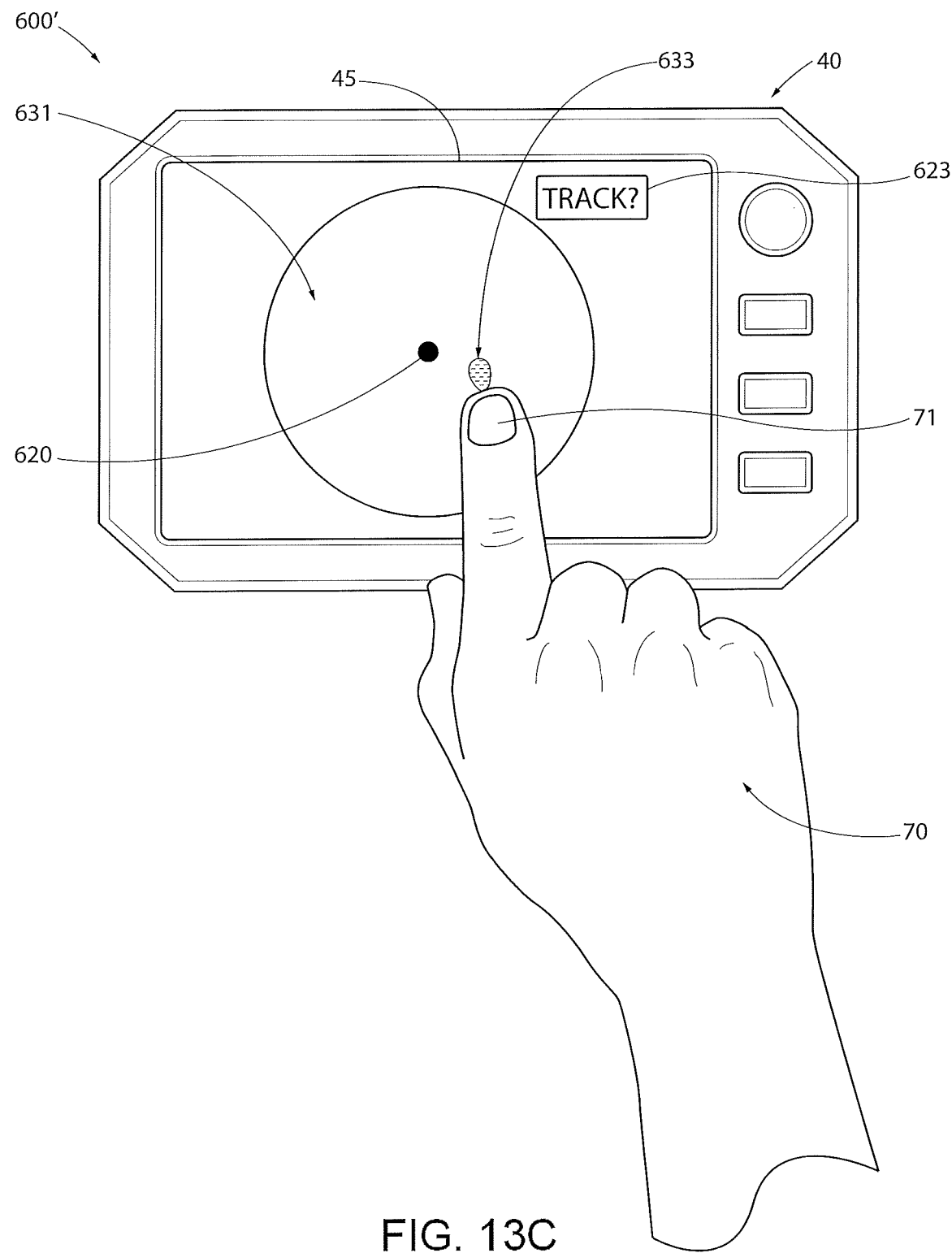
Figure 13D:
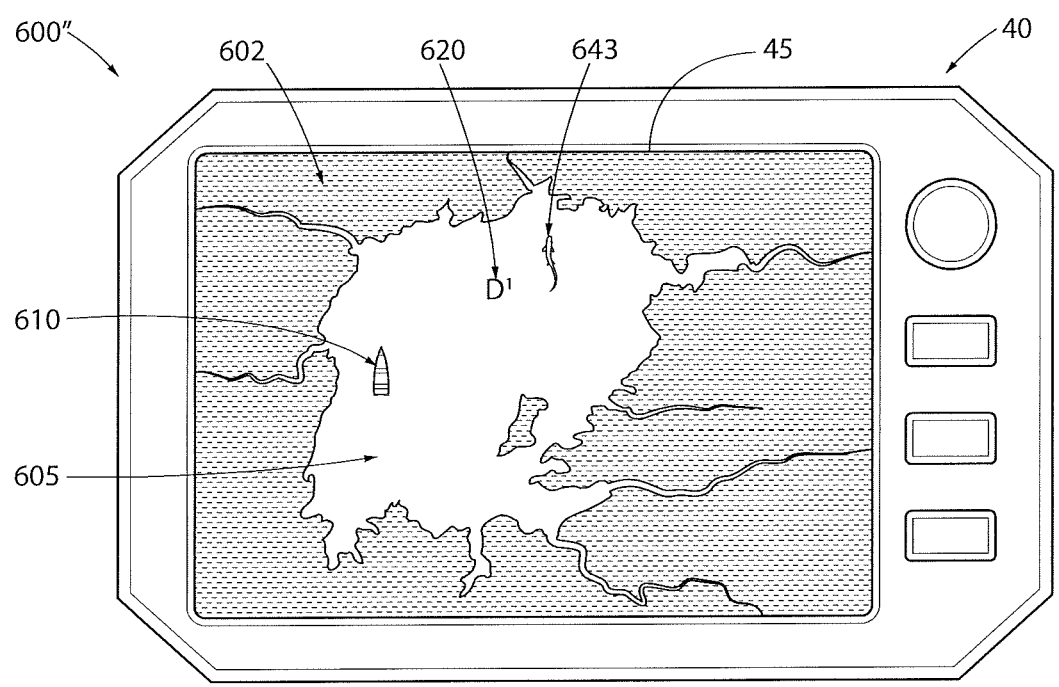
Figure 14:
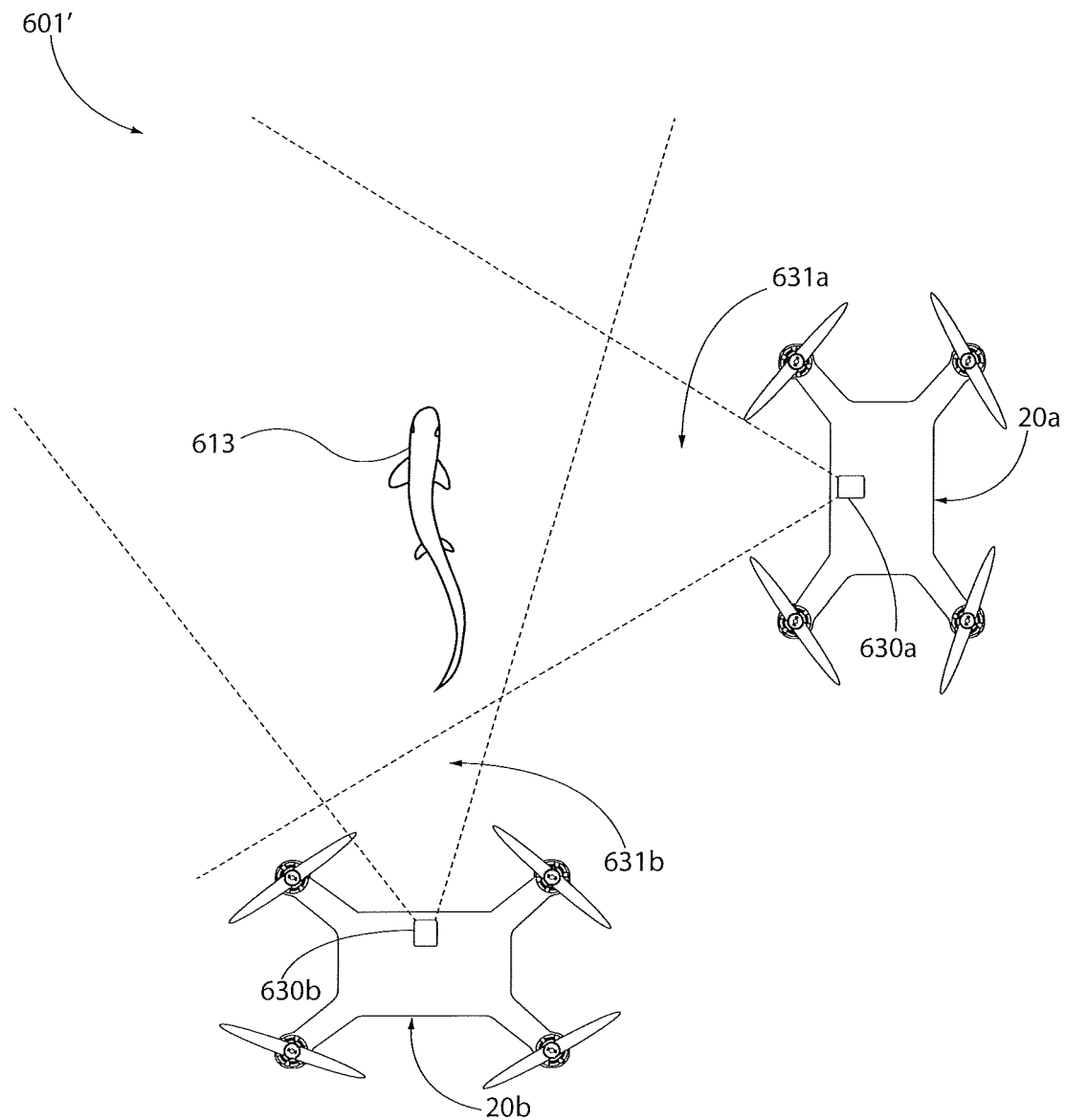
Figure 15:
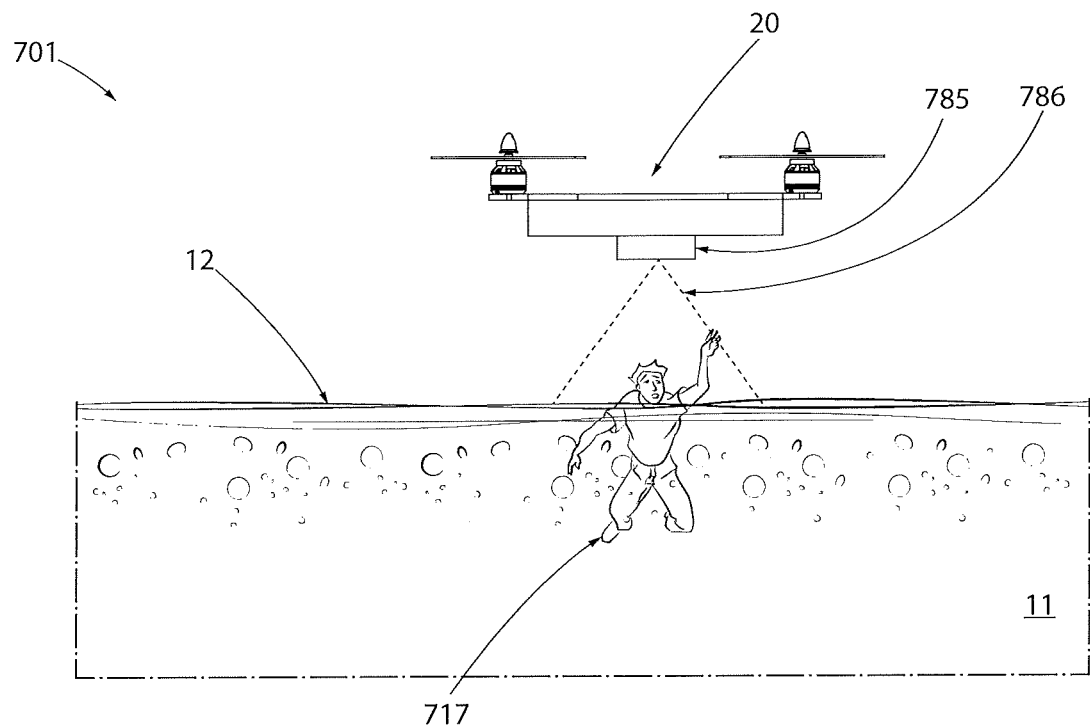
Figure 16:
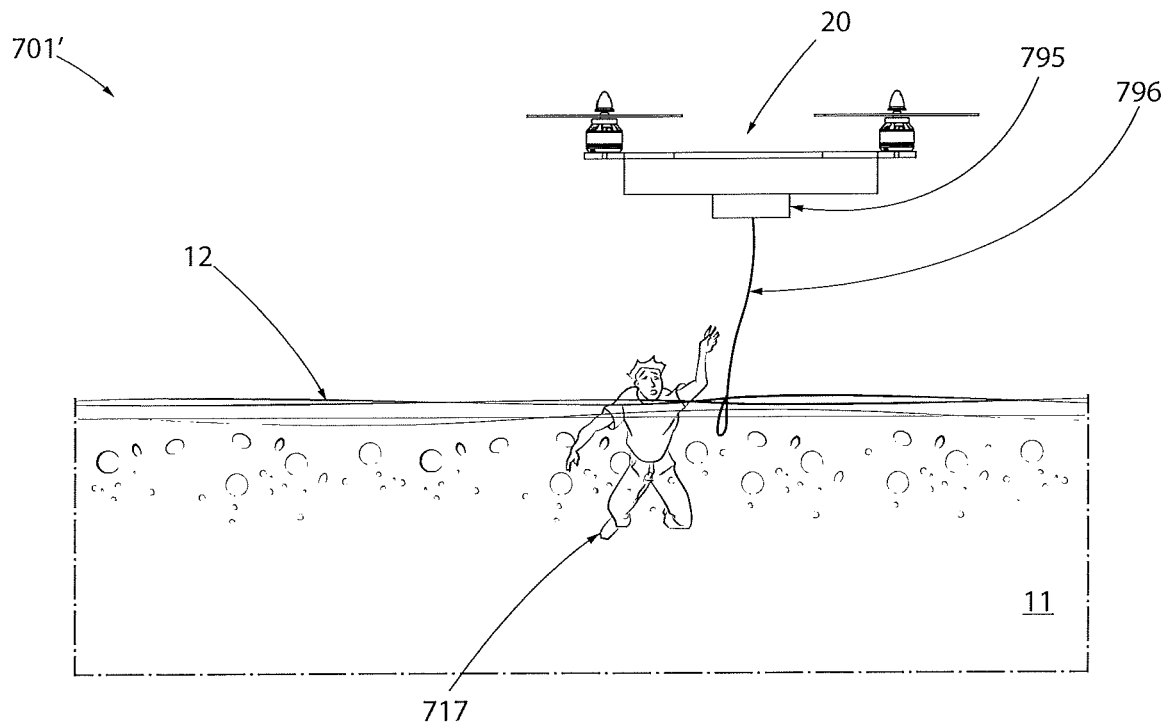
Figure 17:
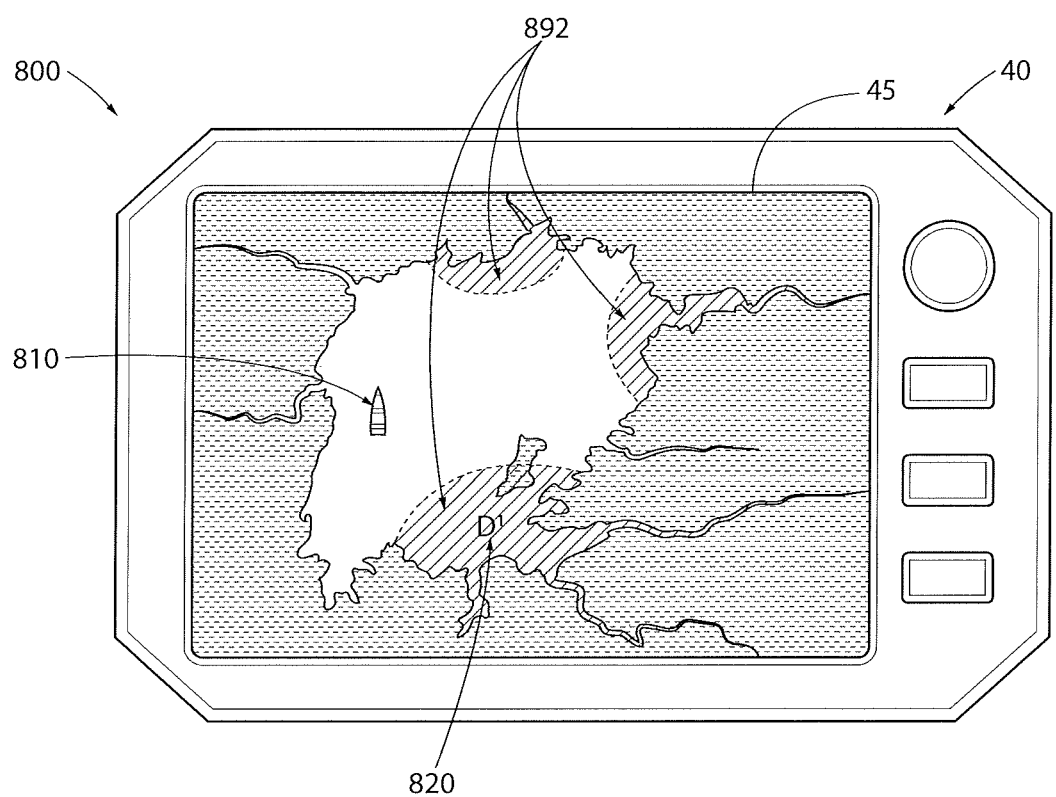
Figure 18:
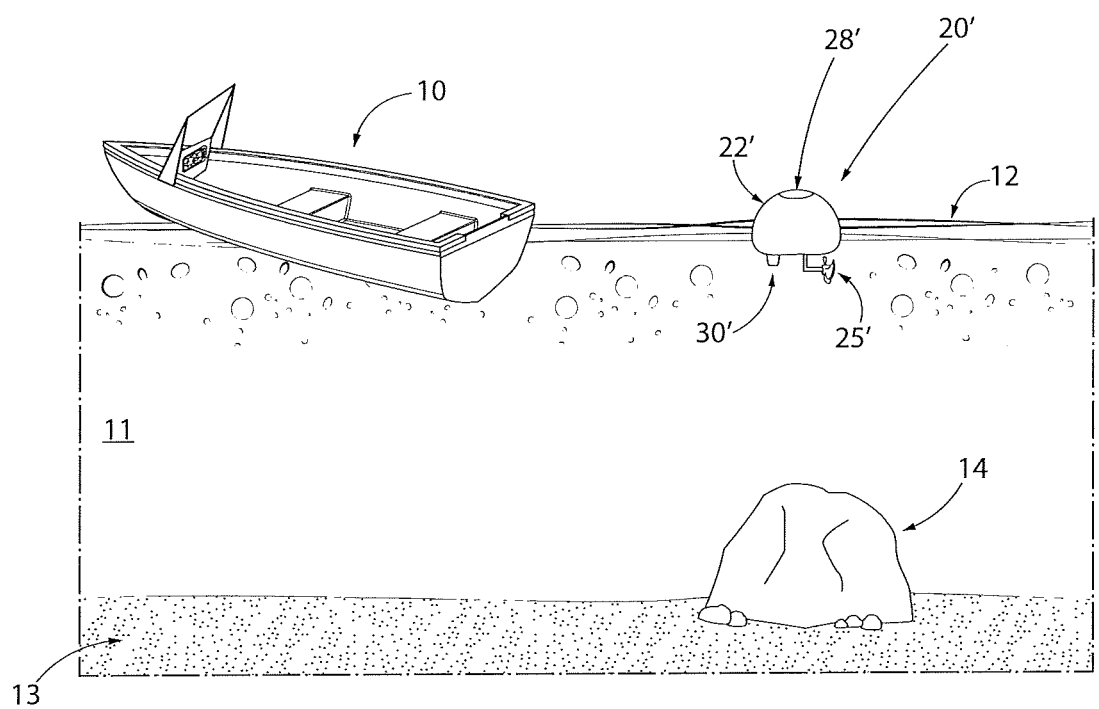
Figure 19:
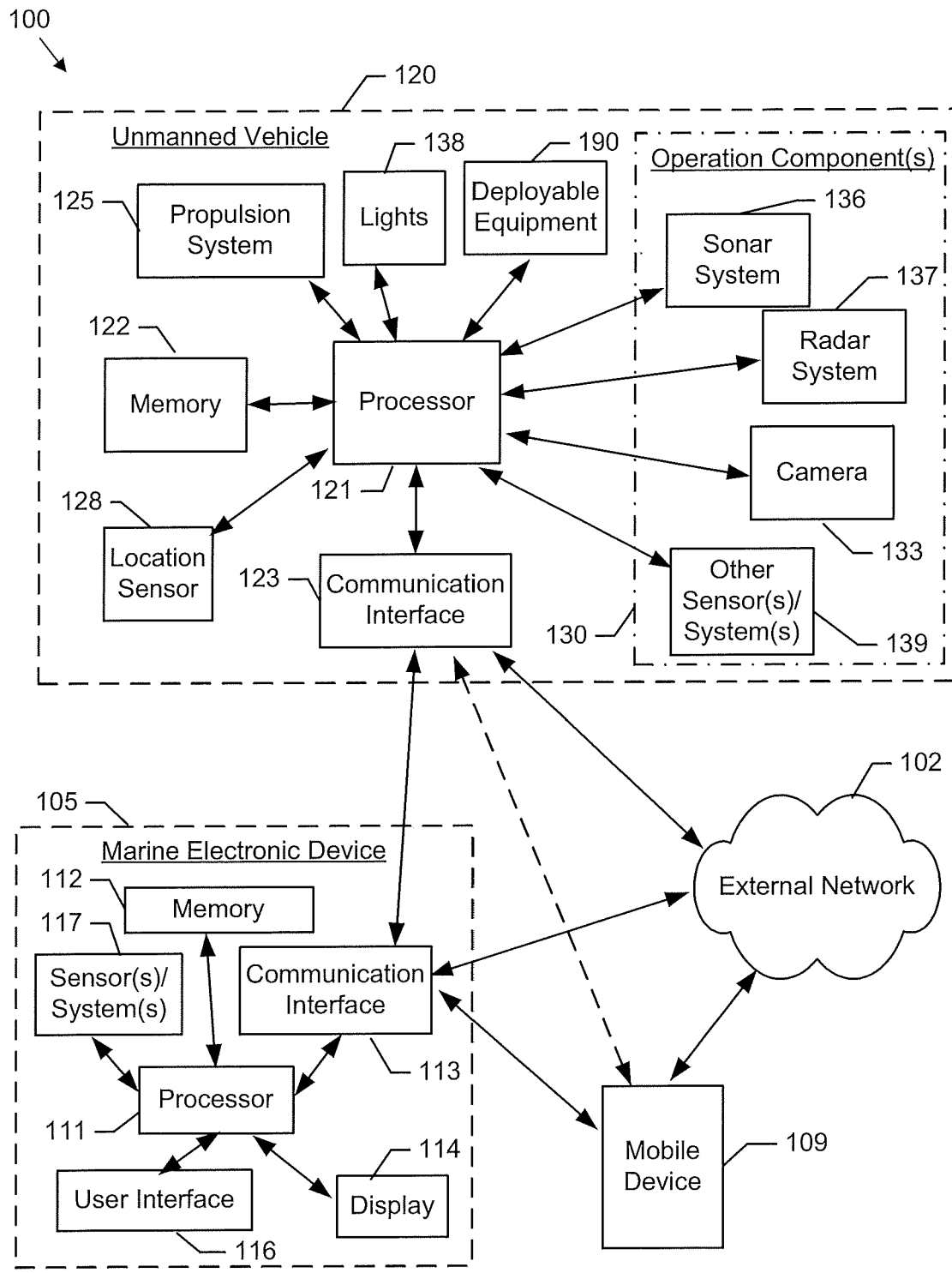
Figure 20:
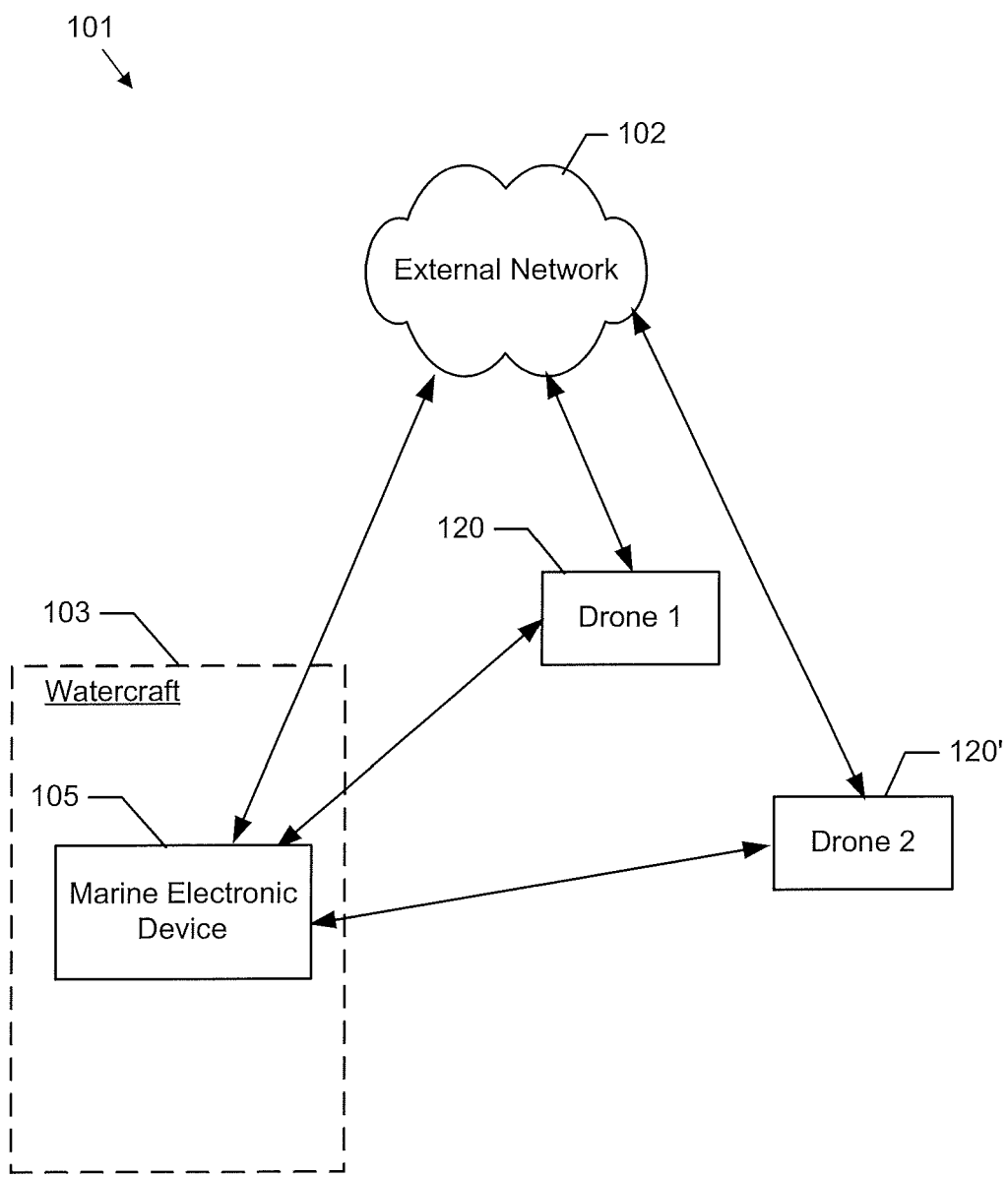
Figure 21:
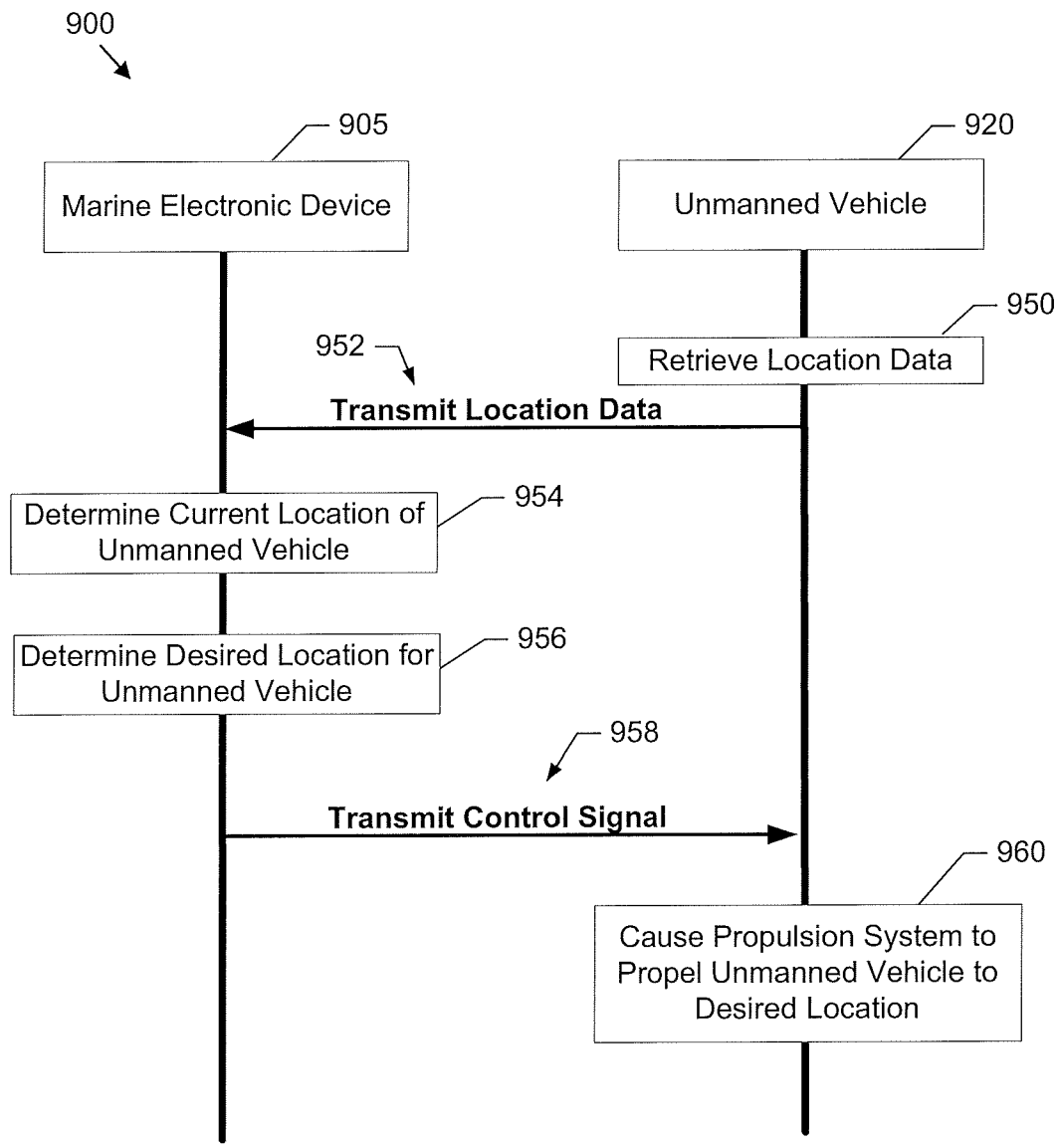
Figure 22:
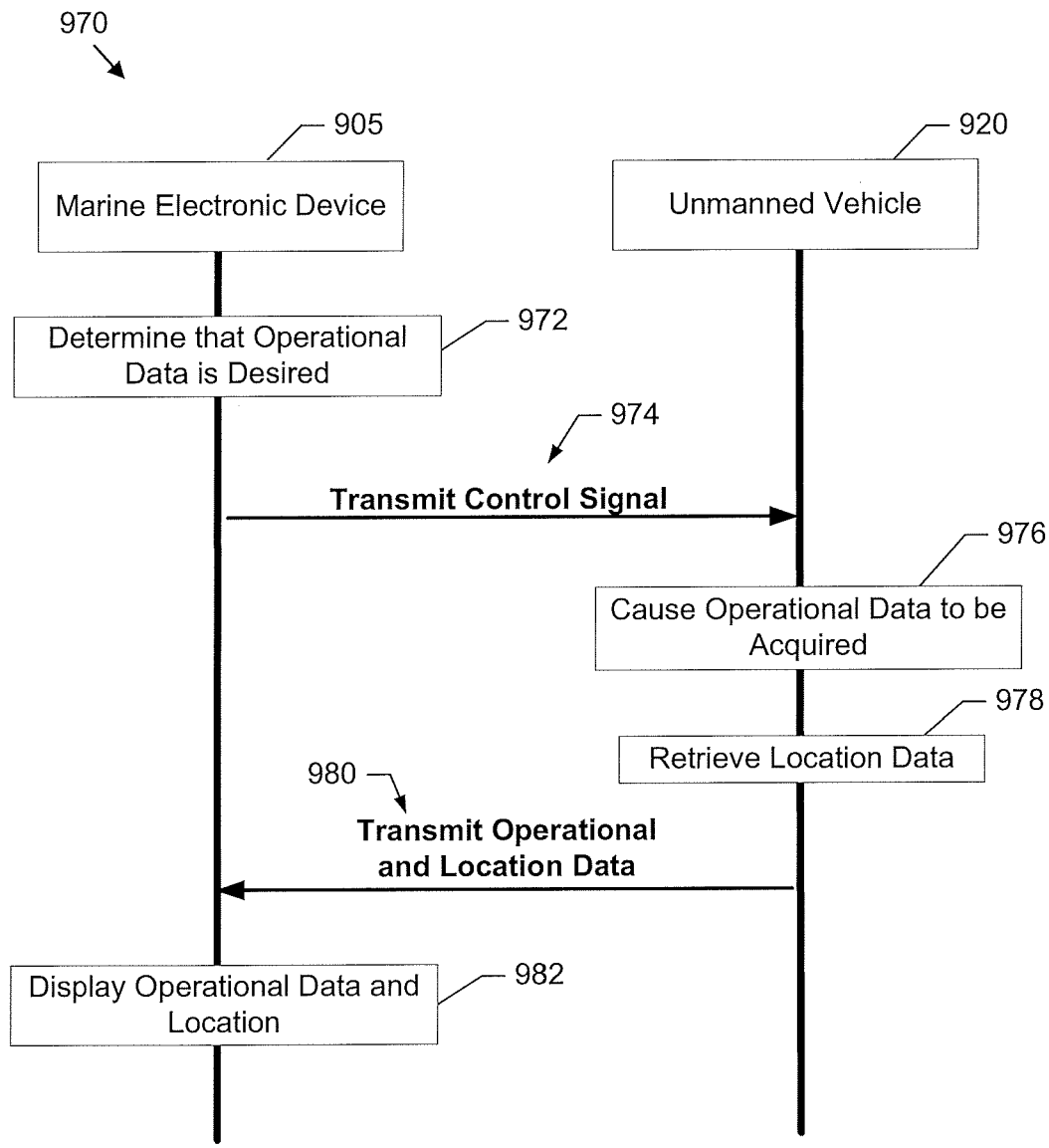

Having thus described the invention in general terms, reference will now be made to the accompanying drawings, which are not necessarily drawn to scale, and wherein:

FIG. 1 illustrates a marine environment that includes a watercraft and an unmanned vehicle, in accordance with some embodiments discussed herein;

FIG. 2A shows an example unmanned aerial vehicle, in accordance with some embodiments discussed herein;

FIG. 2B shows an example unmanned surface vehicle, in accordance with some embodiments discussed herein;

FIG. 2C shows an example unmanned submersible vehicle, in accordance with some embodiments discussed herein;

FIG. 3A shows an example screen of a marine electronic device, wherein the screen shows an example chart of a body of water with representations of a watercraft and two unmanned vehicles, in accordance with some embodiments discussed herein;

FIG. 3B shows an example screen of a marine electronic device, wherein the screen shows an example chart of a body of water with representations of a watercraft, an unmanned vehicle, and a path taken by the unmanned vehicle, in accordance with some embodiments discussed herein;

FIG. 3C shows an example screen of a marine electronic device, wherein the screen shows an example chart of a body of water with representations of a watercraft, two unmanned vehicles, and corresponding survey areas for each unmanned vehicle, in accordance with some embodiments discussed herein;

FIG. 4 illustrates an example marine environment with a watercraft and an unmanned vehicle, wherein the watercraft includes a landing site for the unmanned vehicle, in accordance with some embodiments discussed herein;

FIG. 5 illustrates a schematic of a marine environment with a watercraft and an unmanned vehicle, wherein the watercraft includes a safe landing zone for the unmanned vehicle, in accordance with some embodiments discussed herein;

FIG. 6 shows an example screen of a marine electronic device, wherein a user is drawing a safe landing zone for the unmanned vehicle, in accordance with some embodiments discussed herein;

FIG. 7A shows an example screen of a marine electronic device, wherein the screen shows video taken from the unmanned vehicle on a left portion of the screen and a chart illustrating locations of the watercraft and unmanned vehicle on a body of water on the right portion of the screen, in accordance with some embodiments discussed herein;

FIG. 7B shows an example screen of a marine electronic device, wherein the screen shows video taken from the unmanned vehicle on a left portion of the screen and a chart illustrating locations of the watercraft and unmanned vehicle on a body of water on the right portion of the screen, wherein images from the video are overlaid on the chart, in accordance with some embodiments discussed herein;

FIG. 8 illustrates a schematic of a marine environment with a watercraft and an unmanned vehicle, wherein the unmanned vehicle includes a camera that is aimed toward the watercraft, in accordance with some embodiments discussed herein;

FIG. 9A shows an example screen of a marine electronic device, wherein the screen shows sonar imagery taken from the unmanned vehicle on a left portion of the screen and a chart illustrating locations of the watercraft and unmanned vehicle on a body of water on the right portion of the screen, in accordance with some embodiments discussed herein;

FIG. 9B shows an example screen of a marine electronic device, wherein the screen shows sonar imagery taken from the unmanned vehicle on a left portion of the screen and a chart illustrating locations of the watercraft and unmanned vehicle on a body of water on the right portion of the screen, wherein the sonar imagery is overlaid on the chart, in accordance with some embodiments discussed herein;

FIG. 10A illustrates an example marine environment with a watercraft and an unmanned vehicle, wherein the unmanned vehicle has landed on the water surface and includes a transducer assembly that is emitting sonar beams into the underwater environment, in accordance with some embodiments discussed herein;

FIG. 10B illustrates an example marine environment with a watercraft and an unmanned vehicle, wherein the unmanned vehicle is hovering above the water surface and has deployed a transducer assembly into the water to emit sonar beams into the underwater environment, in accordance with some embodiments discussed herein;

FIG. 11 shows an example screen of a marine electronic device, wherein the screen shows radar imagery taken from the unmanned vehicle on a left portion of the screen and a chart illustrating locations of the watercraft and unmanned vehicle on a body of water on the right portion of the screen, in accordance with some embodiments discussed herein;

FIG. 12 illustrates an example marine environment with a watercraft and an unmanned vehicle, wherein the unmanned vehicle has landed on the water surface, in accordance with some embodiments discussed herein;

FIG. 13A illustrates a schematic of a marine environment with an unmanned vehicle, wherein the unmanned vehicle includes a camera that is aimed toward a fish underneath the water surface, in accordance with some embodiments discussed herein;

FIG. 13B shows an example screen of a marine electronic device, wherein the screen shows video taken from the unmanned vehicle, and wherein a user has indicated an object for possible tracking, in accordance with some embodiments discussed herein;

FIG. 13C shows an example screen of a marine electronic device, wherein the screen shows radar imagery taken from the unmanned vehicle, and wherein a user has indicated an object for possible tracking, in accordance with some embodiments discussed herein;

FIG. 13D shows an example screen of a marine electronic device, wherein the screen shows a body of water with representation of the watercraft, the unmanned vehicle, and an object, in accordance with some embodiments discussed herein;

FIG. 14 illustrates a schematic of a marine environment with two unmanned vehicles and an object, in accordance with some embodiments discussed herein;

FIG. 15 illustrates a marine environment with an unmanned vehicle and a person overboard, wherein the unmanned vehicle is emitting a light onto the person, in accordance with some embodiments discussed herein;

FIG. 16 illustrates a marine environment with an unmanned vehicle and a person overboard, wherein the unmanned vehicle has deployed a rope for the person, in accordance with some embodiments discussed herein;

FIG. 17 shows an example screen of a marine electronic device, wherein the screen shows a body of water with representation of a watercraft, an unmanned vehicle, and areas where wireless internet is available, in accordance with some embodiments discussed herein;

FIG. 18 illustrates an example marine environment with a watercraft and an unmanned vehicle, wherein the unmanned vehicle acts as a buoy to visually indicate a location of a desired underwater feature, in accordance with some embodiments discussed herein;

FIG. 19 shows a block diagram illustrating an example system for controlling and operating an unmanned vehicle, in accordance with some embodiments discussed herein;

FIG. 20 shows a block diagram illustrating an example environment for example systems for controlling and operating multiple unmanned vehicles, in accordance with some embodiments discussed herein;

FIG. 21 illustrates a flow control diagram of an example method of controlling and operating an unmanned vehicle to cause the unmanned vehicle to travel to a desired location, in accordance with some embodiments discussed herein; and FIG. 22 illustrates a flow control diagram of an example method of controlling and operating an unmanned vehicle to cause the unmanned vehicle to gather operational data, in accordance with some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Overview

Embodiments of the present invention contemplate many different configurations and uses of unmanned vehicles (e.g., drones) in a marine environment. FIG. 1 shows a marine vessel 10 and an unmanned vehicle 20 in a marine environment 1. As depicted, the marine vessel 10 is floating on a surface 12 of a body of water 11 and an unmanned vehicle 20 is flying nearby. In such an embodiment, the unmanned vehicle 20 is configured for flight (i.e., an unmanned aerial vehicle (UAV)). In some embodiments, as will be described in greater detail herein, the unmanned vehicle 20 may be controlled and/or operated by or through a marine electronic device 40 of the marine vessel 10.

Though the depicted embodiment of FIG. 1 shows an example marine vessel as a surface watercraft, other types of marine vessels are contemplated by embodiments of the present invention described herein (e.g., submersible marine vessels, hovercraft marine vessels, etc.).

Similarly, though the depicted embodiment of FIG. 1 shows an example unmanned vehicle as an unmanned aerial vehicle, other types of unmanned vehicles are contemplated by embodiments of the present invention described herein (e.g., unmanned surface vehicle (shown in FIG. 2B), unmanned submersible vehicle (shown in FIG. 2C, etc.). Further, the labeling of "aerial", "surface", or "submersible" is not meant to be limiting, as many unmanned vehicles are capable of more than one type of travel (e.g., aerial, surface, and submersible travel in a marine environment). The following description regarding FIGS. 2A, 2B, and 2C detail some components of unmanned vehicles that can be used in accordance with example embodiments described herein. Indeed, when an example embodiment describes an unmanned vehicle 20, functionality is not meant to be limited to any one type of travel and the unmanned vehicle 20 is meant to include possible components as described with respect to unmanned vehicle 120 in FIG. 19.

FIG. 2A illustrates a schematic representation of an example unmanned aerial vehicle (UAV) 20, which shows a possible example configuration of an unmanned vehicle 120 described further respect to FIG. 19 (and contemplated in embodiments of the present invention). The depicted unmanned aerial vehicle 20 defines a housing 22 that includes four landing elements 27 (though any number of landing elements are contemplated) that enable the unmanned aerial vehicle 20 to land (such as on land or a surface of the marine vessel). The unmanned aerial vehicle 20 also includes a propulsion system (e.g., propulsion system 125 of FIG. 19) that includes four propellers 25 (though any number or type of aerial-capable propulsion system is contemplated). The propulsion system of the unmanned aerial vehicle 20 is configured to cause the unmanned aerial vehicle 20 to fly according to its desired direction and speed. In some embodiments, this includes, for example, the ability to hover above water, fly (or travel) to a desired location/position, etc. Further, in some embodiments, the propulsion system of the unmanned aerial vehicle may be configured (through the propellers 25 or other additional or different propulsion system) to cause the unmanned aerial vehicle 20 to submerge underwater and/or travel on the surface of the water or land. In some embodiments, the housing 22 may be configured to float on the surface of the water.

As depicted in FIG. 2A, the unmanned aerial vehicle 20 may include a payload 30 (or multiple payloads). The payload 30 may be any type or number of component(s), equipment, senor(s), or system(s) (e.g., operational component(s) 130, lights 138, deployable equipment 190, location sensor 128, releasable attachment mechanism, etc.). Notably, while the payload 30 is shown near the bottom of the housing 22 of the unmanned aerial vehicle 22, any location, position, or orientation with respect to the unmanned aerial vehicle 20 is contemplated. For example, in some embodiments described herein, the payload 30 includes a sonar system (e.g., sonar system 136) that is designed to be submerged when the unmanned aerial vehicle 20 floats on the surface of the water. Further, though not shown, the housing 22 of the unmanned aerial vehicle 20 may be designed to have an accessible compartment and/or a releasable attachment mechanism such as for access by a user and/or for carrying items that may be placed into the compartment or collected.

FIG. 2B illustrates a schematic representation of an example unmanned surface vehicle 20', which shows a possible example configuration of an unmanned vehicle 120 described further respect to FIG. 19 (and contemplated in embodiments of the present invention). The depicted unmanned surface vehicle 20' defines a housing 22' that is designed to float on the surface 12 of the body of water 11. Additionally, the unmanned surface vehicle includes a propulsion system (e.g., propulsion system 125 of FIG. 19) that includes a motor 25'. The propulsion system of the unmanned surface vehicle 20' is configured to cause the unmanned surface vehicle 20' to travel along the surface of the body of water according to a desired direction and speed. In some embodiments, the propulsion system of the unmanned surface vehicle may be configured (through the motor 25' or other additional or different propulsion system) to cause the unmanned surface vehicle 20' to submerge underwater, fly, and/or travel on the surface of the land. Like the unmanned aerial vehicle 20, the unmanned surface vehicle 20' includes a payload 30'. In this regard, the payload 30' and/or housing 22' may be configured in any manner described herein in accordance with embodiments of the present invention, such as described above with respect to the unmanned aerial vehicle 20.

FIG. 2C illustrates a schematic representation of an example unmanned submersible vehicle 20", which shows a possible example configuration of an unmanned vehicle 120 described further respect to FIG. 19 (and contemplated in embodiments of the present invention). The depicted unmanned submersible vehicle 20" defines a housing 22" that is designed to be submerged under the surface 12 of the body of water 11. Additionally, the unmanned submersible vehicle includes a propulsion system (e.g., propulsion system 125 of FIG. 19) that includes a motor 25". The propulsion system of the unmanned submersible vehicle 20" is configured to cause the unmanned submersible vehicle 20" to travel underneath the surface of the body of water according to a desired direction and speed. In some embodiments, the propulsion system of the unmanned submersible vehicle may be configured (through the motor 25" or other additional or different propulsion system) to cause the unmanned submersible vehicle 20' to travel on the surface of the water or land and/or fly. Like the unmanned aerial vehicle 20, the unmanned submersible vehicle 20" includes a payload 30". In this regard, the payload 30" and/or housing 22" may be configured in any manner described herein in accordance with embodiments of the present invention, such as described above with respect to the unmanned aerial vehicle 20.

The marine environment offers many different challenges or circumstances that are not contemplated during typical operation and control of an unmanned vehicle. One such challenges is that there is a moving base of operation (e.g., the marine vessel (where the unmanned vehicle is stored, starts from, lands, charges, receives it instructions, etc.) is capable of moving). This is compounded when attempting to land to orient the unmanned vehicle with respect to the orientation of the marine vessel (which is often constantly changing). Other challenges include, for example, changing tides that cause the surface of the water to rise or drop, weather issues, limited wireless range, limited battery life, limited safe landing conditions (in a typical environment an unmanned vehicle can land almost anywhere and the operator can simply go there and pick it up), among many others.

In order to account for such challenges or circumstances and/or provide desired functionality in a marine environment, embodiments of the present invention contemplate many different configurations for operation and control of an unmanned vehicle in a marine environment. Some such configurations are described herein (though this disclosure is not meant to be limited to only the described examples, as many different uses of an unmanned vehicle in a marine environment are contemplated).

Integration with Marine Electronic Device

In some embodiments, the unmanned vehicle 120 (described further with respect to FIG. 19) may be integrated with (e.g., controlled wirelessly by) a marine electronic device 105 (described further with respect to FIG. 19) dedicated to a marine vessel. Such control can be accomplished by a user by operating the marine electronic device 105 and/or autonomously by the marine electronic device 105 such as in accordance with the functionality of the marine electronic device 105. By integrating the unmanned vehicle 120 with the marine electronic device 105, many advantages can be realized. The functionally of the marine electronic device 105, such as the navigation system (stored waypoints, routes, etc.), alert systems, control systems, processing, etc., can be utilized with or by the unmanned vehicle (and components thereof). Additionally, operations can be performed automatically by the unmanned vehicle (i.e., without a user having to manually remote operate the unmanned vehicle). This can be useful to extend the range of the unmanned vehicle (which normally would be limited based on the user's sight), thereby saving time and travel by the marine vessel. Automation also allows the user to perform other tasks.

Further, integration with the marine electronic device 105 allows for display of information regarding the unmanned vehicle on one or more displays controlled by the marine electronic device. Thus, information can be displayed where most useful for a user, such as on a display that also offers other pertinent information about operating the marine vessel or using various features thereof. For example, as will be described in greater detail herein, the position of the unmanned vehicle may be displayed with respect to the marine vessel on a chart on the screen of the marine electronic device 105. In another example, sonar data from the unmanned vehicle may be displayed on the same screen as a chart showing the position of the unmanned vehicle relative to the marine vessel. In a further example, the user is able to toggle between a video streaming in from the unmanned vehicle and motor/operation details for the marine vessel itself (such as may be used for driving the marine vessel safely).

In some embodiments, such operation (e.g., manual remote control or setting up future autonomous control) of the unmanned vehicle 120 can take place by the user directly interacting with the marine electronic device 105 or indirectly interacting with the marine electronic device 105 through a remote device (such as a mobile device/smart phone 109).

Navigation

In some embodiments, the unmanned vehicle 120 may include a location sensor 128 and/or navigation system. For example, the unmanned vehicle may be configured to utilize the location sensor 128 to determine location data indicative of a current location of the unmanned vehicle 120. Additionally, in some embodiments, the unmanned vehicle may be configured to determine a location corresponding to a desired location such that it knows how to travel to the desired location (e.g., the unmanned vehicle may determine a relative position of a desired location versus its current location to determine the direction (including altitude, height, depth, etc.) to travel to reach the desired location).

In some embodiments, the unmanned vehicle 120 may be configured to communicate with and/or be controlled/operated by a marine electronic device 105. In such a configuration, the marine electronic device 105 may be configured to utilize one or more features (such as its navigation system and stored data therein) to control and/or operate the unmanned vehicle.

In some embodiments, the unmanned vehicle 120 may be configured to transmit the location data indicative of its current location to a marine electronic device 105. With the location data, the marine electronic device 105 may be configured to determine the current location of the unmanned vehicle.

Additionally, in some embodiments, the marine electronic device 105 may be configured to determine other information regarding the location data provided by the unmanned vehicle, such as the distance to the location data, direction to the location data, weather or other information regarding the current location of the unmanned vehicle, etc. Notably, depending on the desired information/data, constant updating may need to occur as the marine vessel travels (since the base of operation of the unmanned vehicle moves on the body of water). Further, in some embodiments, marine environment information may be taken into account. For example, when measuring a distance to the unmanned vehicle, the distance may be measured according to travel time of the marine vessel to that location (which may include traveling around rocks or other hazards).

Further, along these lines, and in conjunction with additional functionality of the marine electronic device 105 (such as described in greater detail herein), some embodiments contemplate providing additional information to the user. For example, the marine electronic device 105 may interact with components of the marine vessel to determine data pertinent for a user to decide whether to travel to the location of the unmanned vehicle 120 and/or how to operate/control the unmanned vehicle. Such pertinent data may include, for example, fuel level, expected fuel used to travel to the location, battery life and/or fuel of the unmanned vehicle (which may indicate the need to travel to the unmanned vehicle to pick it up), time associated with traveling to the location of the unmanned vehicle, time associated with the unmanned vehicle returning to the marine vessel, intercept time with both the marine vessel and the unmanned vehicle traveling, among others. Such pertinent data may be displayed to the user to enable the user to decide how to operate the marine vessel and/or the unmanned vehicle.

For example, in some embodiments, the marine electronic device 105 may track the unmanned vehicle in relation to the marine vessel (e.g., its base) and provide an indication to a user if the unmanned vehicle has (or will soon) exceed its range of operation (which can be determined based on communication range, fuel gauge, battery life, wind conditions, etc.). Further, information regarding corrective measures (e.g., where to send the unmanned vehicle and/or marine vessel) may be provided to the user and/or propulsion systems of the marine vessel and/or unmanned vehicle. Such corrective measures may include sending the unmanned vehicle to another location such as for a safe landing (e.g., on a dock, in shallow water, near another marine vessel, etc.).

In some embodiments, the marine electronic device 105 may be configured to cause display of navigation or other related data on a screen (e.g., display 114). In this regard, in some embodiments, the marine electronic device 105 may be configured to display the current location of the marine vessel with respect to one or more unmanned vehicles (e.g., from location data gathered from the unmanned vehicle(s)).

For example, FIG. 3A shows an example marine electronic device 40 that includes a user interface 42 with a screen 45 and one or more buttons/knobs (e.g., knob 44, buttons 46a, 46b, and 46c). The buttons/knobs may, in some configurations, be utilized by a user to control operation of the marine electronic device 105 (and/or unmanned vehicle(s) by extension including direct control of the propulsion system of the unmanned vehicle). Additionally or alternatively, the user interface 42 may be configured to receive user input directly to the screen 45 such that it is touch screen.

FIG. 3A depicts a chart 200 that shows a body of water 205 and relative land 202 around the body of water (including the island in the middle of the body of water). The chart 200 also shows a representation of the marine vessel 210 at a current location on the body of water 205. Additionally, such as based on received location data, the chart 200 shows representations of one or more unmanned vehicles 220. In some embodiments, such as in the situation where there are more than one unmanned vehicle, the chart 200 may be configured to provide a distinction between the unmanned vehicles such as with numbers 1, 2, etc. (though other distinguishing display characteristics are contemplated—including, for example, colors, patterns, symbols, names, etc.). In this regard, a user can easily determine the relative location of the unmanned vehicle with respect to the marine vessel and/or body of water (even in the circumstance when the unmanned vehicle is otherwise not visible to the user directly).

In some embodiments, the marine electronic device 105 may be configured to include or act as a navigation system. In this regard, the marine electronic device 105 may utilize different components (e.g., one or more processors, one or more various sensors, memory, user interface, etc.) to store, create, and/or determine various navigation related features, such as routes, waypoints, survey/scan areas, among others. In some embodiments, navigation data that is stored and/or utilized by the marine electronic device 105 for use by the marine vessel may also be utilized for operation and control of the unmanned vehicle. In this regard, the unmanned vehicle 120 can be controlled autonomously and/or remotely operated using the pre-stored navigation data—increasing functionality and ease of use by a user.

In such a regard, in some embodiments, the marine electronic device 105 may be configured to determine one or more desired location(s) for the unmanned vehicle 120 based on a planned route or waypoint stored in the memory of the marine electronic device 105. In some embodiments, the marine electronic device 105 may be configured to use the determined current location of the unmanned vehicle 120 in that determination of the desired location(s)—such as to check the current location of the unmanned vehicle 120 along a planned route and/or track the unmanned vehicle 120 with respect to the navigation related data.

In some embodiments, the marine electronic device 105 may be configured to determine one or more routes for travel by the unmanned vehicle. Such routes (and/or a single desired location) may be determined based on pre-stored routes or waypoints, current gathered information (e.g., weather data, sonar data, current operations of the unmanned vehicle (e.g., tracking an object, returning to the marine vessel, intercepting another marine vessel or unmanned vehicle), among others). For example, the marine electronic device 105 may utilize information gathered from an automatic identification system (AIS) to form a route for the unmanned vehicle such as to intercept another marine vessel and/or unmanned vehicle whose location was determined from the AIS data. In another example, the marine electronic device 105 may utilize the current location (and/or speed, heading, etc.) of the marine vessel (which has the marine electronic device 105 attached) to form a route for the unmanned vehicle 120 such that it may return to the marine vessel. In some embodiments, such as when the marine vessel is stationary, the marine electronic device 105 may simply provide the current location of the marine vessel to the unmanned vehicle to cause it to return to the marine vessel. In some embodiments, the marine electronic device 105 may be configured to cause the unmanned vehicle 105 to return to the marine vessel based on user input indicating such a desire—such as by a user selecting a "Get Drone Back" option (or the like).

In some embodiments, the marine electronic device 105 may be configured to determine one or more routes for the unmanned vehicle 120 based on user input provided to the marine electronic device 105 defining the one or more routes. In this regard, a user can interact with the marine electronic device 105 to create a route for the unmanned vehicle 120.

In some embodiments, the marine electronic device 105 may be configured to generate one or more waypoints based on location data and/or other data provided by the unmanned vehicle 120. In some embodiments, the waypoint may be inputted or caused to be generated through user input to the marine electronic device 105.

In some embodiments, the marine electronic device 105 may be configured to form and/or transmit one or more control signals with instructions for the unmanned vehicle. In some embodiments, the control signal may include navigation related instructions such as providing instructions to the unmanned vehicle 120 to travel to a determined desired location. Depending on the configuration and/or the desired outcome, the control signal may include any type of instructions for traveling to a desired location, such as any type of desired location data (e.g., coordinates, latitude and longitude, direction and speed data for the unmanned vehicle, etc.). Further, in some embodiments, multiple locations may be sent as a single set of instructions to the unmanned vehicle 120 to cause the unmanned vehicle 120 to travel along a route or as part of a survey/scan (described in greater detail below). In such an embodiment, the unmanned vehicle 120 may include a navigation system onboard such that it can travel without further instruction from the marine electronic device 105. Alternatively, in some embodiments, a series of control signals may be transmitted to the unmanned vehicle 120 to cause the unmanned vehicle 120 to travel along a route. In some such cases, each consecutive control signal may be sent as the marine electronic device 105 determines that the unmanned vehicle 120 has reached a certain point (e.g., a waypoint) along the route.

In some embodiments, the marine electronic device 105 may be configured to transmit the one or more control signals to the one or more unmanned vehicle 120. Such control signal(s) may be transmitted automatically or in response to user input. For example, a user may interact with a waypoint of a chart. A drop down menu could display that includes a selection for sending a drone to the waypoint. Upon selection by the user, the unmanned vehicle 120 may travel to the location of the waypoint based on instructions sent by the marine electronic device 105. Similar methodology could be applied for any type of navigation related instruction (e.g., routes, survey patterns, etc.).

In some embodiments, the marine electronic device 105 may provide navigation instructions to the user for remote control of the unmanned vehicle 105. Such instructions may be displayed on the display of the marine electronic device 105 and/or on any other display (such as the display of a mobile device) for use by the operator of the unmanned vehicle 120 to travel according to the instructions.

In some embodiments, the unmanned vehicle 120 may be configured to receive the one or more control signals with instructions for travelling to one or more desired locations. In response, the unmanned vehicle 120 may cause the propulsion system to propel the unmanned vehicle according to the instructions, such as toward the desired location.

In some embodiments, the control signal may include additional navigation-related instructions regarding how to travel to the desired location (e.g., speed, altitude, operate component(s) while traveling, operate component(s) upon arrival, etc.). In response to receiving the control signal with the additional instructions, the unmanned vehicle 120 may cause it(s) various systems (e.g., the propulsion system, operational components, etc.) to operate accordingly to cause the unmanned vehicle 120 to travel to the desired location (and/or operate) according to those instructions. In some embodiments, the marine electronic device 105 may be configured to track the unmanned vehicle 105 such as it travels according to the instructions from the one or more control signals.

In some embodiments, the marine electronic device 105 may be configured to display the route and/or waypoints with respect to the unmanned vehicle 120 (and/or the marine vessel) for use by the operator. Such display may occur on a screen of the marine electronic device 105 or any other screen (e.g., a screen of a mobile device of the user). FIG. 3B shows one such example. In particular, FIG. 3B depicts a chart 200 that shows a body of water 205 and relative land 202 around the body of water. The chart 200 also shows a representation of the marine vessel 210 at a current location on the body of water 205. Additionally, such as based on received location data, the chart 200 shows a representation of an unmanned vehicle 220. Further, the chart 200 shows a portion of a route 230 that the unmanned vehicle 220 has traveled (shown in solid line) and a planned/proposed portion of the route 232 that the unmanned vehicle 220 is scheduled to travel (shown in dotted line). In this regard, a user of the marine electronic device 105 may easily track the current and planned travel of the unmanned vehicle 120. Though the depicted embodiment uses separate patterns for portions of the route, other display types are contemplated for showing the various navigation-related features.

In some embodiments, the marine electronic device 105 may be configured to display other data regarding the unmanned vehicle 120 (or its travel) to the user. For example, the marine electronic device 105 may determine (e.g., through its own sensors/systems or from the unmanned vehicle 120) information (e.g., navigation related, operation related, etc.) about the unmanned vehicle. For example, the marine electronic device 105 may determine and display information such the speed of the unmanned vehicle, altitude, current status of any operational components of the unmanned vehicle, current direction of travel of the unmanned vehicle, fuel gauge or other propulsion system information of the unmanned vehicle, among others.

In some embodiments, the marine electronic device 105 may be configured to determine one or more survey or scan patterns for one or more unmanned vehicles 120. Such determination may be based on navigation data stored on the memory of the marine electronic device. In some embodiments, the user may interact with the marine electronic device 105 to create the survey/scan patterns. For example, the user may draw the survey/scan pattern on the user interface for each unmanned vehicle 120 (such as with respect to the chart). In some embodiments, the survey/scan pattern may simply be selected based on pre-set patterns. As described in greater detail herein, the unmanned vehicle 120 may operate one or more of its operational (or other) components while traveling the survey/scan patterns.

In some embodiments, the marine electronic device 105 may be configured to display the various survey/scan patterns along with the current location(s) of the one or more unmanned vehicles 120. FIG. 3C shows an example chart 200 with representations for the marine vessel 210 and two unmanned vehicles 220. Additionally, the chart 200 shows survey patterns 238 for each unmanned vehicle 220. As shown in the depicted embodiment, the survey patterns 238 can vary (for example, the survey pattern on the right has been determined such the unmanned vehicle travels near an island of the body of water). As will be described in more detail herein, the unmanned vehicle(s) 120 may be configured to gather operational data and provide the operational data to the marine electronic device 105 as they travel along the survey pattern.

In some embodiments, the marine electronic device 105 may be configured to cause the marine vessel to track, follow, or go to the unmanned vehicle 120. In such an embodiment, the marine electronic device 105 may determine the current location of the unmanned vehicle 120 and provide instructions to one or more autopilots (or an operator via a display) to enable/cause the marine vessel to travel toward/after the unmanned vehicle 120. As will be described in greater detail herein, such an embodiment may be even more robust by utilizing the various functionality of the unmanned vehicle. For example the unmanned vehicle 120 may be tracking an object, detecting fish, checking depths ahead of the marine vessel, checking wind conditions, scouting, etc.

Landing Operations

In some embodiments, the unmanned vehicle 120 may be configured to land on a marine vessel, such as the marine vessel associated with the marine electronic device 105. However, landing on a marine vessel in a marine environment (or elsewhere, such as on the water surface or other object in the marine environment) can be difficult and many challenges are presented. For example, the marine vessel may be moving itself (whether by its own propulsion system or by wave activity). Additionally, marine vessels tend to have limited open space on their decks or with respect to their main cabins—thereby providing limited landing space. Moreover, there may be obstacles (such as antennas, fly bridges, etc.) that may block certain paths or altitudes during the landing operation. Further still, remote control operation during landing may be difficult, as visibility may be limited by the operator due to any number of factors (limited space on the marine vessel, limited maneuverability of the operator on the marine vessel, location of the marine electronic device with respect to the landing pad, weather, etc.). Likewise, if the unmanned vehicle is landing on the water surface, the surface itself may be choppy (such as from increased wave activity), thereby making a landing on the water surface difficult. This, like on the marine vessel, may be complicated by decreased visibility of an operator due to distance or other factors (such as weather). As such, some embodiments of the present invention contemplate configurations of the unmanned vehicle 120 and/or marine electronic device 105 that enable easy landing in a marine environment, including on a marine vessel.

In some embodiments, the marine electronic device 105 is configured to determine that the unmanned vehicle 120 should perform a landing operation. In some embodiments, the marine electronic device 105 is configured to receive an indication by a user of a desire to land the unmanned vehicle 120. Such an indication, in some embodiments, may be provided to the user interface of the marine electronic device 105 or from a remote device interacting with the marine electronic device 105 (e.g., a mobile device). Alternatively, the marine electronic device 105 may determine based on stored protocol or a current situation that the unmanned vehicle 120 should perform a landing operation. For example, the marine electronic device 105 may determine that the unmanned vehicle 120 has completed scheduled tasks and/or travel and has reached the next operation of landing. In another example, the marine electronic device 105 may determine that the unmanned vehicle 120 has a low fuel or battery level (e.g., below a predetermined threshold)

and may automatically initiate its return to the marine vessel and/or a landing operation. Additionally or alternatively, in some embodiments the unmanned vehicle 120 may itself determine that is should perform a landing operation (such as through direct remote operation by a user (without the marine electronic device 105) and/or in response to certain situations (such as those described above or others)).

In some embodiments, the marine electronic device 105 may be configured to transmit a control signal to the unmanned vehicle 120 with instructions to perform a landing operation. Depending on the situation and the configuration of the unmanned vehicle and/or marine environment, the landing operation may be performed anywhere. For example, the unmanned vehicle 120 may be instructed or may determine to land on the water surface. In another example, the unmanned vehicle 120 may be instructed or may determine to land on a dock or other object. Very often, however, the unmanned vehicle 120 may be instructed or may determine to land on a marine vessel (e.g., the marine vessel associated with the marine electronic device 105). However, as noted above, there can be many difficulties with landing in a marine environment.

In order to account for some of the difficulties in landing on a marine vessel, in some embodiments, the marine electronic device 105 may be configured to determine certain information with respect to the marine vessel or its current location. For example, the marine electronic device 105 may be configured to determine a location where the landing operation is to take place (which may be the current location of the marine vessel or a future location of the marine vessel (e.g., the marine vessel and unmanned vehicle may intercept)). Additionally, the marine electronic device 105 may be configured to determine other pertinent landing related information regarding the marine vessel, such as the speed of travel of the marine vessel, the direction of travel of the marine vessel, the orientation of the marine vessel, position, altitude, and/or orientation of the landing pad on the marine vessel, applicable landing zone (described in greater detail below), among others. Additionally or alternatively, the marine electronic device 105 may be configured to determine further pertinent landing related information corresponding to the planned location of the landing operation, such as the weather, the sea level, wind conditions, nearby hazards or objects (which may block an approach vector), among others.

In some embodiments, the marine electronic device 105 may be configured to determine instructions to provide to the unmanned vehicle 120 in order for the unmanned vehicle 120 to perform the landing operation. For example, such instructions may include instructions on the appropriate landing approach for the unmanned vehicle 120 to take. This could include any number of different instructions, including, for example, where to travel, how fast to travel, the altitude to travel at, when to change altitude, when to slow down, the orientation that the unmanned vehicle 120 needs to take during the approach, among many others.

In some embodiments, such instructions may take into account one or more of the location of the landing operation and additional determined pertinent landing-related information (e.g., for the marine vessel and/or the location). In some embodiments, the marine electronic device 105 is configured to transmit a control signal with the instructions to the unmanned vehicle 120 to cause it to perform the landing operation accordingly. In some embodiments, the marine electronic device 105 may transmit a control signal that includes at least some of the gathered landing-related information, and the determination of the operations needed to perform the landing operation by the unmanned vehicle 120 can be performed on the unmanned vehicle 120.

In response to receiving the control signal with the instructions for performing the landing operation (which may include landing approach instructions), the unmanned vehicle 120 may be configured to perform the landing operation. In some embodiments, the landing operation may be performed using various systems of the unmanned vehicle 120, such as the propulsion system, other system(s) or sensor(s), etc. Depending on the instructions, the landing operation may take into account additional landing-related information (as described above). In such a regard, the unmanned vehicle 120 may cause its systems to perform the landing operation by propelling the unmanned vehicle 120 based on such landing-related information (e.g., the location of the marine vessel, the speed of travel of the marine vessel, the direction of travel of the marine vessel, etc.).

In some embodiments, the unmanned vehicle 120 may be configured to land on the marine vessel, such as on a deck, on a fly bridge, in a docking station, on a landing pad, etc. Depending on the configuration, the landing pad/area for the unmanned vehicle 120 may be any position and/or orientation on the marine vessel. In this regard, in some embodiments, the unmanned vehicle 120 may be configured to land and/or dock in a storage or partial storage configuration such that the landing pad/area is designed to receive the unmanned vehicle 120 in a certain orientation (or various certain orientations). Further, depending on the type and size of the marine vessel, the landing pad/area may be at a certain altitude that can be accounted for during landing. For example, the height of the marine vessel may be large and the landing pad/area may be positioned at a certain altitude or height (such as on a fly bridge or captain's deck), which may be accounted for when instructions are provided to the unmanned vehicle 20 for landing.

FIG. 4 depicts a marine vessel 10 and unmanned vehicle 20 in a marine environment 201. In the depicted example, the marine vessel 10 has a landing pad 227 near the front of the marine vessel 10. However, the landing pad 227 is positioned on the marine vessel 10 such that it is oriented slightly differently than directly forward (from the marine vessel's perspective). As shown in FIG. 4, the marine vessel 10 is traveling at a speed and in a direction as indicated by arrow 207 (such as using a motor 17).

In order to perform a landing operation, the unmanned vehicle 20 must take into account a number of things. For example, the unmanned vehicle 20 must account for (and perhaps match) the direction and speed of the marine vessel 10 so that a successful landing can occur. For example, the marine vessel 10 may be moving, and so in order to set down smoothly or dock smoothly, the unmanned vessel 10 may approach the marine vessel such that it is travelling at or close to the speed of the marine vessel and in the direction of travel of the marine vessel. This enables minor corrections or variations to be performed by the unmanned vehicle 120 to accomplish a smooth landing.

Further, however, as indicated above, the landing pad/area of the marine vessel may require the unmanned vehicle 120 to land in a certain orientation. In this regard, the instructions may need to account for changing the orientation of the unmanned vehicle with respect to the marine vessel so as to align with the orientation of the landing pad/area.

Notably, however, it is important to consider the difference between using a marine vessel centric system (e.g., considering movement/speed/direction/orientation from the perspective of the marine vessel) and a geo centric system (e.g., considering movement/speed/direction/orientation from the perspective of the earth). Indeed, this difference must be taken into account when providing instructions to the unmanned vehicle 120 for landing. For example, if the both the unmanned vehicle 120 and the marine vessel with the marine electronic device 105 are traveling along, there may only need to be a slight change in location or altitude between the two in order to perform the landing operation (i.e., in the case where the unmanned vehicle is close to landing). However, when providing instructions to the unmanned vehicle, some embodiments account for the speed/direction/orientation it is currently traveling. To explain, the instructions may need to figure out how to maneuver the unmanned vehicle 120 to account for the slight change, but still account for the moving marine vessel (as the desired landing spot is still moving from a geo centric standpoint). In this regard, there is a conversion from a marine vessel centric system to a geo centric system.

In some embodiments, in order to aid in performance of the landing operation, the unmanned vehicle 120 and/or the landing pad/marine vessel may have one or more landing sensors. In some embodiments, the landing sensors may be configured to monitor a proximate position of portions of the unmanned vehicle 120 and provide feedback to aid in a proper landing. For example, with reference to FIG. 4, the unmanned vehicle 120 may have a housing with four landing sensors 29a-d. Each landing sensor 29a-d may be associated with a corner of the unmanned vehicle 20 such that an outline of the general footprint of the unmanned vehicle 20 is monitored. Likewise, the landing pad 227 may have corresponding landing sensors 229a-d that correspond to the landing sensors 29a-d on the unmanned vehicle 20. During the landing operation, the landing sensors can be utilized to achieve a proper landing. In this regard, in some embodiments, general instructions can be provided to the unmanned vehicle 120 to operate it to get "close" to the landing pad, and then the feedback from the landing sensors can be used to finalize the landing.

Though the above described example includes matching landing sensors between an unmanned vehicle and a landing pad for aiding in landing, other types of sensors or systems are contemplated by embodiments of the present invention. Further, the sensors or systems can be positioned on the unmanned vehicle, on the marine vessel, proximate the landing pad, or combinations thereof. An additional example sensor or system to aid in landing includes one or more optical sensors that can be used with object recognition to aid in instructing the unmanned vehicle 120 for achieving a proper landing. Along similar lines, in another example, one or more visual markers can be positioned on the marine vessel such that the unmanned vehicle (through object recognition) can discern and use the visual markers to aid in landing. Another example sensor or system to aid in landing includes utilizing light beams with distinguishable colors (e.g., red and green) to provide visually recognizable instructions or information (e.g., the unmanned vehicle is approaching from the right).

Depending on the position of the landing area on the marine vessel and/or configuration of the marine vessel, there may be obstacles or other considerations that make it undesirable/impossible for the unmanned vehicle 120 to approach the marine vessel from certain angles, altitudes, directions, etc. For example, there may be a mast that would prevent approach by an unmanned vehicle 120 from the rear of the marine vessel. Similarly, the user may be fishing off to one side of the marine vessel and may want the unmanned vehicle to avoid this area during landing or otherwise. As such, some embodiments of the present invention contemplate a landing zone that defines a safe approach/landing area or volume. Such landing zone may include any safe zone definitions including, for example, safe altitudes, minimum altitude, angles of approach, combinations thereof, etc. In this regard, the safe landing zone may take into account a three-dimensional space—as an unmanned aerial vehicle may approach from various altitudes.

In some embodiments, the marine electronic device 105 may be configured to take into account the safe landing zone when providing instructions to control or operate the unmanned vehicle 120. Additionally or alternatively, the unmanned vehicle 120 may determine where or how to travel or operate by taking the safe landing zone into account (which may be provided to the unmanned vehicle 120 from the marine electronic device 105).

FIG. 5 illustrates an example safe landing zone 257 around a landing pad 227 of a marine vessel 10 in a marine environment 201. In such an embodiment, the unmanned vehicle 20 may only be configured to approach the landing pad from within the safe landing zone 257.

Though the above description focuses on a safe landing zone, embodiments of the present invention also contemplate safe zones where the unmanned vehicle 120 will or will not (depending on the configuration) travel, such as during any operation (e.g., not just landing) or other specific operations. For example, a user may define a "dangerous" zone instead of a "safe" zone.

In some embodiments, the marine electronic device 105 may be configured to determine the safe landing zone. In this regard, the safe landing zone may be preset or customizable. For example, a user may be configured to define the safe landing zone. FIG. 6 shows an example marine electronic device 40 with a screen 45 that shows an interface that enables a user to draw the desired safe landing zone. For example, a user 70 may interact with the touch screen with their finger 71 to draw a line 272 from the landing pad 267 of the marine vessel 261. The line 272 may be formed into the safe landing zone 277. In this regard, in some embodiments, the marine electronic device 105 may be configured to complete the safe landing zone that is being drawn or created by the user.

Although the depicted embodiment shows a user drawing a safe landing zone, other user input forms are contemplated. Further, as indicated above, a safe zone (such as any operation or all operations) can be drawn or indicated for use by the marine electronic device 105 and unmanned vehicle 120.

In some embodiments, the unmanned vehicle 120 may be configured to land on the surface of the body of water. As noted herein, in some embodiments, the unmanned vehicle 120 may be configured to float on the surface of the body of water. In some embodiments, the marine electronic device 105 may be configured to transmit a control signal with instructions for the unmanned vehicle 120 to land on the surface of the body of water at a location. Such instructions may include (or be based on) pertinent information regarding the location and/or surface of the body of water. For example, the marine electronic device 105 may determine the current sea level or other characteristics about the sea (wave height, etc.) that can be provided to the unmanned vehicle 120 and/or accounted for when forming the instructions for landing on the surface of the body of water. Accordingly, the unmanned vehicle 120 may be configured to receive the instructions and cause the unmanned vehicle 120 to land on the surface of the body of water (such as using the propulsion system of the unmanned vehicle).

In some embodiments, the unmanned vehicle 120 may be configured to use object recognition to avoid obstacles, such as buoys or debris in the water, when attempting to land on the surface of the body of water. Additionally or alternatively, the unmanned vehicle 120 may be configured to provide video data to the marine electronic device 105 to perform the object recognition and instruct the unmanned vehicle accordingly.

Though the above described embodiments contemplate landing on a marine vessel or the surface of the water, some embodiments of the present invention contemplate landing on other objects, including for example, other objects in the water, islands, sandbars, etc. Landing accordingly may, in some embodiments, occur in response to the unmanned vehicle 120 receiving instructions from the marine electronic device 105.

Operational Control

As noted above, in some embodiments, the unmanned vehicle 120 may be configured to communicate with and/or be controlled/operated by the marine electronic device 105. In such embodiments, the unmanned vehicle 120 may be configured to receive instructions from the marine electronic device 105 to gather operational data and/or perform various operations with systems, sensors, or other components of the unmanned vehicle 120. In response, the unmanned vehicle 120 may act accordingly and provide operational data and/or data indicating completion of various operations to the marine electronic device 105. As used herein, operational data may encompass any type of data that the unmanned vehicle can gather (e.g., sonar data, camera data, location data, etc.). Additionally, some embodiments of the present invention utilize further categorization of data types, such as sensor data, which may refer to any type of data capable of being gathered by a sensor of the unmanned vehicle, which may include sonar, radar, location sensors, among others. Also, as used herein, operations that can be performed by the unmanned vehicle 120 may refer to any type of operation described or contemplated herein (e.g., tasks, travel, transmission, receipt, gather data, etc.).

Video/Camera Operation

In some embodiments, the unmanned vehicle 120 may include a camera 133 configured to gather camera data, including, for example, video and/or image data.

In some embodiments, the unmanned vehicle 120 may be configured to communicate with and/or be controlled/operated by the marine electronic device 105. In such embodiments, the unmanned vehicle 120 may be configured to operate the camera 133 according to instructions provided by the marine electronic device 105 (such as through a control signal). Likewise, in some embodiments, the unmanned vehicle 120 may be configured to provide the gathered camera data to the marine electronic device 105. This may include streaming video and/or still images. In some embodiments, the gathered camera data could be provided through a direct transmission to the marine electronic device 105, through an external network, or via upload after return of the unmanned vehicle 120.

In some embodiments, the marine electronic device 105 may be configured to display the camera data (e.g., the streaming video) to a user, such as on a screen. Notably, display on the screen of the marine electronic device 105 may be desirable to provide a large screen and/or convenient viewing area (e.g., the command center of the boat, where the user is fishing, etc.). Further, use of such screens may be desirable as they are often high-bright screens that are designed for easy viewing in sunlight (since the screens are often exposed on the marine vessel). This allows for easy viewing of objects, such as fish, sand bars, rocks, bridges, etc.

Indeed, in some embodiments, the unmanned vehicle 120 (such as by utilizing the camera and displaying the resulting image on the marine electronic device 105) may be used to scout the marine environment, such as for depth, possible fishing locations, among many other reasons. For example, in some embodiments, the unmanned vehicle 120 may be instructed to act as a virtual tuna tower. In such a regard, the user may provide user input indicating that the unmanned vehicle 120 should perform a "virtual tuna tower" operation. In response, the marine electronic device 105 may transmit a control signal with instructions for the unmanned vehicle 120 to fly to a specified height and provide streaming video back to the marine electronic device 105 to aid in a user spotting fish (e.g., tuna). In some embodiments, the unmanned vehicle 120 may be further configured to travel with the marine vessel (such as in response to instructions to do so) such that it stays in the same place relative to the marine vessel—acting as a "virtual tuna tower." As further detailed herein, object recognition technology (such as at the marine electronic device 105 or the unmanned vehicle 120) could be used to further aid in fish spotting.

Additionally, in some embodiments, the unmanned vehicle 120 may be configured to determine location data associated with the gathered camera data. Further, in some embodiments, the unmanned vehicle 120 may be configured to transmit the location data to the marine electronic device 105, such as for determination of the location of the unmanned vehicle at the time of gathering the camera data (though the location may also or in the alternative be determined at the unmanned vehicle).

In some embodiments, the location of the unmanned vehicle 120 may be associated with the gathered camera data for correlation and/or storage. Such association may occur at the unmanned vehicle 120 and/or at the marine electronic device 105. In this regard, in some embodiments, the marine electronic device 105 may cause display of the streaming video in association with the location of the unmanned vehicle to give context to the streaming video to the user.

FIG. 7A shows an example marine electronic device 40 that depicts a split-screen view 300 of streaming video 301 on the left portion of the screen and a chart 303 on the right portion of the screen. The streaming video 301 is taken from camera data from the unmanned vehicle 120 and shows a bird's eye view (such as from a flying unmanned vehicle 120) of water 311 with a fish 313 swimming near the surface of the water. The chart 303 shows the location of unmanned vehicle 320 (indicated as a "$D^1$", such as for Drone 1) on the body of water 305. The chart 303 also shows the location of the marine vessel 310 associated with the marine electronic device 105, thereby giving the viewer an indication of the relative position of the unmanned vehicle 120.

Additionally, in some embodiments, such as the depicted embodiment, the marine electronic device 105 may display an indication of the camera view 351 that provides the user with an idea of the orientation and/or coverage area of the camera and the captured streaming video. In such embodiments, the unmanned vehicle 120 may be configured to determine orientation data corresponding to the orientation of the unmanned vehicle 120 and/or the camera 133 (as the camera 133 may be configured to be directed with respect to the unmanned vehicle 120). Such orientation data may be provided to the marine electronic device 105 for use (such as for display, association with the camera data, etc.). In this regard, a user can easily determine the relative location and orientation of the streaming video with respect to the marine vessel and/or body of water (even in the circumstance when the unmanned vehicle is otherwise not visible to the user directly).

In some embodiments, the marine electronic device 105 may be configured to overlay the camera data on the chart at the corresponding location and in the corresponding orientation as the camera data was received. For example, the marine electronic device 105 may receive the camera data, the orientation data of the camera data, and the location data associated with the camera data. Based on this information, the marine electronic device 105 may be configured to orient the camera data and overlay it on a chart at the proper associated location for which it was gathered. In some embodiments, only a portion of the camera data may be overlaid on the chart. In this regard, depending on the configuration and/or desires of the user, the marine electronic device 105 may be configured to crop the camera data prior to overlaying it on the chart. Such embodiments that utilize overlaying camera data on a chart may be useful for surveying a body of water. Even more, multiple unmanned vehicles could be used to efficiently survey the body of water, and could be operated in conjunction via the marine electronic device.

FIG. 7B shows an example screen 45 of a marine electronic device 40 showing the streaming video 301 on the left portion and a chart 303' on the right portion. Prior camera data has been overlaid 353 on the chart 303' at the appropriate location and in the appropriate orientation. In the depicted embodiment, the camera data is overlaid as the unmanned vehicle 320 travels along the body of water 305.

In some embodiments, the unmanned vehicle 120 may be configured to perform an "Auto-Selfie" operation where the unmanned vehicle 120 follows the marine vessel to provide a selfie of the marine vessel via the camera data. In this regard, the marine electronic device 105 may receive user input indicating a desire to have the unmanned vehicle 120 perform the "Auto-Selfie" operation. In response, the marine electronic device 105 may determine and provide instructions to the unmanned vehicle 120 (such as a series of control signals) to cause the unmanned vehicle 120 to travel (e.g., fly) to a series of new desired locations such that it follows the marine vessel. In this regard, the marine electronic device 105 takes into account the current location, heading, and speed of the marine vessel when instructing the new desired location to the unmanned vehicle such that the unmanned vehicle remains in the same "relative" position to the marine vessel. Accordingly, the unmanned vehicle 120 may operate its propulsion system to travel according to the instructions.

Additionally, the instructions may include instructions for the unmanned vehicle to orient the camera toward the marine vessel and begin gathering camera data. Accordingly, the unmanned vehicle 120 may direct and operate its camera 133 according to the instructions. This camera data may be provided back to the marine electronic device for display and/or storage—creating a "selfie" of the marine vessel. Such embodiments may be useful in many different scenarios (such as for learning to sail, learning to drive a boat, docking, etc.). Additionally, other possible advantages include following a wake boarder or skier to provide action shots. In this regard, various patterns or altitudes could be used to provide the desired streaming video experience. Such instructions could be determined from user input and/or from pre-stored patterns. In some embodiments, object recognition technology could be used to enhance the experience by following a skier or other object.

FIG. 8 illustrates an example marine environment where the unmanned vehicle 20 is performing an "Auto-Selfie" operation. In this regard, the unmanned vehicle 20 uses its propulsion system 25 to travel (e.g., along arrow 362) such that it follows the marine vessel 10 (which is traveling, via a propulsion system 17, along arrow 361). Additionally, the unmanned vehicle 20 has oriented its camera 330 such that the camera viewing angle 331 covers the marine vessel 10. Such gathered camera data can then be provided to the marine electronic device 40 for storage and/or display.

In some embodiments, the unmanned vehicle 120 and/or marine electronic device 105 may include object recognition technology that can be used in conjunction with the camera data to recognize objects (e.g., fish, dolphins, whales, sharks, other marine vessels, structure, shallow water, rocks, etc.) and act accordingly. In some embodiments, certain objects may cause triggers to occur, such as begin capturing camera data when a fish or other object is recognized, begin transmission of the camera data to the marine electronic device for display when a fish or other object is recognized, mark a location on the marine electronic device when a fish or other object is recognized, among many others.

Sonar Operation

In some embodiments, the unmanned vehicle 120 may include a sonar system 136 configured to gather sonar data. Sonar (SOund Navigation And Ranging) has long been used to detect waterborne or underwater objects. For example, sonar devices may be used to determine depth and bottom topography, detect fish, locate wreckage, etc. Sonar beams, from a transducer assembly of a sonar system (e.g., sonar system 136), can be transmitted into the underwater environment. The sonar signals reflect off objects in the underwater environment (e.g., fish, structure, sea floor bottom, etc.) and return to the transducer assembly, which converts the sonar returns into sonar data that can be used to produce an image of the underwater environment.

In some embodiments, the unmanned vehicle 120 may be configured to communicate with and/or be controlled/operated by the marine electronic device 105. In such embodiments, the unmanned vehicle 120 may be configured to operate the sonar system 136 according to instructions provided by the marine electronic device 105 (such as through a control signal). Likewise, in some embodiments, the unmanned vehicle 120 may be configured to provide the gathered sonar data to the marine electronic device 105. In some embodiments, the gathered sonar data could be provided through a direct transmission to the marine electronic device 105, through an external network, or via upload after return of the unmanned vehicle 120. In some embodiments, the unmanned vehicle 120 may be configured to connect to an external network directly. In such embodiments, the sonar data may be sent to an external device or server for storage and/or use (such as in sonar mapping of the body of water). In some embodiments, the sonar data may be stored in a buffer until internet connectivity is reached for transmission (such as to the marine electronic device 105 and/or external network).

Depending on the configuration of the sonar system 136 of the unmanned vehicle 120 and/or the marine electronic device 105, processing of the sonar returns may occur at either or both of the unmanned vehicle 120 or the marine electronic device 105. In this regard, in some embodiments, the unmanned vehicle 120 may be configured to merely collect sonar returns and provide sonar return data to the marine electronic device 105 for processing. Additionally or alternatively, the unmanned vehicle 120 may be configured to process the sonar return data and generate sonar image data that can be provided to the marine electronic device 105. Along these lines, in some embodiments, the unmanned vehicle 120 may be configured to detect the presence of a fish or other object from the sonar returns and remotely provide a signal to the marine electronic device 105. Such a signal may indicate that the captured sonar data may include something of interest. In some embodiments, the unmanned vehicle 120 may also be configured to return to the marine electronic device 105 and/or marine vessel so that the sonar data containing the possible object of interest can be uploaded and/or viewed.

In some embodiments, the marine electronic device 105 may be configured to display the sonar data to a user, such as on a screen. Notably, display on the screen of the marine electronic device 105 may be desirable to provide a large screen and/or convenient viewing area (e.g., the command center of the boat, where the user is fishing, etc.). Further, use of such screens may be desirable as they are often high-bright screens that are designed for easy viewing in sunlight (since the screens are often exposed on the marine vessel).

Additionally, in some embodiments, the unmanned vehicle 120 may be configured to determine location data associated with the gathered sonar data. Further, in some embodiments, the unmanned vehicle 120 may be configured to transmit the location data to the marine electronic device 105, such as for determination of the location of the unmanned vehicle at the time of gathering the sonar data (though the location may also or in the alternative be determined at the unmanned vehicle).

In some embodiments, the location of the unmanned vehicle 120 may be associated with the gathered sonar data for correlation and/or storage. Such association may occur at the unmanned vehicle 120 and/or at the marine electronic device 105. In this regard, in some embodiments, the marine electronic device 105 may cause display of an image of the sonar data in association with the location of the unmanned vehicle to give context to the sonar data to the user.

FIG. 9A shows an example marine electronic device 40 that depicts a split-screen view 400 of a sonar image 462 on the left portion of the screen and a chart 402 on the right portion of the screen. The sonar image 462 is produced from sonar data from the unmanned vehicle 120 and shows sonar imagery taken from a transducer assembly with sidescan transducers. In particular, the sidescan sonar image view shows the sonar view from the left and right of the transducer assembly of the sonar system as time passes (building up from top down like a waterfall). The chart 402 shows the location of unmanned vehicle 420 (indicated as a "D¹", such as for Drone 1) on the body of water 405. The chart 402 also shows the location of the marine vessel 410 associated with the marine electronic device 105, thereby giving the viewer an indication of the relative position of the unmanned vehicle 120.

Additionally, in some embodiments, such as the depicted embodiment, the marine electronic device 105 may display an indication of the area of coverage 461 of the sonar system (e.g., the extent to which the sonar beams from the sonar system provide coverage of the underwater environment). Such an indication would provide the user with an idea of the orientation and/or coverage area of the sonar system and the captured sonar data. In such embodiments, the unmanned vehicle 120 may be configured to determine orientation data corresponding to the orientation of the unmanned vehicle 120 and/or the sonar system 136 (as the sonar system 136 may be configured to be directed with respect to the unmanned vehicle 120). Such orientation data may be provided to the marine electronic device 105 for use (such as for display, association with the sonar data, etc.). In this regard, a user can easily determine the relative location and orientation of the sonar data with respect to the marine vessel and/or body of water (even in the circumstance when the unmanned vehicle is otherwise not visible to the user directly).

In some embodiments, the unmanned vehicle 120 (such as by utilizing the sonar system 136 and displaying the resulting image on the marine electronic device 105) may be used to scout the underwater environment, such as for depth determinations, possible fishing locations, among many other reasons. In some embodiments, the unmanned vehicle 120 may be instructed to perform search or survey patterns or travel in relation to the marine vessel—such as to aid a fisherman in finding good fishing locations, etc. For example, in some embodiments, the unmanned vehicle 120 may be configured to scout ahead of the marine vessel to confirm or check terrain (e.g., depth) in front of the marine vessel. In this regard, travel and operation of the sonar system 136 of the unmanned vehicle 120 may be autonomous, such as through control by the marine electronic device 105 (which can be based on a marine vessel, on shore, at a station, etc. —thereby enabling control of the unmanned vehicle 120 in the marine environment from anywhere).

In some embodiments, the marine electronic device 105 may be configured to scout or survey an area using multiple unmanned vehicles 120. In such an embodiment, the marine electronic device 105 may track each unmanned vehicle 120 and/or pre-map the survey patterns to control the unmanned vehicles 120 for efficient surveying. In this regard, the marine electronic device 105 may act as a "hive mind" to control and/or manage the "swarm" of unmanned vehicles 120 to efficiently perform tasks (such as tasks described herein, including capturing sonar data for a body of water, among any other tasks or operations described herein).

In some embodiments, the marine electronic device 105 may be configured to overlay the sonar data on the chart at the corresponding location and in the corresponding orientation as the sonar data was received. For example, the marine electronic device 105 may receive the sonar data, the orientation data of the sonar data, and the location data associated with the sonar data. Based on this information, the marine electronic device 105 may be configured to orient the sonar data and overlay it on a chart at the proper associated location for which it was gathered.

In some embodiments, only a portion of the sonar data may be overlaid on the chart. In this regard, depending on the configuration and/or desires of the user, the marine electronic device 105 may be configured to remove a portion of the sonar data prior to overlaying it on the chart. For example, the marine electronic device 105 may remove the water column of the sonar image data prior to overlaying on the chart such that the overlaid image on the chart includes bottom features (which gives the user an impression of the bottom). Such embodiments that utilize overlaying sonar data on a chart may be useful for surveying a body of water. Even more, multiple unmanned vehicles could be used to efficiently survey the body of water, and could be operated in conjunction via the marine electronic device 105.

FIG. 9B shows an example screen 45 of a marine electronic device 40 showing the sonar image 462 on the left portion and a chart 402 on the right portion. Prior sonar data has been overlaid 463 on the chart 402 at the appropriate location and in the appropriate orientation. In the depicted embodiment, the sonar data is overlaid as the unmanned vehicle 420 travels along the body of water 405.

With reference to FIG. 9B, the sonar image 462 is an image from a transducer assembly with sidescan (left and right) transducers. In this regard, the image includes a centerline 466 that indicates the center of the transducer assembly and image data extending out to the left and right of the centerline 466. The sonar data extending outwardly from the centerline 466 correlates to the distance from which the sonar return is received by the transducer assembly (e.g., the distance from the centerline). As such, there is a water column 469 that includes fish and other objects. Additionally, there is a portion 467 of the screen indicating sonar returns that have returned from the floor of the body of water. Notably, the image 462 shows a possible relatively distinct floor. In some embodiments, the marine electronic device 105 and/or unmanned vehicle 120 may be configured to remove the water column 469 up to that floor. The resulting image could be used for the overlay image on the chart such that only the topography of the floor is shown overlaid onto the chart.

As noted herein, the unmanned vehicle 120 may be in many different configurations, such that embodiments of the present invention contemplate many different ways to operate a sonar system 136 of an unmanned vehicle 120. In this regard, in some embodiments, the sonar system 136 needs to be at least partially submerged in water in order to effectively collect sonar data. In some embodiments, the unmanned vehicle 120 may be configured for surface travel or submersible travel such that the sonar system 136 may be positioned and/or oriented on the unmanned vehicle 120 in a manner in which it is at least partially submerged for operation. In other embodiments, the unmanned vehicle 120 may be configured for aerial travel. In this regard, some embodiments of the present invention contemplate means to obtain sonar data using an aerial traveling unmanned vehicle. Some examples are provided below.

In some embodiments, the unmanned vehicle 120 may be configured to land and float on or hover just above the surface of the water to enable the sonar system 136 to be at least partially submerged for operation. Such a maneuver (and operation) could be performed in response to instructions from the marine electronic device 105. An example of this is shown in the marine environment 401 of FIG. 10A. In the depicted embodiment, the unmanned vehicle 20 has used its propulsion system to land on the surface 12 of the body of water 11 (such as in response to instructions from the marine electronic device 40 of the marine vessel 10). Notably, the unmanned vehicle 20 includes a sonar system 460 that is now at least partially submerged such that it can transmit sonar beams 461a, 461b, and 461c into the underwater environment.

In some embodiments, the unmanned vehicle 120 may be configured to hover above the surface of the water (such as at a hover position) and drop or deploy the sonar system 136 down into the water such that it is at least partially submerged for operation. Such a maneuver (and operation) could be performed in response to instructions from the marine electronic device 105. In some embodiments, the unmanned vehicle 120 may be configured pull the sonar system 136 back up for travel and/or travel with the sonar system deployed (such as during a survey pattern). An example of this is shown in the marine environment 401' of FIG. 10B. In the depicted embodiment, the unmanned vehicle 20 has used its propulsion system to hover above the surface 12 of the body of water 11 (such as in response to instructions from the marine electronic device 40 of the marine vessel 10). Additionally, the unmanned vehicle 20 has lowered (such as via a cable 467) a sonar system 460' into the water 11. As such, the sonar system 460 is now at least partially submerged such that it can transmit sonar beams 461a, 461b, and 461c into the underwater environment. In some embodiments, the unmanned vehicle 120 may be configured to simply drop the sonar system into the water (e.g., without it still be attached to a rope or tether).

Radar Operation

In some embodiments, the unmanned vehicle 120 may include a radar system 137 configured to gather radar data. In such embodiments, the unmanned vehicle 120 may be utilized to gather radar data for the environment surrounding the marine vessel. Indeed, the unmanned vehicle 120 may fly at higher altitudes than typical radar systems for marine vessel, which may provide better radar data.

In some embodiments, the unmanned vehicle 120 may be configured to communicate with and/or be controlled/operated by the marine electronic device 105. In such embodiments, the unmanned vehicle 120 may be configured to operate the radar system 137 according to instructions provided by the marine electronic device 105 (such as through a control signal). Likewise, in some embodiments, the unmanned vehicle 120 may be configured to provide the gathered radar data to the marine electronic device 105. In some embodiments, the gathered radar data could be provided through a direct transmission to the marine electronic device 105, through an external network, or via upload after return of the unmanned vehicle 120. In some embodiments, the unmanned vehicle 120 may be configured to connect to an external network directly, such as to provide radar data to a remote device.

Depending on the configuration of the radar system 137 of the unmanned vehicle 120 and/or the marine electronic device 105, processing of the radar returns may occur at either or both of the unmanned vehicle 120 or the marine electronic device 105. In this regard, in some embodiments, the unmanned vehicle 120 may be configured to merely collect radar returns and provide radar return data to the marine electronic device 105 for processing. Additionally or alternatively, the unmanned vehicle 120 may be configured to process the radar return data and generate radar image data that can be provided to the marine electronic device 105.

In some embodiments, the marine electronic device 105 may be configured to display the radar data to a user, such as on a screen. Notably, display on the screen of the marine electronic device 105 may be desirable to provide a large screen and/or convenient viewing area (e.g., the command center of the boat, etc.). Further, use of such screens may be desirable as they are often high-bright screens that are designed for easy viewing in sunlight (since the screens are often exposed on the marine vessel).

Additionally, in some embodiments, the unmanned vehicle 120 may be configured to determine location data associated with the gathered radar data. Further, in some embodiments, the unmanned vehicle 120 may be configured to transmit the location data to the marine electronic device 105, such as for determination of the location of the unmanned vehicle at the time of gathering the radar data (though the location may also or in the alternative be determined at the unmanned vehicle).

In some embodiments, the location of the unmanned vehicle 120 may be associated with the gathered radar data for correlation and/or storage. Such association may occur at the unmanned vehicle 120 and/or at the marine electronic device 105. In this regard, in some embodiments, the marine electronic device 105 may cause display of an image of the radar data in association with the location of the unmanned vehicle to give context to the radar data to the user.

FIG. 11 shows an example marine electronic device 40 that depicts a split-screen view 500 of a radar image 576 on the left portion of the screen and a chart 502 on the right portion of the screen. The radar image 576 is produced from radar data from the unmanned vehicle 120. In particular, the radar image view shows a center point 572 corresponding to the unmanned vehicle 520. In this regard, a rock or other object 573 is shown on the radar image in a corresponding location as shown on the chart 502 with respect to the unmanned vehicle 520. The radar image 576 also shows the current radar beam 574 direction. The chart 502 shows the location of unmanned vehicle 520 (indicated as a "D¹", such as for Drone 1) on the body of water 505. The chart 502 also shows the location of the marine vessel 510 associated with the marine electronic device 105, thereby giving the viewer an indication of the relative position of the unmanned vehicle 120.

Additionally, in some embodiments, such as the depicted embodiment, the marine electronic device 105 may display an indication of the area of coverage 571 of the radar system (e.g., the extent to which the radar system provides coverage of the surrounding environment). Such an indication would provide the user with an idea of the coverage area of the radar system and the captured radar data.

In such embodiments, the unmanned vehicle 120 may be configured to determine orientation data corresponding to the orientation of the unmanned vehicle 120. Such orientation data may be provided to the marine electronic device 105 for use (such as for display, association with the radar data, etc.). For example, the radar display may be "north up", but the unmanned vehicle 120 may be oriented in a direction other than north. Thus, the location of any objects within the radar image must be accounted for. Likewise, the orientation of the unmanned vehicle 120 may be different than the heading of the marine vessel (on which the user is viewing the radar image). Thus, the heading of the marine vessel, the orientation of the unmanned vehicle, and/or the geo-referenced location of the object within the radar data may be processed by the marine electronic device 105 to generate an appropriate radar image for display and use. In this regard, a user can easily determine the relative location of objects within the radar image with respect to the marine vessel and/or body of water.

In some embodiments, the marine electronic device 105 may be configured to process the radar data from the unmanned vehicle 120 for use with radar data taken from the marine vessel (e.g., from a separate radar system of the marine vessel). In this regard, the marine electronic device 105 may be configured to update radar imagery from the marine vessel's radar system with radar data taken from the unmanned vehicle 120. For example, the marine electronic device 105 may update characteristics (e.g., shape, etc.) of objects within the coverage area of the marine vessel's radar system based on the radar data from the unmanned vehicle 120. In some embodiments, the marine electronic device 105 may use the radar data from the unmanned vehicle 120 to form three-dimensional (3D) radar imagery. In some embodiments, the marine electronic device 105 may be configured to control and/or operate the unmanned vehicle 120 to help form the desired combined radar data and/or images (e.g., control the location/pattern of travel to help fill out the combined radar image and/or 3D image). Along these lines, the marine electronic device 105 may recognize an object and instruct the unmanned vehicle 120 to scout out or gather more radar information regarding the object—thereafter updating the radar image accordingly.

In some embodiments, the marine electronic device 105 may be configured to form a radar map of the surrounding area (e.g., the body of water). In this regard, in some embodiments, the unmanned vehicle 120 (such as by utilizing the radar system 137 and displaying the resulting image on the marine electronic device 105) may be used to scout the surrounding environment, such as for viewing objects, among many other reasons (e.g., fog may prevent/limit visibility). In some embodiments, the unmanned vehicle 120 may be instructed to perform search or survey patterns or travel in relation to the marine vessel—such as to aid in navigation, etc. For example, in some embodiments, the unmanned vehicle 120 may be configured to scout ahead of the marine vessel to confirm or check terrain in front of the marine vessel. In this regard, travel and operation of the radar system 137 of the unmanned vehicle 120 may be autonomous, such as through control by the marine electronic device 105.

In some embodiments, the marine electronic device 105 may be configured to overlay the radar data (or combined radar data) on the chart at the corresponding location, such as the radar data was received. For example, the marine electronic device 105 may receive the radar data, orientation data of the unmanned vehicle while acquiring the radar data, and the location data associated with the radar data. Based on this information, the marine electronic device 105 may be configured to orient the radar data and overlay it on a chart at the proper associated location for which it was gathered. Such embodiments may be useful in forming a radar map of the surrounding environment.

Other Sensor(s)/System(s) Operation

In some embodiments, the unmanned vehicle 120 may include other systems/sensors (e.g., other systems/sensors 139 of FIG. 19) configured to gather operational data and/or perform tasks. In some embodiments, the unmanned vehicle 120 may be configured to communicate with and/or be controlled/operated by the marine electronic device 105. In such embodiments, the unmanned vehicle 120 may be configured to operate the other systems/sensors 139 according to instructions provided by the marine electronic device 105 (such as through a control signal). Likewise, in some embodiments, the unmanned vehicle 120 may be configured to provide the gathered operational data to the marine electronic device 105. In some embodiments, the gathered operational data could be provided through a direct transmission to the marine electronic device 105, through an external network, or via upload after return of the unmanned vehicle 120. In some embodiments, the unmanned vehicle 120 may be configured to connect to an external network directly, such as to provide operational data to a remote device.

Depending on the configuration of the other systems/sensors 139 of the unmanned vehicle 120 and/or the marine electronic device 105, processing of the operational data may occur at either or both of the unmanned vehicle 120 or the marine electronic device 105. In this regard, in some embodiments, the unmanned vehicle 120 may be configured to merely collect and provide operational data to the marine electronic device 105 for processing. Additionally or alternatively, the unmanned vehicle 120 may be configured to process the operational data for use by the marine electronic device 105 (such as for display). In some embodiments, the marine electronic device 105 may be configured to display the operational data (or byproducts thereof) to a user, such as on a screen.

Additionally, in some embodiments, the unmanned vehicle 120 may be configured to determine location data associated with the gathered operational data. Further, in some embodiments, the unmanned vehicle 120 may be configured to transmit the location data to the marine electronic device 105, such as for determination of the location of the unmanned vehicle at the time of gathering the operational data (though the location may also or in the alternative be determined at the unmanned vehicle).

In some embodiments, the location of the unmanned vehicle 120 may be associated with the gathered operational data for correlation and/or storage. Such association may occur at the unmanned vehicle 120 and/or at the marine electronic device 105. In this regard, in some embodiments, the marine electronic device 105 may cause display of an image related to the operational data in association with the location of the unmanned vehicle to give context to the operational data to the user.

Examples of various other systems/sensors contemplated for use with various embodiments of the present invention are provided below. Such examples are meant to provide examples and are not meant to be limiting, as embodiments of the present invention contemplate utilization of many different types of systems and/or sensors, such as may be useful with embodiments of the present invention described herein.

In some embodiments, the unmanned vehicle 120 may include a microphone that is configured to gather audio data (e.g., operational data). Depending on the configuration of the microphone and/or the position of the microphone on the unmanned vehicle 120, the unmanned vehicle 120 may gather audio data as it travels (e.g., flies) such as for gathering nature sounds, bird sounds, wildlife, etc. In some embodiments, the unmanned vehicle 120 may land on the surface of the water, and the microphone may be configured to gather audio data from the underwater environment.

In some embodiments, the gathered audio data may be provided to the marine electronic device 105 for playing to a user. In some embodiments, the audio data could be associated with a location of the unmanned vehicle 120 when it was acquired. Such information could be utilized on a display (such as described herein with respect to sonar and radar data). Additionally or alternatively, the audio data could be utilized in other ways (e.g., combining with other operational data, playing nature sounds to the boaters for peaceful sounds, etc.).

In some embodiments, the unmanned vehicle 120 may be configured to track audio data such as to locate the source of the audio data. For example, during a search and rescue operation (such as examples described herein), the unmanned vehicle 120 may utilize the microphone to track shouting from a person overboard to locate the person. In some embodiments, the unmanned vehicle 120 (such as under control of the marine electronic device 105) may be configured to perform a search pattern or survey to gather audio data.

In some embodiments, the unmanned vehicle 120 may include a speaker such as for playing audio data. In some embodiments, the unmanned vehicle 120 may include one or more speakers and one or more microphones. In such an embodiment, the unmanned vehicle 120 may act as a 2 way communication device. Such a device may be useful for talking between boats or during search and rescue operations (such as for talking with a person overboard).

In some embodiments, the unmanned vehicle 120 may include an infrared sensor/camera that is configured to gather infrared data (e.g., operational data). Depending on the configuration of the infrared sensor/camera and/or the position of the infrared sensor/camera on the unmanned vehicle 120, the unmanned vehicle 120 may gather infrared data as it travels (e.g., flies). In some embodiments, the unmanned vehicle 120 may land on the surface of the water, and the infrared sensor/camera may be configured to gather infrared data from the underwater environment.

In some embodiments, the gathered infrared data may be provided to the marine electronic device 105 for display to a user. In some embodiments, the infrared data could be associated with a location of the unmanned vehicle 120 when it was acquired. Such information could be utilized on a display (such as described herein with respect to sonar and radar data). Additionally or alternatively, the infrared data could be utilized in other ways (e.g., combining with other operational data, object recognition, etc.).

In some embodiments, the unmanned vehicle 120 may be configured to use the infrared data to identify people or objects, such as in the water. For example, during a search and rescue operation (such as examples described herein), the unmanned vehicle 120 may utilize the infrared sensor/camera to locate people during a man overboard situation. In such embodiments, the unmanned vehicle 120 (such as under control of the marine electronic device 105) may be configured to perform a search pattern or survey to gather the infrared data. Additionally, in some embodiments, object recognition could be used to autonomously locate a person in the water. The object recognition could be performed at the unmanned vehicle 120 and/or at the marine electronic device 105. In some embodiments, alerts could be provided to the marine electronic device 105 (and/or proper authorities) based on heat signatures and/or possible identifications. Additionally or alternatively, locations corresponding to possible heat signature hits could be provided to the marine electronic device 105, such as for display on a chart. Further, the marine electronic device 105 could automatically determine navigation instructions for the marine vessel to reach the one or more determined locations. An autopilot could even be engaged to automatically travel according to the determined navigation instructions.

In some embodiments, the unmanned vehicle 120 may include a temperature sensor that is configured to gather temperature data (e.g., operational data). Such temperature data may be useful for determining optimal fishing locations (e.g., through determining thermoclines, etc.). In some embodiments, the temperature sensor may include an IR sensor that is configured to measure sea temperatures.

Depending on the configuration of the temperature sensor and/or the position of the temperature sensor on the unmanned vehicle 120, the unmanned vehicle 120 may gather atmospheric temperature data (e.g., as it travels) and/or underwater temperature data (e.g., the unmanned vehicle 120 may land on the surface of the water). In some embodiments, the temperature sensor may be formed of a probe (e.g., a telescopic probe, attached to a line, etc.) that can be deployed within the underwater environment.

In some embodiments, the gathered temperature data may be provided to the marine electronic device 105, such as for display to a user. In some embodiments, the temperature data could be associated with a location of the unmanned vehicle 120 when it was acquired. Such information could be utilized on a display (such as described herein with respect to sonar and radar data). Additionally or alternatively, the temperature data could be utilized in other ways (e.g., combining with other operational data, object recognition, etc.).

As noted above, in some embodiments, the temperature sensor may be configured to measure atmospheric temperature. Likewise, or in addition, the unmanned vehicle 120 may be configured to determine or measure weather data (such as with a temperature sensor, weather antenna, wind sensor, camera, etc.). As such, the unmanned vehicle 120 may be utilized (such as by the marine electronic device 105) for determining upcoming weather conditions. In this regard, the unmanned vehicle 120 could fly up to an altitude or out to a specific location to check the weather.

Along similar lines, in some embodiments, the unmanned vehicle 120 may include a wind sensor that is configured to gather wind data (e.g., operational data). In some embodiments, the wind data includes wind speed and/or wind direction. Such wind data may be useful for determining wind conditions and/or trends in wind conditions for sailing at remote locations, which may help a user determine whether or not to travel to the location. In some embodiments, the unmanned vehicle 120 may account for its own current speed and/or direction when measuring wind data (e.g., account for motion of the unmanned vehicle 120). For example, if the wind is 0 knots and the unmanned vehicle 120 is travelling at 10 knots, the unmanned vehicle 120 may take the 10 knots off the measured wind speed (e.g., 10 knots) to get the actual wind speed (e.g., 0 knots). This example ignores wind direction and wind angle for simplicity of explanation—however, embodiments of the present invention may account for such factors when determining the wind data.

In some embodiments, the gathered wind data may be provided to the marine electronic device 105, such as for display to a user. In some embodiments, the wind data could be associated with a location of the unmanned vehicle 120 when it was acquired. Such information could be utilized on a display (such as described herein with respect to sonar and radar data). Additionally or alternatively, the wind data could be utilized in other ways (e.g., combining with other operational data, etc.).

In some embodiments, the marine electronic device 105 may be configured to control/operate the unmanned vehicle 120 to have it travel to certain locations or altitudes to gather wind data. In some embodiments, the unmanned vehicle 120 may be instructed to travel according to a survey pattern to gather wind data to provide back to the marine electronic device 105. Such wind data, in some embodiments, may be collected and formed into a map and/or displayed with respect to the marine vessel to help an operator determine where to travel (such as to maximize wind conditions for easy travel).

In some embodiments, the unmanned vehicle 120 may include a heave sensor that is configured to gather heave/roll/pitch data (e.g., operational data). As used herein heave/roll/pitch data may be referred to as "heave data". Such heave data may be useful for determining wave conditions at various locations.

Depending on the configuration of the heave sensor and/or the position of the heave sensor on the unmanned vehicle 120, the unmanned vehicle 120 may be configured to land on the surface of the water to gather the heave data. For example, FIG. 12 illustrates an example marine environment 501 where the unmanned vehicle 20 has landed on a wavy surface 12' of the water. The unmanned vehicle 20 includes a heave sensor 580 that is used to measure the heave/roll/pitch of the waves as the unmanned vehicle 20 floats on the water surface. In some embodiments, the heave sensor may comprise an IR laser that could measure the height of the surface of the water while the unmanned vehicle 120 hovers above the water surface. In this regard, embodiments of the present invention contemplate different types of heave sensors for determining the heave/roll/pitch of the water surface.

In some embodiments, the gathered heave data may be provided to the marine electronic device 105, such as for display to a user. In some embodiments, the heave data could be associated with a location of the unmanned vehicle 120 when it was acquired. Such information could be utilized on a display (such as described herein with respect to sonar and radar data). Additionally or alternatively, the heave data could be utilized in other ways (e.g., combining with other operational data, etc.).

In some embodiments, the marine electronic device 105 may be configured to control/operate the unmanned vehicle 120 to have it travel to certain locations to gather heave data. In some embodiments, the unmanned vehicle 120 may be instructed to travel according to a survey pattern to gather heave data for providing back to the marine electronic device 105. Such heave data, in some embodiments, may be collected and formed into a map and/or displayed with respect to the marine vessel to help an operator determine where to travel (such as for minimal wave activity for easy travel).

In some embodiments, the unmanned vehicle 120 may include an Automatic Identification System (AIS) that is configured to gather information regarding other marine vessels and/or objects (e.g., operational data). Additionally, the unmanned vehicle 120 may provide its location through the AIS to other marine vessels. In this way, the unmanned vehicle 120 may become known to other marine vessels (i.e., marine vessels other than the marine vessel associated with the marine electronic device 105 that may control/operate the unmanned vehicle 120).

In some embodiments, the gathered AIS data may be provided to the marine electronic device 105, such as for display to a user. Additionally or alternatively, the AIS data could be utilized in other ways (e.g., combining with other operational data, etc.). For example, when performing tasks, the AIS may provide the location of the unmanned vehicle 120 to other marine vessels. Such an embodiment may be useful in search and rescue operations.

In some embodiments, the marine electronic device 105 may be configured to control/operate the unmanned vehicle 120 to have it travel to certain locations to gather AIS data. For example, the marine vessel may be unable to gather AIS data from its own AIS and, thus, may instruct the unmanned vehicle 120 to travel to a location to gather AIS data that it provides to the marine electronic device 105. Such AIS data could be used to update a chart or map showing the AIS data. In some embodiments, the unmanned vehicle 120 may be configured to extend the range of transmission or reception of AIS data or other transmission/reception data (such as VHF voice communications). For example, the unmanned vehicle 120 may travel to a high altitude to re-transmit the data in order to extend the transmission range of VHF, such as by extending the line-of-sight. In some embodiments, the unmanned vehicle 120 may travel to the edge of range of transmission of the VHF of the marine vessel (e.g., 9 miles)

and may gather and retransmit from that location in order to extend the range of the VHF for the marine vessel. Likewise, the unmanned vehicle 120 may collect any type of data and travel to within range of a remote VHF receiver (e.g., on land) in order to transmit the collected data.

Tracking Operation

In some embodiments, the unmanned vehicle 120 may be configured to track one or more targets (e.g., fish, marine vessels, other objects, etc.). Depending on the configuration, the unmanned vehicle 120 may track the target based on its own systems and sensors and/or in response to instructions provided by the marine electronic device 105 (e.g., through control signals). In such a regard, the unmanned vehicle 120 can be used to track targets for users of the marine vessel, providing information or other data about the target, such as its location, shape, video of the target, etc.

In some embodiments, the marine electronic device 105 may be configured to provide instructions to the unmanned vehicle 120 to cause it to follow and or intercept a target. In such embodiments, the marine vessel (associated with the marine electronic device 105) may be further away or unavailable for tracking the target. In this regard, in some embodiments, the marine electronic device 105 can determine the location or future location of the target, such as based on the current location, speed, altitude, and/or direction of travel of the target. Such information could be gathered from sensors or systems (e.g., from radar data, sonar data, AIS data, camera data, etc.) that communicate with the marine electronic device 105 including, for example, from the unmanned vehicle 120. Then, based on the location or future location of the target, the marine electronic device 105 may be configured to determine a desired location for the unmanned vehicle 120 corresponding to the target. The desired location (or a set of desired locations) can then be provided via instructions to the unmanned vehicle 120. In response, the unmanned vehicle 120 can travel accordingly and "track" the target.

FIG. 13A illustrates an example marine environment 601 that includes a fish 613 swimming near the surface of the water. In the depicted embodiment, the unmanned vehicle 20 includes a camera 630 that is oriented toward the fish 613. In some embodiments, the unmanned vehicle 20 may be tracking the fish 613.

The targets may be generated in any number of ways. For example, in some embodiments, a user may select an object visible in sonar data to be the target (e.g., in 3D sonar views). In another example, a user may select another marine vessel, such as from AIS data. A further example includes a user selecting the target from radar data, such as using an auto radar plotting aid (ARPA). In yet another example, digital selective calling (DSC) can be utilized to select a target. Further, other means can be applied to select a target, such as using object recognition from camera data. Notably, the above types of data (and others) can be acquired using any systems or sensors, including systems and sensors of the unmanned vehicle 120.

FIG. 13B illustrates an example marine electronic device 40 with a screen 45 that is displaying an image 600 of a fish 613 in a body of water 611 from the camera of the unmanned vehicle (e.g., such as what is illustrated in FIG. 13A). In the depicted embodiment of FIG. 13B, the user 70 is selecting the fish 613 via a touchscreen selection with their finger 71. In response, a pop-up window 623 with the question "TRACK?" is displayed for possible selection by the user 70. In this regard, the user may provide user input selecting a target (e.g., the fish 613) and an indication that the user would like the fish 613 to be tracked. In response, the marine electronic device 105 may determine instructions to provide to the unmanned vehicle 120 to cause it to track the fish 613.

In some embodiments, object recognition technology could be used to differentiate the fish 613 within the camera generated image. Further, depending on the configuration, the unmanned vehicle 120 and/or the marine electronic device 105 (through the camera/camera image from the unmanned vehicle 120) may be configured to utilize object recognition to continually discern the fish 613 to enable tracking by the unmanned vehicle 120. Additionally or alternatively, the marine electronic device 105 may provide instructions to the user (e.g., navigation instructions) on how to direct the marine vessel or unmanned vehicle 120 so as to track the target fish.

Though the above described examples detail tracking a fish, other objects are contemplated by embodiments of the present invention (e.g., marine vessels, other unmanned vehicles, buoys, debris, bait schools, etc.).

FIG. 13C illustrates another way to select a target to track using radar data. In particular, FIG. 13C illustrates an example marine electronic device 40 with a screen 45 that is displaying a radar image 600' that includes an object 633 within the coverage area 631 around the center point 620 (e.g., the marine vessel or the unmanned vehicle). In the depicted embodiment, the user 70 is selecting the object 633 via a touchscreen selection with their finger 71. In response, a pop-up window 623 with the question "TRACK?" is displayed for possible selection by the user 70. In this regard, the user may provide user input selecting a target (e.g., the object 633) and an indication that the user would like the object 633 to be tracked. In response, the marine electronic device 105 may determine instructions to provide to the unmanned vehicle 120 to cause it to track the object 633.

FIG. 13D illustrates an example marine electronic device 40 with a screen 45 that is displaying a chart image 600" of the body of water 605 that includes a representation of the marine vessel 610, unmanned vehicle 620, and a possible target 643. In some embodiments, the information gathered from the various systems or sensors of the marine electronic device 105 and/or unmanned vehicle 120 may be used to determine the location, the type of target, the shape of the target, among other things—which can be used to create a representation of the target that can be displayed at an appropriate position on the chart. In some embodiments, the user can then select the target and select an option to track the target accordingly.

In some embodiments, the unmanned vehicle 120 (such as through control by the marine electronic device 105) may be configured to track one or more fishing lures. In this regard, object recognition and/or the known location of the lures may be utilized to enable tracking to occur. Further, the unmanned vehicle 120 may be configured to point/orient the camera to where the lure is to enable a remote user to watch for possible fish activity (e.g., bites). In some embodiments, object recognition technology could be used to provide an alert to the user when fish activity is determined (such as based on streaming camera data). Such embodiments can be useful for game fishing where multiple lures are dragged behind the marine vessel and users may want to be alerted to fishing activity on the lures to catch the fish.

As will be apparent from embodiments described herein, in some embodiments, the marine electronic device 105 may control and/or operate a plurality of unmanned vehicles 120. In such embodiments, the marine electronic device 105 may be configured to determine separate instructions for each unmanned vehicle 120 such that they are coordinated to track the target together. Such a scenario may be useful when the movement of the target is unpredictable, maintaining "eyes on" the target using multiple unmanned vehicles.

Along similar lines, in some embodiments, the marine electronic device 105 may be configured to utilize information from a plurality of unmanned vehicles 120 to determine location data and/or other data (e.g., speed, direction of travel, size, etc.) about an object. For example, by positioning multiple unmanned vehicles 120 in a coordinated effort about an object, data from the various systems of the unmanned vehicles 120 can be utilized to determine and/or gather information about the object. For example, sonar data, radar data, camera data, orientation data, among others can be used from multiple sources around an object to determine characteristics of the object. Notably, the marine electronic device 105 may, in some embodiments, need to account for the orientation and relative position of the unmanned vehicles 120 with respect to each other and/or the object when determining characteristics regarding the object. In some embodiments, data collected by the marine electronic device 105 systems or sensors (or from systems or sensors from other remote devices) may be used in addition to or in the alternative of multiple unmanned vehicles 120. Notably, the marine electronic device 105 may, in some embodiments, need to account for the orientation and relative position of the unmanned vehicles 120 with respect to those systems and sensors when determining characteristics regarding the object.

FIG. 14 illustrates an example marine environment 601' that shows a fish 613 and two unmanned vehicles 20a, 20b. The first unmanned vehicle 20a is flying to the right of the fish 613 and a camera 630a is oriented toward the fish 613, wherein the camera 630a has a coverage area indicated by 631a. The second unmanned vehicle 20b is flying behind the fish 613 and a camera 630b is oriented toward the fish 613, wherein the camera 630b has a coverage area indicated by 631b. Using the known locations of each unmanned vehicle 20a, 20b and the known orientations of the cameras 630a, 630b, the marine electronic device may be configured to determine characteristics and/or other information (e.g., location, size, speed, direction of travel, etc.) regarding the fish 613.

Though the embodiment shown in FIG. 14 utilizes cameras, other systems of the unmanned vehicle may be used (e.g., sonar, radar, etc.). Such systems can, in some cases, be used in conjunction (e.g., data from the radars and the cameras can be used together) to determine characteristics and/or other information about the object.

Search and Rescue Operations

In some embodiments, the unmanned vehicle 120 may be configured to perform search and rescue operations. In some embodiments, the marine electronic device 105 may be configured to control and/or operate the unmanned vehicle 120 (or a plurality of unmanned vehicles 120) to perform search and rescue operations. In this regard, unmanned vehicles 120 may provide a useful means to efficiently and effectively aid in search and rescue. Some examples of how the unmanned vehicles 120 may assist in search and rescue operations are described below, although the below examples are not meant to be limiting as there are many different search and rescue tasks capable of being performed by the unmanned vehicles 120 described herein.

In some embodiments, the unmanned vehicle 120 may be configured to search an area, such as for stranded persons, persons' overboard, missing vessels, etc. The unmanned vehicle 120 may travel, for example, according to pre-set search patterns and/or under the direction of a user/marine electronic device 105. Some example search patterns include a creeping line ahead search, a sector search, an expanding box search, following a shoreline, following a track, following a depth contour, etc.

Depending on the configuration, the unmanned vehicle 120 may travel according to instructions provided by the marine electronics device 105 (such as from one or more control signals). In response, the unmanned vehicle 120 may cause the propulsion system to cause the unmanned vehicle to travel accordingly.

Such embodiments may be particularly useful for covering additional search area (e.g., the marine vessel covers one search area, while the unmanned vehicle covers another). Further, such embodiments may be useful when the marine environment being searched is hazardous for the marine vessel, such as due to weather, shallow water, searching beyond the surf or reef, etc. Indeed, when searching, there may not be enough information or time to scout out the search area. Using an unmanned vehicle 120 may help alleviate some of these concerns. In some embodiments, the unmanned vehicle 120 may scout ahead of the marine vessel so as to provide an indication of any upcoming hazards for the marine vessel.

In some embodiments, the marine electronic device 105 may be configured to update the search pattern based on received operational data from the unmanned vehicle 120 and/or other data from other sources (e.g., other unmanned vehicles, authorities, other marine vessels, systems and/or sensors on the marine vessel, etc.). For example, the marine electronic device 105 may receive information from an external source indicating that the wind conditions, tide conditions, or other factors have changed. In response, the marine electronic device 105 may determine an updated search pattern or area for the unmanned vehicle 120 (such as to account for the changes).

In some embodiments, the marine electronic device 105 may control and/or operate a plurality of unmanned vehicles 120. In such embodiments, the marine electronic device 105 may provide separate instructions to each unmanned vehicle 120 (or each team of unmanned vehicles 120) to coordinate their movements or operations for performing an efficient search and rescue operation.

In some embodiments, the unmanned vehicle 120 (such as from instructions from the marine electronic device 105) may be configured to gather operational data while searching. Such operational data may be provided back to the marine electronic device 105 (or other marine vessels, the authorities, Coast Guard, etc.), such as in real-time, to assist in search and rescue. For example, the unmanned vehicle 120 may use a camera 133 to capture camera data of the searched area. The camera data could be provided back to the marine electronic device 105 for display and/or use. In some embodiments, object recognition technology could be used at the marine electronic device 105 and/or the unmanned vehicle 120 to locate the desired object of interest within the camera data. Further, tracking could be enabled once the desired object of interest is located.

Though the above examples describe providing camera data as feedback, other types of operational data are contemplated, such as sonar data, radar data, IR sensor data (such as described above in the Other Sensor(s)/System(s) Operation section), other system/sensor data, etc.

Along these lines, in some embodiments, the unmanned vehicle 120 may utilize radar (e.g., radar system 137) or an AIS to find marine vessels or objects, such as AIS targets or radar search and rescue transponders (SARTs). For example, a coast guard vessel or other marine vessel (including the marine vessel associated with the unmanned vehicle 120) may be unable to see the target, such as due to high waves, lack of height for an effective radar reading, other obstructions, among other things. In such circumstances, the unmanned vehicle 120 may employ its own radar or AIS (or other sensor/system) to locate and/or travel to a target. Accordingly, in some embodiments, the unmanned vehicle 120 may simply provide location information about the target to the marine electronic device 105 so that the marine vessel can travel to the target.

Though the above embodiments describe providing operational data remotely, in some embodiments, the unmanned vehicle 120 may be configured to perform the search operation and report back to the marine electronic device 105 or marine vessel for uploading of the operational data. In such embodiments, the upload may be performed using a short range wireless connection or through manual upload (e.g., a universal serial bus (USB)).

In some embodiments, the unmanned vehicle 120 may include equipment and/or systems that it may use during the search and rescue operation. In this regard, in some embodiments, the unmanned vehicle 120 may include a light system 138 that can be utilized to aid in search and rescue operations. For example, the unmanned vehicle 120 may fly a search pattern with the light shining over the water to help locate a person overboard. In some embodiments, the unmanned vehicle 120 may search for a person overboard (such as described herein using, for example, object recognition technology and/or IR sensors). Upon locating a person overboard, the unmanned vehicle 120 may be configured to hover over the person and shine the light 138 over the person in the water. For example, FIG. 15 illustrates a marine environment 701 and an example situation where the unmanned vehicle 20 has located a person 717 floating in the water 11. The unmanned vehicle 20 has shined a light beam 786 over the person 717 using the light system 785.

In some embodiments, the unmanned vehicle 120 may be configured to (such as through instruction by the marine electronic device 105) perform a man overboard operation that includes launching from the marine vessel and searching for the man overboard. In some embodiments, when the man is located, the unmanned vehicle 120 may shine a light 138 onto the man for easy spotting by the marine vessel crew. In some embodiments, the man overboard operation could be performed based on a selection via the user interface of the marine electronic device 105. Alternatively, the man overboard operation could be performed automatically, such as in response to a man overboard alarm being sounded or by the marine electronic device 105 determining that a crew member has fallen overboard. The latter could be determined in the situation where the crew member is wearing a tracking device (such as on their uniform). Further, such a tracking device could be used to quickly locate the crew member, such as to enable the unmanned vehicle 120 to fly to and interact with the overboard crew member. For example, the unmanned vehicle 120 may shine a light on the crew member, deploy equipment (e.g., VHF radio, floatation device, etc.), deploy a beacon, land on the water as a buoyancy aid, emit audible sounds to draw attention to the location, initiate a strobe light, begin 2 way communication with the overboard crew member, among many other search and rescue operations. In some embodiments, the unmanned vehicle 120 may hover over the overboard crew member to provide a visual indicator of the location of the crew member, which may be helpful in avoiding the crew member in the water and/or traveling to the crew member.

In some embodiments, the unmanned vehicle 120 may be in communication with the marine electronic device 105 for navigation, such as to navigate to or mark the location of the overboard crew member. In some embodiments, routes or navigation instructions to the overboard crew member could be automatically generated. Further, the autopilot could be automatically engaged or the marine vessel could be automatically stopped.

In some embodiments, the unmanned vehicle 120 may be configured to deploy equipment (e.g., in response to instructions from a marine electronic device 105), such as may be useful during search and rescue operations. For example, in the search and rescue operation context, in some embodiments, the unmanned vehicle 120 may be configured to travel to a person in the water. When there, the unmanned vehicle 120 may hover over the person and deploy equipment that may aid the person. For example, the unmanned vehicle 120 may deploy (e.g., drop, lower, etc.) a flotation device, a rope, a radio, a transponder, a beacon, among other things. In some embodiments, the flotation device could inflate as it is released from the unmanned vehicle 120. FIG. 16 illustrates a marine environment 701' and an example situation where the unmanned vehicle 20 has located a person 717 floating in the water 11. The unmanned vehicle 20 has deployed a rope 796 over the person 717 from an equipment housing 795.

Task Operations

As detailed herein, in some embodiments, the unmanned vehicle 120 may include systems, equipment, storage for holding or transporting things, and/or many other features. In this regard, embodiments of the present invention contemplate many different uses for example unmanned vehicles 120 described herein, such as various tasks or operations described herein. Such tasks or operations, in some embodiments, may be performed via control/operation by the marine electronic device 105. In this regard, as with many embodiments described herein, the features and capabilities of the marine electronic device 105 may be useful in enabling the unmanned vehicle 120 to perform the desired task or operation. The following examples are not meant to be limiting, as many different tasks or operations are contemplated as part of the present invention.

In some embodiments, the unmanned vehicle 120 may be configured to measure or map the distance to a point of interest. For example, in some embodiments, the unmanned vehicle 120 may be configured to travel to a position or a location (e.g., a point of interest), such as under control by a user (e.g., through the marine electronic device 105). Once there or along the way, the unmanned vehicle 120 may be configured to send location data back to the marine electronic device 105. The marine electronic device 105 may then determine the location coordinates and/or determine the distance to and/or bearing to the position/location of the point of interest. Such an embodiment may be useful when the point of interest is unmarked. Additionally, the unmanned vehicle 120 may travel as the marine vessel would (e.g., around rocks or by depth contour) and measure the actual distance of travel for the marine vessel. Such measurements could be useful for determining a projected time of travel for the marine vessel and/or if extra fuel would be necessary.

In some embodiments, the unmanned vehicle 120 may be configured to deploy bait or chum at a desired location, such as may be useful for fishing. In this regard, the unmanned vehicle 120 may be configured (such as based on instructions from a marine electronic device 105) to travel to a location and deploy the bait or chum. Such an action may include hovering over a position and dropping the bait or chum into the water. In some embodiments, the unmanned vehicle 120 may be configured to perform such a task in response to the marine electronic device 105 receiving user input indicating a desire to perform the task (e.g., a user selects a location, such as a waypoint, or a distance/position with respect to the marine vessel and then selects "Deploy Bait/Chum"). Such embodiments are useful, as normally a fisherman would have to move the marine vessel to the location to drop in the bait or chum. Then the fisherman may have to move the boat to begin fishing. In some embodiments, other objects could be deployed, such as a buoy, dynamite, a fish lure, among other things.

In some embodiments, the unmanned vehicle 120 may be configured to act as a fish attractor. In such embodiments, the unmanned vehicle 120 (such as under instruction by the marine electronic device 105 and/or the user) may be configured to travel to a position (such as a future fishing spot). Once there, the unmanned vehicle 120 may emit fish attracting sounds into the underwater environment. This could be accomplished by landing on the water surface and emitting sound into the underwater environment via one or more speakers. Additionally or alternatively, the unmanned vehicle 120 may be configured to land on the water surface or hover over the water surface and deploy or drop a sound emitting device into the water. In some embodiments, the unmanned vehicle 120 may be configured to perform this task in response to receiving user input to a marine electronic device 105 (e.g., a user selects a location, such as a waypoint, or a distance/position with respect to the marine vessel and then selects "Attract Fish").

In some embodiments, the unmanned vehicle 120 may be configured to act as an out-rigger. In this regard, the unmanned vehicle 120 may carry a line (e.g., rope) to a position or location. In some embodiments, one end of the line may be attached (e.g., to the marine vessel) or held by a person onboard of the marine vessel such that the unmanned vehicle 120 is used to carry the other end of the line to the desired position (e.g., another marine vessel, a person on a dock, etc.). In some embodiments, the unmanned vehicle 120 may be configured to carry the line such that it wraps around a remote object (e.g., a buoy, a pillar, another marine vessel, etc.). In such embodiments, the unmanned vehicle 120 may travel according to instructions provided by the marine electronic device 105 and/or from instructions based on direct control from a user. In some embodiments, when defining the location for the unmanned vehicle 120 to travel, the marine electronic device 105 may determine a position relative to the marine vessel. Along these lines, a user may input a position relative to the marine vessel (e.g., 5 feet to port), and the marine electronic device 105 may convert the position to location coordinates that are geo-referenced for instructing the unmanned vehicle 120.

In some embodiments, the unmanned vehicle 120 may be configured to enable transfer of objects, such as from marine vessel to marine vessel, marine vessel to land, etc. For example, as detailed herein, the unmanned vehicle 120 may include a storage compartment or an attachment means for holding objects. In such embodiments, a user may place or attach objects (e.g., a phone, beer, a radio, a rope, lunch, etc.) to the unmanned vehicle 120. Then, whether under control of the marine electronic device 105 and/or direct control by a user, the unmanned vehicle 120 may be configured to travel to a position and land or hover to enable another user to acquire the object. In some embodiments, the unmanned vehicle 120 may deploy or drop the object on its own.

In some embodiments, the unmanned vehicle 120 may be configured to aid in the search for objects in the water. For example, the unmanned vehicle 120 may be configured to act in a water ski search mode, such as for locating a dropped water ski (e.g., when someone drops from 2 water skis to 1 water ski). In this regard, the unmanned vehicle 120 could use object recognition technology or be under control by a user while providing streaming video back to the user to locate the object in the water for retrieval. The location could be marked at the marine electronic device 105 and/or the unmanned vehicle 120 may stay at the location providing a visual indicator of the location of the object. Though the above example describes a water ski, other objects are also contemplated (a lost hat, shoes, flotation device, etc.).

In some embodiments, the unmanned vehicle 120 may be configured to act as a spy, such as for spying on other fisherman during a competition or other sailors during a sailing race. In this regard, in some embodiments, the unmanned vehicle 120 may be configured to follow another marine vessel to gather intelligence, such as providing streaming video, gathering wind data, gathering speed data, gathering direction or travel data, gathering location data, gathering other data, etc. This intelligence could be provided back to the marine electronic device 105 such as for display to a user.

In some embodiments, the unmanned vehicle 120 may act as a wireless range or VHF range extender. For example, the unmanned vehicle 120 may have a wireless transceiver or VHF transceiver. In such embodiments, the unmanned vehicle 120 (such as from instruction from the marine electronic device 105) may be configured to travel to a position remote from the marine vessel (and/or the marine electronic device 105) and act as a range extender. In this regard, in some embodiments, the higher the antenna, the better the range. As such, the unmanned vehicle 120 may be configured to fly to a high altitude to achieve a longer range. In some embodiments, the unmanned vehicle 120 may be configured to act as a WiFi range extender, such as to extend WiFi capabilities to or from the marine vessel (or another marine vessel). In this regard, the marine vessel (or a person on another marine vessel or raft) may be too far away from the WiFi source. In such an embodiment, the unmanned vehicle 120 may travel to a point in between the user and the source of the WiFi and act as a range extender to enable connectivity for the user.

In some embodiments, the unmanned vehicle 120 may utilize wireless capabilities to gather information. For example, the marine vessel may be out of range of wireless connection to an external network (e.g., cellular, satellite, WiFi, etc.). In such embodiments, the unmanned vehicle 120 (such as through instruction from the marine electronic device 105) may be configured to travel to a position in which it is able to connect to an external network to download desired information (e.g., weather data, news, software updates for various systems on the marine vessel, etc.). Then, the unmanned vehicle 120 may transmit that information back to the marine electronic device 105 and/or return to the marine vessel for uploading of the information. Likewise, the unmanned vehicle 120 may include stored data from the marine electronic device 105 (such as sonar logs, emails for sending, etc.) that can then be transmitted using the discovered external network—thereby enabling a user of the marine electronic device 105 to use the unmanned vehicle 120 to transmit data to an external network that may be otherwise inaccessible at the location of the marine electronic device 105.

In some embodiments, the unmanned vehicle 120 may be configured to detect available internet connections. For example, the unmanned vehicle 120 (such as by instruction from the marine electronic device 105) may be configured to search for available internet connectivity (e.g., cellular, WiFi, satellite, etc.). In some embodiments, the unmanned vehicle 120 may determine the locations in which internet connectivity is possible, and provide those locations back to the marine electronic device 105. In some embodiments, a user may pick which type of connectivity is desirable (e.g., cellular, WiFi, satellite, etc.). Further, in some embodiments, there may be a distinction between static (e.g., land-based) connections and mobile connections (e.g., WiFi from another marine vessel).

In some embodiments, the marine electronic device 105 may be configured to "map" out available internet connectivity, such as on a chart of the body of water. Further, the type of connectivity could be indicated. In such a regard, a user could be aware of where the marine vessel (or unmanned vehicle 120) could travel on the body of water (or land for the unmanned vehicle) to establish internet connectivity. FIG. 17 illustrates an example chart image 800 on a screen 45 of a marine electronic device 40 that shows the location of the marine vessel 810 and unmanned vehicle 820 on the body of water. Additionally, various areas 892 of the body of water that have internet connectivity are shaded for easy reference by a user. As such, the user may travel to within the shaded areas 892 to enable internet connectivity. Such an embodiment would be useful for a marine environment where internet connectivity is often very limited. Indeed, in some embodiments, the unmanned vehicle 120 may be controllable in certain internet finding or assessing modes. For example, a user could employ a "Go Find Internet" mode that causes the unmanned vehicle 120 to travel around to find viable internet hotspots. These hotspots could be mapped or communicated back to the marine vessel. Additionally, assessment could be made as to various internet performance factors for each hotspot—such as is it fixed or mobile, the strength of signal, the likelihood the hotspot will still be available if the marine vessel/unmanned vehicle travels to the location, is it password protected, etc. This assessment could be communicated back (e.g., to the marine electronic device 105) to enable a user to decide whether to travel or otherwise use the discovered hotspot. In some embodiments, the assessment could be made after an internet "map" of the surrounding location is acquired (such as in response to a user requesting the assessment). The assessment could be made by the unmanned vehicle 120 and/or the marine electronic device 105. Further, in some embodiments, the unmanned vehicle 120 or the marine electronic device 105 may be configured to determine that the marine vessel or the unmanned vehicle 120 is unable to travel to any internet hotspot or potential internet hotspot location (e.g., due to fuel or battery life constraints, weather, etc.). This information could be communicated to the user of the marine electronic device 105 and/or unmanned vehicle 120 in any form (e.g., an alarm, a message such as "Error: Drone Unable to Reach Requested Location", other notification, etc.).

In some embodiments, the unmanned vehicle 120 may be configured to act as a "buoy", such as may be useful for fishing activity. For example, a fisherman may determine that there is desirable structure at a specific location under the water (e.g., fish attracting structure). However, the fisherman may not be able to visibly discern the location. In such a situation, the unmanned vehicle 120 may be positioned at (or travel to) the location and float at or hover above the location—thereby visually marking the location (and the structure). In this manner, even if the fisherman drifts or moves his/her eyes, the unmanned vehicle 120 (acting as a "buoy") will enable the fisherman to easily locate the desired structure.

Depending on the desired configuration and/or desired complexity, the unmanned vehicle 120 may be configured as a self-contained unit to act as a "buoy" such that it is not controlled (or even in communication with the marine electronic device 105). Such embodiments may enable the unmanned vehicle 120 to be inexpensive and more cost effective. Alternatively, in some embodiments, the unmanned vehicle 120 may be configured to communicate with and/or be controlled or operated by the marine electronic device 105. In such embodiments, the unmanned vehicle 120 may enter a "Buoy Mode", such as in response to user input to the marine electronic device 105.

In some embodiments, the unmanned vehicle 120 may be small in size and easy to pick up and drop into the water at a desired location. In such embodiments, the unmanned vehicle 120 may be handheld or pocket-sized. In this regard, a user may simply place the unmanned vehicle 120 in the water at the location and it will begin acting as a buoy. Alternatively, the unmanned vehicle 120 may be instructed (such as from the marine electronic device 105) to travel to a certain location and remain there (either floating on the water surface or hovering above). Accordingly, the unmanned vehicle 120 may cause its propulsion system to cause it to travel to the location accordingly.

In some embodiments, the unmanned vehicle 120 may be configured to virtually anchor in the desired location. For example, the unmanned vehicle 120 may include a location sensor (e.g., GPS system) that can determine the location of the unmanned vehicle 120. Additionally, the unmanned vehicle 120 may include a propulsion system that can be used to keep the unmanned vehicle 120 "anchored" at the desired location. In this regard, as the unmanned vehicle 120 drifts (e.g., by wind or waves), the location sensor may determine that the unmanned vehicle 120 is no longer at the desired location and, in response, the propulsion system can be engaged to return the unmanned vehicle 120 to the desired location.

In some embodiments, the unmanned vehicle 120 may include one or more lights. For example, the unmanned vehicle 120 may include a light beacon that is configured to emit light (e.g., an LED) to the surrounding environment (e.g., above water) to provide a visual indication of where the unmanned vehicle 120 is. This may enable night fishing and/or aid in navigation and pick up of the unmanned vehicle 120. In some embodiments, the unmanned vehicle 120 may include one or more underwater lights that are positioned to enable emitting light to the underwater environment. This may be useful for divers in searching wreckage or for fish attracting.

In some embodiments, the unmanned vehicle 120 may be configured to communicate with one or more remote devices (e.g., the marine electronic device 105 and/or an external network). In such embodiments, the unmanned vehicle 120 may be configured to transmit its location (or gathered location data) to the remote device to aid in marking of the location and/or pick up of the unmanned vehicle 120. In response, the marine electronic device 105 may be configured to automatically determine navigation aids to travel to the unmanned vehicle 120. Further an autopilot could be engaged to automatically travel to the location.

In some embodiments, other data may be transmitted to the remote device (such as described in the various embodiments herein) from the unmanned vehicle 120. For example, the unmanned vehicle 120 may include a sonar system that can gather sonar data from the underwater environment, such as while the unmanned vehicle 120 floats on the water surface acting as a "buoy". The sonar data could be transmitted back wirelessly (e.g., through an external network, Bluetooth, etc.) and displayed for a user (such as on a screen of the marine electronic device 105). Such sonar data could be used to confirm that the desired structure or fish are still present underneath the unmanned vehicle 120. In some embodiments, a user could upload the sonar data (or other operational data) manually once the unmanned vehicle 120 is accessible (e.g., when it is back on the marine vessel).

In some embodiments, the unmanned vehicle 120 may include a battery or other power source to operate its various components. In some embodiments, the unmanned vehicle 120 may include one or more solar panels that can be used to directly power the components and/or recharge the batteries.

FIG. 18 illustrates an example marine environment with an unmanned vehicle 20' acting as a "buoy". In the depicted embodiment, the unmanned vehicle 20' is floating on the surface 12 of the body of water 11 near a marine vessel 10. In particular, the unmanned vehicle 20' has been positioned so that it marks the location of a rock 14 on the floor 13 of the body of water 11. As shown, the unmanned vehicle 20' includes a housing 22' that enables it to float on the water surface 12. A propulsion system 25' enables the unmanned vehicle 20' to correct its position so that it is virtually anchored (as described above). The unmanned vehicle 20' also includes a light beacon 28' for additional visual distinction to a user. Further, the unmanned vehicle 20' includes a sonar system 30' that can be used to gather sonar data from the underwater environment, such as to determine if fish are present around the rock 14.

The above example embodiments of using an unmanned vehicle 120 as a "buoy" provide many different advantages over regular buoys. For example, a regular buoy is unable to correct its location to account for drift due to waves or wind. Often, such fishing buoys are anchored to the bottom to avoid draft. However, in order to ensure the buoy still remains near the location, the correct length of rope for the anchor must be determined. The present invention avoids the need to make that determination. Further, there is no disturbing of fish by dropping an anchor into the water—as the present invention does not require an anchor to be dropped.

Example System Architecture

FIG. 19 shows a block diagram of an example system 100 capable for use with several embodiments of the present invention. As shown, the system 100 may include a number of different modules or components, each of which may comprise any device or means embodied in either hardware, software, or a combination of hardware and software configured to perform one or more corresponding functions. For example, the system 100 may include one or more unmanned vehicles 120, one or more marine electronic devices 105, an external network 102, and one or more mobile devices 109.

The system 100 may also include one or more communications modules configured to communicate with one another in any of a number of different manners including, for example, via a network. In this regard, the communication interfaces (e.g., 113, 123) may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays (e.g., a marine electronic device 105) may be included in the system 100.

The marine electronic device 105 may include a processor 111, a memory 112, a user interface 116, a display 114, one or more sensors 117 (e.g., a location sensor, position sensor, heading sensor, orientation sensor (not shown), etc.), and a communication interface 113.

The processor 111 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 111 as described herein. In this regard, the processor 111 may be configured to analyze electrical signals communicated thereto to provide processing to utilize any operational and/or location data detected by the system 100 (e.g., operational data and/or location data provided by one or more unmanned vehicles 120).

In some embodiments, the processor 111 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc.

The memory 112 may be configured to store instructions, computer program code, marine data, such as sonar data, chart data, location/position data, radar data, camera data, and other data associated with the sonar system (e.g., such as from the unmanned vehicle 120 or a navigation system operated by the marine electronic device) in a non-transitory computer readable medium for use, such as by the processor.

The communication interface 113 may be configured to enable connection to external systems (e.g., an external network 102, one or more marine electronic devices 105, one or more unmanned vehicles 120, and/or one or more mobile devices 109). In this regard, the marine electronic device 105 may include at least one transmitter configured to transmit, for example, one or more signals according to example embodiments described herein. Likewise, the marine electronic device 105 may include at least one receiver configured to, for example, receive data from one or more unmanned vehicles according to example embodiments described herein. In some embodiments, the transmitter and receiver may be combined as a transceiver. Though the depicted embodiment shows specific examples of external networks that the marine electronic device is configured to communicate with, there are many other contemplated systems (such as the operation and/or control systems of the watercraft carrying the marine electronic device).

The marine electronic device may also include one or more sensor(s), system(s), or other information/data collecting devices 117 (such as any example sensors or data collecting devices described in any embodiments herein). For example, the marine electronic device 105 may include a location sensor configured to determine the current location of the marine electronic device. Further, the marine electronic device may include speed and/or direction detecting sensors that are configured to determine the speed and/or heading of the marine electronic device (or that of the watercraft/marine vessel associated with the marine electronic device). Even further, the marine electronic device may include a navigation system that is configured to enable navigation capabilities (such as described herein in greater detail with respect to some example embodiments). As will be apparent to one of ordinary skill in the art based on the disclosure herein, there are many different types of sensors or data collection devices that can be utilized and/or integrated within the marine electronic device.

The display 114 may be configured to display images and may include or otherwise be in communication with a user interface 116 configured to receive input from a user. The display 114 may be, for example, a conventional LCD (liquid crystal display), a touch screen display, mobile device, or any other suitable display known in the art upon which images may be displayed.

In any of the embodiments, the display 114 may present one or more sets of marine data, such as operational data and/or location data of the unmanned vehicle, (or images generated from the one or more sets of data). Such marine data includes chart data, radar data, weather data, location data, position data, orientation data, sonar data, or any other type of information relevant to the watercraft and/or unmanned vehicle. In some embodiments, the display may be configured to present such marine data simultaneously as in split-screen mode. In some embodiments, a user may select any of the possible combinations of the marine data for display.

The user interface 116 may include, for example, a keyboard, keypad, function keys, mouse, scrolling device, input/output ports, touch screen, or any other mechanism by which a user may interface with the system.

Although the display 114 of FIG. 19 is shown as being directly connected to the processor 111 and within the marine electronic device 105, the display 114 could alternatively be remote from the processor 111 and/or marine electronic device 105. Likewise, in some embodiments, other components of the marine electronic device 105 could be remotely located.

The unmanned vehicle 120 may include components (hardware or software) that are configured according to any of the example embodiments detailed herein in the same manner as similar components to those of the marine electronic device 105. For example, the unmanned vehicle 120 may include a processor 121, a memory 122, and a communication interface 123. However, the corresponding processor 121, memory 122, and communication interface 123 may be configured according to example embodiments described herein with respect to example unmanned vehicles and their corresponding tasks.

For example, the communication interface 123 may be configured to enable connection to external systems (e.g., an external network 102, one or more marine electronic devices 105, one or more unmanned vehicles 120, and/or one or more mobile devices 109). In this regard, the unmanned vehicle 120 may include at least one transmitter configured to transmit, for example, location and/or operational data according to example embodiments described herein. Likewise, the unmanned vehicle 120 may include at least one receiver configured to, for example, receive one or more control signals from one or more marine electronic devices 105 according to example embodiments described herein. In some embodiments, the transmitter and receiver may be combined as a transceiver.

In addition to similar components described above with respect to a marine electronic device, the unmanned vehicles 120 may include one or more additional components. For example, FIG. 19 depicts the additional components of a location sensor 128, a propulsion system 125, one or more lights 138, deployable equipment 190, and other operational components 130 (including, for example, a sonar system 136, a radar system 137, a camera 133, and other sensor(s) 139).

The location sensor 128 may be configured to retrieve and/or detect location/position data corresponding to the current location of the unmanned vehicle. For example, the location sensor 128 may be a GPS enabled device.

The propulsion system 125 may include one or more motors configured to propel the unmanned vehicle 120. In this regard, depending on the configuration of the unmanned vehicle, the propulsion system 125 may be configured to propel the unmanned vehicle for flight (unmanned aerial vehicle), along the surface of the body of water (unmanned surface vehicle), and/or under the water (unmanned submersible vehicle). In some embodiments, the propulsion system may be configured to perform any combination of the three configurations, such that it may be configured for flight, surface travel, and/or submersible travel.

The one or more lights 138 may include, for example, any type of light. For example, the one or more lights 138 may include a spotlight that is configured to emit onto a spot in the water or a person according to some example embodiments. Additionally or alternatively, the one or more lights 138 may be alert lights and/or indicators, such as for indicating information (e.g., a location, a desired direction for the watercraft to travel (e.g., red/green buoy indicators), a message, etc.). In this regard, different color lights and/or different frequency of operation of the lights can be used (e.g., Morse code, etc.).

The deployable equipment 190 may include any equipment that can be held and deployed by the unmanned vehicle. Such equipment can be deployed and released (e.g., a radio, a floatation device, an oxygen tank, a beverage, etc.) or deployed and remain attached (e.g., a rope, a sonar system, other sensors, etc.). In some embodiments, the deployable equipment may be placed into a housing or attached to the unmanned vehicle 120.

The unmanned vehicle 120 may include one or more other operational components 130 (e.g., components that gather operational data). For example, the unmanned vehicle 120 may include a sonar system 136, a radar system 137, a camera 133, or other sensor(s)/system(s) 139.

The sonar system 136 may include a transducer assembly that is provided in one or more housings that provide for flexible mounting options with respect to the watercraft. In this regard, for example, the housing may be mounted onto a portion of the unmanned vehicle 120 or onto a device or component that may be attached to the unmanned vehicle 120 (e.g., a rope, a cable, a shaft, or other component that is mountable relative to the unmanned vehicle), including a bracket that is adjustable on multiple axes, permitting omni-directional movement of the housing.

The transducer assembly may include one or more transducers or transducer elements positioned within the housing.

Each transducer may be configured as transmit/receive, transmit-only, or receive-only with respect to transmitting one or more sonar beams and receiving sonar returns. In some embodiments, each of the transducer elements may be positioned within the housing so as to point toward a predetermined area under, to the side, or the front of the unmanned vehicle.

The shape of a transducer element may largely determine the type of beam that is formed when that transducer element transmits a sonar pulse (e.g., a circular transducer element emits a cone-shaped beam, a linear transducer emits a fan-shaped beam, etc.). Embodiments of the present invention are not limited to any particular shape transducer (or any configuration—as it may include arrays, phased arrays, etc.). Likewise, transducer elements may comprise different types of materials that cause different sonar pulse properties upon transmission. For example, the type of material may determine the strength of the sonar pulse. Additionally, the type of material may affect the sonar returns received by the transducer element. As such, embodiments of the present invention are not meant to limit the shape or material of the transducer elements. Further, transducers may be configured to transmit and/or receive at different frequencies. In this regard, embodiments of the present invention are not meant to be limited to certain frequencies.

Additionally, in some embodiments, the transducer assembly (or sonar system 136) may have a sonar signal processor and/or other components positioned within the housing. For example, one or more sonar transceivers (e.g., sonar transmitter/receiver), sonar transmitters, and/or sonar receivers may be positioned within the housing and configured to cause the one or more transducers to transmit sonar beams and/or receive sonar returns from the one or more transducers. In some embodiments, the sonar signal processor, sonar transceiver, sonar transmitter, and/or sonar receiver may be positioned in a separate housing.

The radar system 137 may be or include any radar components configured to collect radar data. For example, the radar system may be configured to transmit one or more radar waves and receive radar returns to form radar data. In this regard, the radar system may include one or more antennas to transmit electromagnetic waves in the radio or microwaves domain and capture any returns from objects in the path of the emitted signal. The radar system may also include a receiver and/or a processor to process the radar data (e.g., form the radar data, determine properties of any objects, etc.).

The camera 133 may be any type of camera, including a video camera. In some embodiments, there may be multiple cameras oriented in different (or the same) directions. Additionally or alternatively, the camera 133 may be configured to change direction (rotate, tilt, etc.). In such embodiments, the camera 133 may be linked to an orientation and/or direction sensor that can determine which direction the camera 133 is facing. This may be a true direction (e.g., with respect to North) or may be relative to the direction the unmanned vehicle 120 is facing (in which case the unmanned vehicle 120 may also have an orientation and/or direction sensor to enable comparison and determination as to the actual direction the camera is facing. In some embodiments, the camera 133 may be configured to gather camera data, which may include streaming video, photographs, still photographs, panoramic photographs, etc.

The unmanned vehicle 120 may also include one or more sensor(s) or other information/data collecting devices 139 (such as any example sensors or data collecting devices described in any embodiments herein). For example, the unmanned vehicle 120 may include speed and/or direction detecting sensors that are configured to determine the speed and/or heading of the unmanned vehicle. Additionally or alternatively, other sensors or data collection devices may be used (e.g., a position sensor, a heading sensor, an orientation sensor, an IR camera, a microphone, a temperature sensor, a wind sensor, a heave/roll sensor, an automatic identification system (AIS), navigation system, among others). As will be apparent to one of ordinary skill in the art based on the disclosure herein, there are many different types of sensors or data collection devices that can be utilized and/or integrated within the unmanned vehicle.

The system 100 may also include one or more mobile devices 109. The mobile devices 109 may include components known in the art for mobile phone or smartphones. In this regard, in some embodiments, the one or more mobile devices 109 can be linked to and/or wirelessly control operation of (or receive information from) one or more of the marine electronic device 105 or the unmanned vehicle 120 according to any embodiments described herein. For example, the mobile device 109 can display what is being displayed on the display 114 of the marine electronic device 105—thereby enabling that information to be provided to the user no matter their location with respect to the marine electronic device.

In some embodiments, the unmanned vehicle 120 may include a battery or other power source to enable power to the various components. In some embodiments, the power source may comprise at least one solar panel positioned on the unmanned vehicle. In such embodiments, the solar panel may be configured to charge one or more batteries, which may prolong the life of the battery and/or operation time for the unmanned vehicle.

FIG. 20 shows a block diagram of an example environment 101 where system 100 (or a similar system in accordance with embodiments described herein) is capable for use. As shown, the environment 101 includes a marine electronic device 105 for a watercraft 103 (e.g., marine vessel). The marine electronic device 105 can be configured, such as according to embodiments described herein, to control operation of multiple unmanned vehicles (e.g., drone 1 (120) and drone 2 (120')). Such control can occur directly to the unmanned vehicles (e.g., through Bluetooth or other wireless control) or through an external network 102.

Example Flowchart(s) and Operations

Embodiments of the present invention provide methods, apparatuses and computer program products for controlling and operating one or more unmanned vehicles in a marine environment. Various examples of the operations performed in accordance with embodiments of the present invention will now be provided with reference to FIGS. 21-22.

FIG. 21 illustrates a control flow diagram according to an example method for controlling navigation of an unmanned vehicle from a remote marine electronic device according to an example embodiment 900. The operations illustrated in and described with respect to FIG. 21 may, for example, be performed by, with the assistance of, and/or under the control of one or more of the processor 121, memory 122, communication interface 123, location sensor 128, propulsion system 125, and/or other sensor(s)/system(s) 130 of the unmanned vehicle 120 (e.g., unmanned vehicle 920 of FIG. 21) and/or one or more of the processor 111, memory 112, communication interface 113, user interface 116, display 114, and/or sensor(s)/system(s) 117 of the marine electronic device 105 (e.g., marine electronic device 905 of FIG. 21).

Operation 950 may comprise retrieving (or determining) location data indicative of a current location of the unmanned vehicle 920. The processor 121, memory 122, communication interface 123, location sensor 128, and/or other sensor(s)/system(s) 130 of the unmanned vehicle 920 may, for example, provide means for performing operation 950. Operation 952 may comprise transmitting the location data from the unmanned vehicle 920 and/or receiving the location data at the marine electronic device 905. The processor 121 and/or communication interface 123 of the unmanned vehicle 920 and/or the processor 111 and/or communication interface 113 of the marine electronic device 905 may, for example, provide means for performing operation 952.

Operation 954 may comprise determining the current location of the unmanned vehicle 920 at the marine electronic device 905 and based on the received location data. The processor 111, memory 112, communication interface 113, and/or sensor(s)/system(s) 117 of the marine electronic device 905 may, for example, provide means for performing operation 954. Operation 956 may comprise determining the desired location for the unmanned vehicle 920 to travel to, wherein the determining is performed at the marine electronic device 905 and based on a planned route or waypoint stored in the memory of the marine electronic device. The processor 111, memory 112, user interface 116, display 114, and/or sensor(s)/system(s) 117 of the marine electronic device 905 may, for example, provide means for performing operation 956. Operation 958 may comprise transmitting a control signal from the marine electronic device 905 and/or receiving the control signal at the unmanned vehicle 920, wherein the control signal includes instructions for the unmanned vehicle to travel to the desired location. The processor 111 and/or communication interface 113 of the marine electronic device 905 and/or the processor 121 and/or communication interface 123 of the unmanned vehicle 920 may, for example, provide means for performing operation 958.

Operation 960 may comprise causing the propulsion system of the unmanned vehicle to propel the unmanned vehicle to the desired location. The processor 121, memory 122, communication interface 123, location sensor 128, propulsion system 125, and/or other sensor(s)/system(s) 130 may, for example, provide means for performing operation 960.

FIG. 22 illustrates a control flow diagram according to an example method for controlling operation of an unmanned vehicle from a remote marine electronic device according to an example embodiment 970. The operations illustrated in and described with respect to FIG. 22 may, for example, be performed by, with the assistance of, and/or under the control of one or more of the processor 121, memory 122, communication interface 123, location sensor 128, propulsion system 125, and/or other sensor(s)/system(s) 130 of the unmanned vehicle 120 (e.g., unmanned vehicle 920 of FIG. 22) and/or one or more of the processor 111, memory 112, communication interface 113, user interface 116, display 114, and/or sensor(s)/system(s) 117 of the marine electronic device 105 (e.g., marine electronic device 905 of FIG. 22).

Operation 972 may comprise determining at the marine electronic device 905 that operational data from the unmanned vehicle 920 is desired. The processor 111, memory 112, communication interface 113, user interface 116, display 114, and/or sensor(s)/system(s) 117 of the marine electronic device 905 may, for example, provide means for performing operation 972. Operation 974 may comprise transmitting a control signal from the marine electronic device 905 and/or receiving the control signal at the unmanned vehicle 920, wherein the control signal includes instructions for the unmanned vehicle to operate accordingly (such as gathering operation data). The processor 111 and/or communication interface 113 of the marine electronic device 905 and/or the processor 121 and/or communication interface 123 of the unmanned vehicle 920 may, for example, provide means for performing operation 974.

Operation 976 may comprise causing the operational data to be acquired by one or more components of the unmanned vehicle. The processor 121, memory 122, communication interface 123, location sensor 128, propulsion system 125, and/or other sensor(s)/system(s) 130 may, for example, provide means for performing operation 976. Operation 978 may comprise retrieving (or determining) location data indicative of a current location of the unmanned vehicle 920. The processor 121, memory 122, communication interface 123, location sensor 128, and/or other sensor(s)/system(s) 130 of the unmanned vehicle 920 may, for example, provide means for performing operation 950. Operation 980 may comprise transmitting the operational data and the location data from the unmanned vehicle 920 and/or receiving the operational data and the location data at the marine electronic device 905. The processor 121 and/or communication interface 123 of the unmanned vehicle 920 and/or the processor 111 and/or communication interface 113 of the marine electronic device 905 may, for example, provide means for performing operation 980.

Operation 982 may comprise causing display of one or more images associated with the received operational data and/or location data on a screen of the marine electronic device 905. The processor 111, memory 112, communication interface 113, user interface 116, display 114, and/or sensor(s)/system(s) 117 of the marine electronic device 905 may, for example, provide means for performing operation 982.

FIGS. 21-22 illustrate flow control diagrams of a system, method, and computer program product according to an example embodiment. It will be understood that each block of the flow control diagrams, and combinations of blocks in the flow control diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 112/122 and executed by, for example, the processor 111/121. As will be appreciated, any such computer program product may be loaded onto a computer or other programmable apparatus (for example, a marine electronic device 105 and/or an unmanned vehicle 120), such that the computer program product including the instructions which execute on the computer or other programmable apparatus creates means for implementing the functions specified in the flow control diagrams block(s). Further, the computer program product may comprise one or more non-transitory computer-readable mediums on which the computer program instructions may be stored such that the one or more computer-readable memories can direct a computer or other programmable device (for example, a marine electronic device 105 and/or an unmanned vehicle 120) to cause a series of operations to be performed on the computer or other programmable apparatus to produce a computer-implemented process such that the instructions which execute on the computer or other programmable apparatus implement the functions specified in the flow control diagrams block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed:

1. An unmanned vehicle for a marine environment, wherein the unmanned vehicle is controllable by a marine electronic device of a marine vessel traveling on a surface of a body of water, the unmanned vehicle comprising:
    a location sensor configured to gather location data corresponding to the unmanned vehicle;
    a propulsion system configured to propel the unmanned vehicle;
    at least one operational component configured to gather operational data, wherein the operational component comprises at least one of a sensor configured to obtain sensor data or a camera configured to obtained camera data;
    an automatic identification system (AIS) configured to gather AIS data regarding other marine vessels or objects, wherein the AIS data comprises an indication of a location of at least one other marine vessel or object;
    a transmitter configured to transmit data to the marine electronic device;
    a receiver configured to receive instructions from the marine electronic device;
    a processor; and
    a memory including computer program product stored thereon, wherein the computer program product is configured, when executed by the processor, to:
    determine unmanned vehicle location data indicative of a current location of the unmanned vehicle;
    determine unmanned vehicle AIS data at the current location of the unmanned vehicle;
    transmit the unmanned vehicle AIS data and the unmanned vehicle location data to the marine electronic device; and
    transmit one or more signals, based on the unmanned vehicle AIS data, to at least one other marine vessel to provide an indication of the current location of the unmanned vehicle to the at least one other marine vessel.

2. The unmanned vehicle of claim 1, wherein the unmanned vehicle AIS data is utilized by the marine electronic device of the marine vessel to determine the location of the at least one other marine vessel or object for presentation on a screen of the marine electronic device.

3. The unmanned vehicle of claim 2, wherein the unmanned vehicle AIS data is utilized by the marine electronic device of the marine vessel to update a chart or map showing prior acquired AIS data.

4. The unmanned vehicle of claim 2, wherein the unmanned vehicle location data is used with the unmanned vehicle AIS data to determine the location of the at least one other marine vessel or object relative to the marine vessel.

5. The unmanned vehicle of claim 1, wherein the transmission of the one or more signals to the at least one other marine vessel is part of a search and rescue operation.

6. The unmanned vehicle of claim 1, wherein the computer program product is further configured, when executed by the processor, to:
    receive a control signal from the marine electronic device, wherein the control signal includes instructions to travel to a desired location based on a planned route or waypoint stored in memory of the marine electronic device;
    cause the propulsion system to propel the unmanned vehicle to the desired location;
    receive the unmanned vehicle AIS data at the desired location; and
    transmit the unmanned vehicle AIS data to the marine electronic device.

7. The unmanned vehicle of claim 1, wherein the computer program product is further configured, when executed by the processor, to:
    receive a control signal from the marine electronic device, wherein the control signal includes instructions to travel to a desired location based on a planned route or waypoint stored in memory of the marine electronic device;
    cause the propulsion system to propel the unmanned vehicle to the desired location;
    receive operational data from the at least one operational component, wherein the operational data comprises at least one of sensor data or camera data; and
    transmit the operational data to the marine electronic device.

8. The unmanned vehicle of claim 7, wherein the computer program product is further configured, when executed by the processor, to receive a series of control signals from the marine electronic device, wherein each control signal includes instructions to travel to a new desired location so as to cause the unmanned vehicle to autonomously follow the planned route stored in the memory of the marine electronic device.

9. The unmanned vehicle of claim 7, wherein the at least one sensor is a sonar system configured to collect sonar data from an underwater environment, wherein the computer program product is further configured, when executed by the processor, to:
    receive a control signal from the marine electronic device with instructions to gather sonar data;
    cause the sonar system to gather sonar data;
    determine location data associated with the gathered sonar data; and
    transmit the gathered sonar data and the location data associated with the gathered sonar data to the marine electronic device for display of the sonar data on a screen of the marine electronic device and association of the location of the unmanned vehicle with the gathered sonar data.

10. The unmanned vehicle of claim 7, wherein the computer program product is further configured, when executed by the processor, to:
- receive a control signal from the marine electronic device with instructions to gather streaming video;
- cause the camera to gather camera data in the form of streaming video;
- determine location data associated with the gathered camera data; and
- transmit the gathered camera data and the location data associated with the gathered camera data to the marine electronic device for display of the streaming video on a screen of the marine electronic device and association of the location of the unmanned vehicle with the gathered camera data.

11. The unmanned vehicle of claim 1, wherein the unmanned vehicle is an unmanned aerial vehicle such that the propulsion system is configured to cause the unmanned aerial vehicle to fly around the marine environment.

12. The unmanned vehicle of claim 1, wherein the unmanned vehicle is an unmanned surface vehicle such that the propulsion system is configured to cause the unmanned surface vehicle to travel along the surface of the body of water of the marine environment.

13. The unmanned vehicle of claim 1, wherein the unmanned vehicle is an unmanned underwater vehicle such that the propulsion system is configured to cause the unmanned underwater vehicle to travel beneath the surface of the body of water of the marine environment.

14. The unmanned vehicle of claim 1, wherein the at least one sensor is at least one of a sonar system, a radar system, a microphone, a temperature sensor, a wind sensor, a heave/roll sensor, or an IR sensor.

15. The unmanned vehicle of claim 1, wherein the computer program product is further configured, when executed by the processor, to determine one or more available internet connections at the current location and transmit an indication of the one or more available internet connections to the marine electronic device.

16. A marine electronic device of a marine vessel on a surface of a body of water, wherein the marine electronic device is configured for control of an unmanned vehicle, the marine electronic device comprising:
- a transmitter configured to transmit instructions to the unmanned vehicle;
- a receiver configured to receive data from the unmanned vehicle;
- a processor; and
- a memory including computer program product stored thereon, wherein the computer program product is configured, when executed by the processor, to:
  - receive unmanned vehicle automatic identification system (AIS) data and unmanned vehicle location data from the unmanned vehicle, wherein the unmanned vehicle comprises an AIS configured to gather the unmanned vehicle AIS data regarding other marine vessels or objects, wherein the unmanned vehicle AIS data comprises an indication of a location of at least one other marine vessel or object, wherein the unmanned vehicle is configured to transmit one or more signals, based on the unmanned vehicle AIS data, to at least one other marine vessel to provide an indication of the current location of the unmanned vehicle to the at least one other marine vessel;
  - determine, based on the received unmanned vehicle location data, the current location of the unmanned vehicle;
  - determine, based on the unmanned vehicle AIS data, the location of at least one other marine vessel or object relative to the marine vessel.

17. The marine electronic device of claim 16, wherein the computer program product is configured, when executed by the processor, to present, on a screen of the marine electronic, the location of the at least one other marine vessel or object relative to the marine vessel.

18. A method for operating an unmanned vehicle for a marine environment, wherein the unmanned vehicle is controllable by a marine electronic device of a marine vessel traveling on a surface of a body of water, the method comprising:
- receiving unmanned vehicle automatic identification system (AIS) data and unmanned vehicle location data from the unmanned vehicle, wherein the unmanned vehicle comprises an AIS configured to gather the unmanned vehicle AIS data regarding other marine vessels or objects, wherein the unmanned vehicle AIS data comprises an indication of a location of at least one other marine vessel or object, and wherein the unmanned vehicle is configured to transmit one or more signals, based on the unmanned vehicle AIS data, to at least one other marine vessel to provide an indication of the current location of the unmanned vehicle to the at least one other marine vessel;
- determining, based on the received unmanned vehicle location data, the current location of the unmanned vehicle; and
- determining, based on the unmanned vehicle AIS data, the location of the at least one other marine vessel or object relative to the marine vessel.

19. The method of claim 18, further comprising presenting, on a screen of the marine electronic, the location of the at least one other marine vessel or object relative to the marine vessel.

* * * * *